US012408684B2

(12) United States Patent
Dyson et al.

(10) Patent No.: US 12,408,684 B2
(45) Date of Patent: Sep. 9, 2025

(54) HIGH PROTEIN FOOD COMPOSITIONS

(71) Applicant: Air Protein, Inc., Pleasanton, CA (US)

(72) Inventors: Lisa Dyson, Pleasanton, CA (US); Kripa Rao, Pleasanton, CA (US); John Reed, Pleasanton, CA (US)

(73) Assignee: Air Protein, Inc., San Leandro, CA (US)

( * ) Notice: Subject to any disclaimer, the term of this patent is extended or adjusted under 35 U.S.C. 154(b) by 786 days.

(21) Appl. No.: 17/363,465

(22) Filed: Jun. 30, 2021

(65) Prior Publication Data

US 2021/0392920 A1  Dec. 23, 2021

Related U.S. Application Data

(63) Continuation-in-part of application No. PCT/US2020/067555, filed on Dec. 30, 2020.

(60) Provisional application No. 62/956,110, filed on Dec. 31, 2019.

(51) Int. Cl.
| | |
|---|---|
| A23J 3/20 | (2006.01) |
| A23J 3/22 | (2006.01) |
| A23J 3/26 | (2006.01) |
| A23L 29/00 | (2016.01) |
| A23L 33/195 | (2016.01) |

(52) U.S. Cl.
CPC ............ *A23J 3/20* (2013.01); *A23J 3/227* (2013.01); *A23J 3/26* (2013.01); *A23L 29/065* (2016.08); *A23L 33/195* (2016.08)

(58) Field of Classification Search
CPC ...... A23J 3/20; A23J 3/26; A23J 3/227; A23L 29/065; A23L 33/195
See application file for complete search history.

(56) References Cited

U.S. PATENT DOCUMENTS

| | | | |
|---|---|---|---|
| 3,420,739 A | 1/1969 | Bongers et al. |
| 3,442,620 A | 5/1969 | Huebler et al. |
| 3,852,492 A | 12/1974 | Brown, Jr. et al. |
| 3,887,431 A | 6/1975 | Robbins et al. |
| 3,888,740 A | 6/1975 | Ishizaki et al. |
| 3,891,774 A | 6/1975 | Baker et al. |
| 3,925,562 A | 12/1975 | Tannenbaum |
| 3,939,284 A | 2/1976 | Akin et al. |
| 4,191,782 A | 3/1980 | Vedamuthu |
| 4,367,146 A | 1/1983 | Pollock et al. |
| 4,426,450 A | 1/1984 | Donofrio |
| 4,607,011 A | 8/1986 | Kaplan et al. |
| 4,806,479 A | 2/1989 | Kegel et al. |
| 4,849,230 A | 7/1989 | Varvello |
| 4,859,588 A | 8/1989 | Sublette |
| 5,034,232 A | 7/1991 | Sugitani et al. |
| 5,173,429 A | 12/1992 | Gaddy et al. |
| 5,186,731 A | 2/1993 | Parker |
| 5,250,427 A | 10/1993 | Weaver et al. |
| 5,342,702 A | 8/1994 | MacGregor |
| 5,593,886 A | 1/1997 | Gaddy |
| 5,807,722 A | 9/1998 | Gaddy |
| 5,821,111 A | 10/1998 | Grady et al. |
| 6,187,565 B1 | 2/2001 | Weaver |
| 6,340,581 B1 | 1/2002 | Gaddy |
| 6,506,389 B2 | 1/2003 | Leer et al. |
| 7,285,402 B2 | 10/2007 | Gaddy et al. |
| 7,687,091 B2 | 3/2010 | Moen et al. |
| 7,776,124 B2 | 8/2010 | Binder et al. |
| 7,955,833 B2 | 6/2011 | Reiter et al. |
| 8,093,045 B2 | 1/2012 | Pla et al. |
| 8,236,522 B2 | 8/2012 | Bauer et al. |
| 8,440,408 B2 | 5/2013 | Grillberger et al. |
| 9,011,949 B2 | 4/2015 | Brown et al. |
| 9,085,785 B2 | 7/2015 | Reed et al. |
| 9,157,058 B2 | 10/2015 | Dalla-Betta et al. |
| 9,506,086 B2 | 11/2016 | Jannson et al. |
| 9,556,462 B2 | 1/2017 | Reed et al. |
| 9,700,067 B2 | 7/2017 | Fraser et al. |
| 9,737,875 B2 | 8/2017 | Brown et al. |
| 9,808,029 B2 | 11/2017 | Fraser et al. |
| 9,826,772 B2 | 11/2017 | Fraser et al. |
| 9,833,768 B2 | 12/2017 | Brown et al. |
| 9,879,290 B2 | 1/2018 | Kurek et al. |
| 9,938,327 B2 | 4/2018 | Shankar et al. |
| 9,943,096 B2 | 4/2018 | Fraser et al. |
| 9,957,534 B2 | 5/2018 | Kurek et al. |
| 10,039,306 B2 | 8/2018 | Vrljic et al. |
| 10,087,434 B2 | 10/2018 | Kale et al. |
| 10,093,913 B2 | 10/2018 | Kale et al. |

(Continued)

FOREIGN PATENT DOCUMENTS

| | | |
|---|---|---|
| CA | 2255212 A1 | 6/1999 |
| CL | 2018002647 A1 | 4/2019 |

(Continued)

OTHER PUBLICATIONS

Akdogan. High moisture food extrusion. International Journal of Food Science and Technology 1999, 34, 195-207.
Bohrer. An investigation of the formulation and nutritional composition of modern meat analogue products. Food Science and Human Wellness 8 (2019) 320-329. Available online Nov. 22, 2019.
Bongers. Energy Generation and Utilization in Hydrogen Bacteria. Journal of Bacteriology, vol. 104, No. 1, pp. 145-151 (Oct. 1970).
Bringel et al. Extent of Genetic Lesions of the Arginine and Pyrimidine Biosynthetic Pathways in Lactobacillus plantarum, L. paraplantarum, L. pentosus, and L. casei: Prevalence of CO2-Dependent Auxotrophs and Characterization of Deficient arg Genes in L. plantarum. Appl Environ Microbiol. May 2003; 69(5): 2674-2683.
Cheftel et al. New protein texturization processes by extrusion cooking at high moisture levels. Food Reviews International, 8:2, pp. 235-275 (1992).

(Continued)

*Primary Examiner* — Erik Kashnikow
*Assistant Examiner* — Assaf Zilbering
(74) *Attorney, Agent, or Firm* — Wilson Sonsini Goodrich & Rosati

(57) ABSTRACT

Food products are provided in which microbial protein sources, such as single cell protein or protein hydrolysis products, are incorporated. Artificial meat products are provided that include microbial protein in place of animal protein.

14 Claims, No Drawings

(56) References Cited

U.S. PATENT DOCUMENTS

| | | |
|---|---|---|
| 10,172,380 B2 | 1/2019 | Varadan et al. |
| 10,172,381 B2 | 1/2019 | Vrljic et al. |
| 10,273,492 B2 | 4/2019 | Shankar et al. |
| 10,287,568 B2 | 5/2019 | Kale et al. |
| 10,314,325 B2 | 6/2019 | Fraser et al. |
| 10,327,464 B2 | 6/2019 | Fraser et al. |
| 10,696,941 B2 | 6/2020 | Dalla-Betta et al. |
| 10,863,761 B2 | 12/2020 | Brown et al. |
| 11,013,250 B2 | 5/2021 | Vrljic et al. |
| 11,219,232 B2 | 1/2022 | Fraser et al. |
| 11,224,241 B2 | 1/2022 | Fraser et al. |
| 11,466,246 B2 | 10/2022 | Dyson et al. |
| 12,059,006 B2 | 8/2024 | Brooks et al. |
| 2001/0018048 A1 | 8/2001 | Leer et al. |
| 2002/0040871 A1 | 4/2002 | Garcia et al. |
| 2003/0003528 A1 | 1/2003 | Brzostowicz et al. |
| 2003/0022364 A1 | 1/2003 | Parent et al. |
| 2003/0087234 A1 | 5/2003 | Heumann |
| 2003/0134822 A1 | 7/2003 | Maekawa et al. |
| 2004/0078846 A1 | 4/2004 | Desouza et al. |
| 2004/0203134 A1 | 10/2004 | Pyntikov et al. |
| 2006/0286205 A1 | 12/2006 | Fichtali et al. |
| 2008/0022593 A1 | 1/2008 | Gur et al. |
| 2008/0107793 A1 | 5/2008 | Tanaka et al. |
| 2008/0193987 A1 | 8/2008 | Mantelatto et al. |
| 2009/0117194 A1 | 5/2009 | Burja et al. |
| 2009/0130706 A1 | 5/2009 | Berzin et al. |
| 2009/0142322 A1 | 6/2009 | Ye |
| 2009/0191593 A1 | 7/2009 | Burk et al. |
| 2009/0291188 A1 | 11/2009 | Milne et al. |
| 2010/0093860 A1 | 4/2010 | Boon et al. |
| 2010/0189864 A1 | 7/2010 | Marsland |
| 2010/0235934 A1 | 9/2010 | Friedman et al. |
| 2011/0020884 A1 | 1/2011 | Latouf et al. |
| 2011/0027181 A1 | 2/2011 | Amodei et al. |
| 2011/0034218 A1 | 2/2011 | Sung et al. |
| 2012/0015413 A1 | 1/2012 | Sichwart et al. |
| 2012/0084886 A1 | 4/2012 | Lopez-Cervantes et al. |
| 2012/0128851 A1 | 5/2012 | Brooks et al. |
| 2013/0032362 A1 | 2/2013 | Rylander |
| 2013/0078690 A1 | 3/2013 | Reed |
| 2013/0089899 A1 | 4/2013 | Kurek et al. |
| 2013/0149755 A1 | 6/2013 | Reed et al. |
| 2014/0029916 A1 | 1/2014 | Dhawan et al. |
| 2014/0271994 A1 | 9/2014 | Smittle et al. |
| 2014/0329309 A1 | 11/2014 | Bongiomi et al. |
| 2015/0037853 A1 | 2/2015 | Fischer et al. |
| 2015/0044327 A1 | 2/2015 | Feinberg et al. |
| 2016/0073671 A1 | 3/2016 | Geistlinger et al. |
| 2016/0297458 A1 | 10/2016 | Chuchvara et al. |
| 2016/0340411 A1 | 11/2016 | Fraser et al. |
| 2017/0016330 A1 | 1/2017 | Yaakoby |
| 2017/0023110 A1 | 1/2017 | Oledzki et al. |
| 2017/0035076 A1 | 2/2017 | Geistlinger et al. |
| 2017/0106330 A1 | 4/2017 | Gebald et al. |
| 2017/0112175 A1 | 4/2017 | Fraser et al. |
| 2017/0130211 A1 | 5/2017 | Bradshaw et al. |
| 2017/0137969 A1 | 5/2017 | Cory et al. |
| 2017/0188612 A1 | 7/2017 | Varadan et al. |
| 2017/0295833 A1 | 10/2017 | Fraser et al. |
| 2017/0342132 A1 | 11/2017 | Fraser et al. |
| 2017/0369922 A1 | 12/2017 | Olsson et al. |
| 2018/0016779 A1 | 1/2018 | Courson |
| 2018/0169153 A1 | 6/2018 | Berry et al. |
| 2019/0000124 A1 | 1/2019 | Sefton et al. |
| 2019/0133162 A1 | 5/2019 | Varadan et al. |
| 2019/0133163 A1 | 5/2019 | Varadan et al. |
| 2019/0390158 A1 | 12/2019 | Dyson et al. |
| 2020/0060308 A1 | 2/2020 | Manchuliantsau et al. |
| 2020/0060309 A1 | 2/2020 | Calleja et al. |
| 2020/0165733 A1 | 5/2020 | Reed et al. |
| 2020/0216797 A1 | 7/2020 | Dyson et al. |
| 2020/0236973 A1 | 7/2020 | Bigeard et al. |
| 2021/0070842 A1 | 3/2021 | Fraser et al. |
| 2021/0084940 A1 | 3/2021 | Schlebusch |
| 2021/0289824 A1 | 9/2021 | Brown et al. |
| 2021/0392908 A1 | 12/2021 | Reed et al. |
| 2021/0395677 A1 | 12/2021 | Reed et al. |
| 2023/0101863 A1 | 3/2023 | Robertson et al. |

FOREIGN PATENT DOCUMENTS

| | | | |
|---|---|---|---|
| CL | 2019002160 A1 | 5/2020 | |
| CL | 2022000064 A1 | 10/2022 | |
| CL | 2022001785 A1 | 3/2023 | |
| CL | 2022001994 A1 | 4/2023 | |
| CL | 2022002382 A1 | 4/2023 | |
| CL | 2022002385 A1 | 4/2023 | |
| CN | 101808534 A | 8/2010 | |
| CN | 104955945 A | 9/2015 | |
| CN | 105050414 A | 11/2015 | |
| CN | 105745332 A | 7/2016 | |
| CN | 106455626 A | 2/2017 | |
| CN | 106686987 A | 5/2017 | |
| CN | 109154006 A | 1/2019 | |
| CN | 110678539 A | 1/2020 | |
| DE | 2160478 A1 | 6/1972 | |
| EP | 131220 A2 | 1/1985 | |
| EP | 0212292 A1 | 3/1987 | |
| EP | 1264895 A1 | 12/2002 | |
| EP | 2135939 A1 | 12/2009 | |
| EP | 2264142 A2 | 12/2010 | |
| EP | 3628173 A1 | 4/2020 | |
| EP | 3816293 A1 | 5/2021 | |
| FI | 129711 B | 7/2022 | |
| FI | 129784 B | 8/2022 | |
| GB | 1059861 A | 2/1967 | |
| JP | 54119091 A | 9/1979 | |
| JP | 06169783 A | 6/1994 | |
| JP | 7163363 A | 6/1995 | |
| JP | 2516154 B2 | 7/1996 | |
| JP | 2912684 B2 | 6/1999 | |
| JP | 2002338443 A | 11/2002 | |
| JP | 2004051920 A | 2/2004 | |
| JP | 2010273683 A | 12/2010 | |
| JP | 2013542710 A | 11/2013 | |
| JP | 2016502867 A | 2/2016 | |
| JP | 2017509349 A | 4/2017 | |
| JP | 2019517775 A | 6/2019 | |
| KR | 2003020766 A | 3/2003 | |
| KR | 2004051920 A | 2/2004 | |
| KR | 20180134906 A | 12/2018 | |
| WO | 98/00558 A1 | 1/1998 | |
| WO | WO-9957246 A1 | 11/1999 | |
| WO | WO-0003000 A2 | 1/2000 | |
| WO | 02/08438 A2 | 1/2002 | |
| WO | WO-2004005493 A1 | 1/2004 | |
| WO | WO-2004078955 A1 | 9/2004 | |
| WO | 2005/001981 A2 | 1/2005 | |
| WO | 2009/009388 A2 | 1/2009 | |
| WO | 2009/058028 A1 | 5/2009 | |
| WO | 2009/113853 A2 | 9/2009 | |
| WO | 2011/014953 A1 | 2/2011 | |
| WO | 2011/056183 A1 | 5/2011 | |
| WO | 2011/112695 A1 | 9/2011 | |
| WO | 2011/139804 A2 | 11/2011 | |
| WO | WO-2012030217 A2 | 3/2012 | |
| WO | WO-2012148769 A1 | 11/2012 | |
| WO | 2013/090769 A2 | 6/2013 | |
| WO | 2013/148348 A1 | 10/2013 | |
| WO | WO-2013186348 A1 | 12/2013 | |
| WO | 2014/145194 A2 | 9/2014 | |
| WO | 2015/027209 A2 | 2/2015 | |
| WO | WO-2015038796 A2 | 3/2015 | |
| WO | 2015/177800 A2 | 11/2015 | |
| WO | WO-2016044423 A1 * | 3/2016 | ............ A23J 3/227 |
| WO | 2017/015321 A1 | 1/2017 | |
| WO | WO-2017019125 A1 | 2/2017 | |
| WO | 2017/165244 A1 | 9/2017 | |
| WO | 2018/144965 A1 | 8/2018 | |
| WO | WO-2018162346 A1 | 9/2018 | |
| WO | WO-2019070602 A1 | 4/2019 | |
| WO | WO-2019246066 A1 | 12/2019 | |
| WO | WO-2020222239 A1 | 11/2020 | |

(56) References Cited

FOREIGN PATENT DOCUMENTS

| WO | WO-2020232347 A1 | 11/2020 |
|---|---|---|
| WO | WO-2020240095 A1 | 12/2020 |
| WO | 2021/055366 A1 | 3/2021 |
| WO | WO-2021084159 A1 | 5/2021 |
| WO | 2021/138482 A1 | 7/2021 |
| WO | 2021/151025 A1 | 7/2021 |
| WO | 2021/178254 A1 | 9/2021 |
| WO | 2021/195259 A1 | 9/2021 |
| WO | WO-2021174226 A1 | 9/2021 |
| WO | WO-2021240315 A1 | 12/2021 |
| WO | WO-2022229500 A1 | 11/2022 |
| WO | WO-2022229503 A1 | 11/2022 |
| WO | WO-2023278301 A1 | 1/2023 |
| WO | WO-2023278306 A1 | 1/2023 |
| WO | WO-2023278317 A1 | 1/2023 |
| WO | WO-2023278557 A1 | 1/2023 |
| WO | WO-2024118522 A1 | 6/2024 |

OTHER PUBLICATIONS

Chen et al. System parameters and product properties response of soybean protein extruded at wide moisture range. Journal of Food Engineering 96 (2010) 208-213. Available online Jul. 25, 2009.
Ciani, et al. Microbes: Food for the Future. Foods. vol. No. 10, Issue No. 5 (2021): 13 Pages.
Co-pending U.S. Appl. No. 18/520,471, inventors Bachman; Louisa Cook et al., filed Nov. 27, 2023.
Database GNPD [Online] Mintel; Nov. 6, 2019 (Nov. 6, 2019), anonymous: "Vegan Breaded Fillets", XP093098385, Database accession No. 7008709. 4 pages.
Database Gnpd [Online] Mintel; Oct. 9, 2019 (Oct. 9, 2019), anonymous: "Vegetarian Ham Slices", XP093098387, Database accession No. 6937941. 2 pages.
Diels et al. High-Pressure Homogenization as a Non-Thermal Technique for the Inactivation of Microorganisms. Critical Reviews in Microbiology, 32:201-216, 2006.
El Abbadi ,S H, et al., "Engineering the Dark Food Chain," Environmental Science & Technology, vol. 53, No. 5, (Mar. 5, 2019), pp. 2273-2287.
EP20910909.9 Extended European Search Report dated Nov. 27, 2023.
Fei et al. Effective recovery of poly-β-hydroxybutyrate (PHB) biopolymer from Cupriavidus necator using a novel and environmentally friendly solvent system. Biotechnol Prog. May 2016;32(3):678-85. Epub Mar. 2, 2016.
Foster, et al. A Continuous Culture Apparatus for the Microbial Utilization of Hydrogen Produced by Electrolysis of Water in Closed-Cycle Space System. Biotechnology and Bioengineering, vol. 6 (1964): 16 Pages.
Franek. Oligopeptides as External Molecular Signals Affecting Growth and Death in Animal Cell Cultures. In Protein Hydrolysates in Biotechnology, Pasupuleti and Demain, Eds., 2010, Springer, pp. 79-88.
Hanko, et al. Biosensor-informed Engineering of Cupriavidus Necator H16 for Autotrophic D-Mannitol Production. Metabolic Engineering. vol. No. 72 (2022): 11 Pages.
Huijgen et al. Carbon dioxide sequestration by mineral carbonation. Literature Review. 2003. Retrieved at URL: https://www.researchgate.net/profile/Wouter-Huijgen/publication/40111028_Carbon_Dioxide_Sequestration_by_Mineral_Carbonation/links/0046352f9fdd070ac0000000/Carbon-Dioxide-Sequestration-by-Mineral-Carbonation.pdf ?_tp=eyJjb250ZXh0Ijp7ImZpcnN0UGFnZSI6Il9kaXJlY3QiLCJwYWdljoicHVibGljYXRpb24iLCJwcmV2aW91c1BhZ2UiOiJfZGlyZWN0In19. 52 pages.
International Search Report and Written Opinion in corresponding International Application No. PCT/US2021/23949, mailed Aug. 26, 2021.
International Search Report for PCT/US2021/020147 dated Jun. 29, 2021.
International Search Report for PCT/US2022/035092 dated Nov. 30, 2022.
Kenny et al. Growth phase and growth medium effects on the peptidase activities of Lactobacillus helveticus. International Dairy Journal 13 (2003) 509-516.
Kunji et al. The proteolytic systems of lactic acid bacteria. Antonie Van Leeuwenhoek. 1996;70:187-221.
Lobo-Alfonso et al. Benefits and Limitations of Protein Hydrolysates as Components of Serum-Free Media for Animal Cell Culture Applications. In Protein Hydrolysates in Biotechnology, Pasupuleti and Demain, Eds., 2010, Springer, pp. 55-78.
Mersmann, A., et al., Packungskolonnen. Chem.-Ing.-Tech. 58(1):19-31 (1986). With English machine translation.
Mierau et al. Casein and Peptide Degradation in Lactic Acid Bacteria. Biotechnol Genet Eng Rev. 1997;14:279-301.
Misono et al. Purification, Crystallization and Properties of NADP+—Specific Glutamate Dehydrogenase from Lactobacillus fermentum. Agric Biol Chem 49(1):117-123 (1985).
Molskness et al. β-D-Phosphogalactoside Galactohydrolase of Lactic Streptococci. Applied Microbiology, vol. 25, No. 3, pp. 373-380 (Mar. 1973).
Morel et al. The prolyl aminopeptidase from Lactobacillus delbrueckii subsp. *bulgaricus* belongs to the alpha/beta hydrolase fold family. Biochimica et Biophysica Acta 1429 (1999) 501-505.
Moscicki ed. Extrusion-Cooking Techniques: Applications, Theory and Sustainability. Chapters 1-3, pp. 1-63. 2011. Wiley-VCH Verlag GmbH & KGaA.
Nasseri et al. Single Cell Protein: Production and Process. American Journal of Food Technology (13 pgs.) (2011).
Nippon Nogeikagaku Kaishi [Igarashi, Y.], Physiological properties of hydrogen oxidizing bacteria and their application. 61(10):1322-1325 (1987). With English machine translation.
Osen et al. High-Moisture Extrusion: Meat Analogues. Reference Module in Food Sciences (2016). 7 pages. http://dx.doi.org/10.1016/B978-0-08-100596-5.03099-7.
PCT/US2021/014795 International Search Report and Written Opinion dated Jun. 3, 2021.
PCT/US2022/035110 International Search Report and Written Opinion dated Sep. 14, 2022.
Plattner. Extrusion Techniques for Meat Analogues. Cereal Foods World, vol. 65, No. 4 (Jul.-Aug. 2020). 8 pages.
Poolman et al. Casein—breakdown by Lactococcus lactis. In: Faruk Bozoğlu, T., Ray, B. (eds) Lactic Acid Bacteria. NATO ASI Series, vol. 98 (1996). Springer, Berlin, Heidelberg. 24 pages.
Poolman et al. Relation of growth of *Streptococcus lactis* and *Streptococcus cremoris* to amino acid transport. J Bacteriol. Feb. 1988; 170(2): 700-707.
Salmiati et al. Recovery of Polyhydroxyalkanoates (PHAs) from Mixed Microbial Cultures by Simple Digestion and Saponification. Malaysia: University Teknology, Institute of Environmental and Water Resource Management, pp. 8-15 (2009). Retrieved at URL: https://www.researchgate.net/profile/Gustaf-Olsson/publication/237489392_Recovery_of_Polyhydroxyalkanoates_PHAs_from_Mixed_Microbial_Cultures_by_Simple_Digestion_and_Saponification/links/0046352b7ecfc5f4ce000000/Recovery-of-Polyhydroxyalkanoates-PHAs-from-Mixed-Microbial-Cultures-by-Simple-Digestion-and-Saponification.pdf.
Spearman et al. The bioactivity and fractionation of peptide hydrolysates in cultures of CHO cells. Biotechnol Prog. May-Jun. 2014;30(3):584-93. Epub May 28, 2014.
Sung et al. Yeast hydrolysate as a low-cost additive to serum-free medium for the production of human thrombopoietin in suspension cultures of Chinese hamster ovary cells. Appl Microbiol Biotechnol . Feb. 2004;63(5):527-36. Epub Jul. 11, 2003.
U.S. Appl. No. 17/362,990 Office Action dated Sep. 18, 2023.
Vachon et al. Inactivation of Foodborne Pathogens in Milk Using Dynamic High Pressure. Journal of Food Protection, vol. 65, No. 2, pp. 345-352 (2002).
Van De Velde et al. Destruction of microorganisms and toxins by extrusion-cooking. In Thermal Processing and Quality of Foods (Zeuthen et al, eds.), Elsevier Applied Science Publisher, London (1984): pp. 155-161.

(56) References Cited

OTHER PUBLICATIONS

Viniegra-Gonzalez et al. Lactic acid production by pure and mixed bacterial cultures. In: Wise DL (ed) Bioconversion Systems, CRC Press, Boca Raton, Florida, pp. 17-39 (1984).
Wahlund, T.M., et al., Bioconversion of CO2 to ethanol and other compounds. Preprints of Papers—American Chemical Society Division Fuel Chemistry 41:1403-1406 (1996).
Waslien, et al. Human Intolerance to Bacteria as Food. Nature. vol. No. 221, Issue No. 5175 (1969): 2 Pages.
Written Opinion for PCT/US2020/67555 mailed Apr. 6, 2021.
Written Opinion for PCT/US2021/020147 dated Jun. 29, 2021.
Written Opinion for PCT/US2022/035092 dated Nov. 30, 2022.
Written Opinion for PCT/US2022/35086 mailed Sep. 23, 2022.
Brigham, Christopher, et al. Manipulation of Ralstonia Eutropha Carbon Storage Pathways to Produce Useful Bio-based Products. Sub-cellular Biochemistry. vol. 64 (2012): pp. 343-366.
Coelho, Catarina, et al. The Crystal Structure of Cupriavidus Necator Nitrate Reductase in Oxidized and Partially Reduced States. J Mol Biol (2011) 408, 932-948.
EP21763853.5 Extended European Search Report dated Feb. 12, 2024.
Jian, Hui. Do you dare to eat artificial meat? Understand the things about artificial meat in one article, Website: Zhihu, Website: https://zhuanlan.zhihu.com/p/78598503?utm_id=0, (2019): 8 Pages. With machine translation.
PCT/US2023/081197 Invitation to Pay Additional Fees dated Feb. 8, 2024.
Tongwei Guan, ed. Microbiology, China Light Industry Press, pp. 110-112 (2018). With machine translation.
Decicco, B.T., Removal of Eutrophic Nutrients from Wastewater and their Bioconversion to Bacterial Single Cell Protein for Animal Feed Supplements Phase III, Water Resources Research Center, Apr. 1980.
Farrell, A., et al., Ethanol Can Contribute to Energy and Environmental Goals, Science 311:506-508, Jan. 27, 2006.
Feisthauer, S., et al., Differences of heterotrophic 13CO2 assimilation by Pseudomonas knackmussii strain B13 and Rhodococcus opacus 1CP and potential impact on biomarker stable isotope probing, Environmental Microbiology 10(6):1641-1651, 2008.
Ghose, T.K., et al., Advances in Biochemical Engineering, Chapter 6, Novel Energy and Carbon Sources, Springer-Verlag Berlin—Heidelberg, 1971.
Greife, et al., Nitrogen Metabolism in Broiler Chickens Consuming the Bacterial Strain Alcaligenes eutrophus, Animal Feed Science and Technology 5:241-253, 1980.
Henstra, A.M., et al., Microbiology of synthesis gas fermentation for biofuel production, Current Opinions in Biotechnology 18:200-206, 2007.
Hugler, M., et al., Evidence for Autotrophic CO2 Fixation via the Reductive Tricarboxylic Acid Cycle by Members of the epsilon Subdivision of Proteobacteria, Journal of Bacteriology 187(9):3020-3027, 2005.
Huijgen, W., et al., Carbon dioxide sequestration by mineral carbonation, Preprints of Papers: American Chemical Society, Division Fuel Chemistry, 41:1403-1406, 1996.
Ishizaki, A., et al., Batch culture of Alcaligenes eutrophus ATCC 176971 using recycled gas closed circuit culture system, Journal of Fermentation and Bioengineering 69(3):170-174, 1990.
Jannasch, H.W., et al., Geomicrobiology of Deep-Sea Hydrothermal Vents, Science 229:717-725, Aug. 23, 1985.
Jones, J., The Cativa Process for the Manufacture of Acetic Acid, Platinum Metals Rev 44(3):94-105, 2000.
Kasparkova, K., et al., Characterization of Low-Molecular Weight Collagen Hydrolysates Prepared by Combination of Enzymatic and Acid Hydrolysis, Journal of American Leather Chemists Association 104(2):46-51, 2009.
King, G., Molecular and Culture-Based Analyses of Aerobic Carbon Monoxide Oxidizer Diversity, Applied and Environmental Microbiology 69(12):7257-7265, 2003.

Klatte, S., et al., *Rhodococcus opacus* sp. *novl.*, An Unusual Nutritionally Versatile *Rhodococcus*-species, System Appl Microbiol 17:355-360, 1994.
Kunasundari, B., et al., Revisiting the Single Cell Protein Application of Cupriavidus necator H16 and Recovering Bioplastic Granules Simultaneously, PLOS ONE 8(10:e78528, Oct. 2013.
Lehmicke, L., et al., Organiztion of Genes Necessary fro Growth of the Hydrogen-Methanol Autotroph Xanthobacter sp. *Strai* H4-14 on Hydrogen and Carbon Dioxide, J Bacteriol 162(3):1244-1249, 1985.
Macler, B.A., et al., Hydrogen Formation in Nearly Stoichiometric Amounts from Glucose by a Rhodopseudomonas sphaeroides Mutant, Bacteriology 138(2):446-452, 1979.
Madigan, M., et al., Growth of the Photosynthetic Bacterium Rhodopsuedomonas capsulata Chemoautotrophically in Darkness with H2 as the Energy Source, Journal of Bacteriology 137(1):524-530, Jan. 1979.
Madigan, M., et al., Physiology of Dark Fermentative Growth of Rhodopseudomonas capsulata, Journal of Bacteriology 142(3):908-915, Jun. 1980.
Manninen, A.H., Protein Hydrolysates in Sports and Exercise: A Brief Review, Journal of Sports Science and Medicine, 3:60-63, 2004.
Matassa, S., et al., Resource recovery from used water: The manufacturing abilities of hydrogen-oxidizing bacteria, Water Research 68:467-478, 2015.
Mersmann, A., et al., PackungskoInnen, Chem.-Ing.-Tech. 58(1):19-31, 1986.
Miltner, A., et al., Non-phototrophic CO2 fixation by soil microorganisms, Plant and Soil 269:193-203, 2005.
Miura, A., et al., A Soluble NADH-Dependent Fumarate Reductase in the Reductive Tricarboxylic Acid Cycle of Hydrogenobacter thermophilus TK-6, Journal of Bacteriology 190(21)7170-7177, 2008.
Munoz, et al., Algal-bacterial processes for the treatment of hazardous contaminants: a review, Water Research 40(15):2799-1815, 2006.
Murugan, P., et al., A new biological recovery approach for PHA using mealwork, Tenebrio molitor, Journal of Biotechnology 239:98-105, 2016.
Nippon Nogeikagaku Kaishi 61(10):1322-1325, 1987.
Ong, S. Y., et al., An integrative study on biologically recovered polyhydroxyalkanaoates (PHAs) and simultaneous assessment of gut microbiome in yellow mealworm, Journal of Biotechnology 265:31-39, 2018.
Oren, A., Chemolithotrophy, Encylopedia of Life Sciences, John Wiley & Sons, Ltd., 2009.
Paoli, G.C., et al., Aerobic chemolithoautotrophic growth and RubisCO function in Rhodobacater capsulatus and a spontaneous gain of function mutant of Rhodobacter sphaeroides, Arch Microbiol 170:8-17, 1998.
Rapp, P., et al., Formation, Isolation and Characterization of Trehalose Dimycolates from Rhodococcus erythropilis Grown in n-Alkanes, Journal of General Microbiology 115:491-503, 1979.
Repaske, R., et al., Dense Autotrphic Culutures of Alcaligenes eutrophus, Applied and Environmental Microbiology 32(4):592-597, 1976.
Roth, M.S., The engine of the reef: photobiology of coral-algal synbiosis, Frontiers in Microbiology 5: Article 422, Aug. 22, 2014.
Schlegel, H.G., et al., The Production of Biomass from Hydrogen and Carbon Dioxide, Advances in Biochemical Engineering, 1:143-168, 1971.
Searchinger, T., et al., The great balancing act, World Resources Institute Working Paper, Washington, DC, 2013.
EP21774056.2 Extended European Search Report dated Apr. 3, 2024.
Kyriakopoulou, Konstantina, et al. Plant-Based Meat Analogues. Sustainable Meat Production and Processing. (2019): 103-126. Retrieved from URL: https://doi.org/10.1016/B978-0-12-814874-7.00006-7.
PCT/US2023/081197 International Search Report and Written Opinion dated Apr. 4, 2024.
U.S. Appl. No. 17/362,990 Office Action dated Mar. 18, 2024.

(56) References Cited

OTHER PUBLICATIONS

Fasihi et al., Journal of Cleaner Production 224 (2019) pp. 957-980.
Keith, D., et al., A Process for Capturing CO2 from the Atmosphere, Article, CellPress, (2018) Joule 2(8):1573-1594.
L. Bongers (1970) "Energy generation and utilization in hydrogen bacteria" Journal of bacteriology 104(1):145-151 (http://jb.asm.org/content/104/1/145.abstract).
Veers et al., Grand Challenges in the Science of Wind Energy, Review Summary, Science 366, 443 (2019) Oct. 25, 2019, 10 pages.
International Search Report in corresponding PCT Application No. PCT/US22/35086, mailed Sep. 23, 2022, 26 pages.
International Search Report in corresponding PCT Application No. PCT/US20/67555, mailed Apr. 6, 2021, 15 pages.
Shively, J., et al., Something from Almost Nothing: Carbon Dioxide Fixation in Chemoautotrophs, Annu. Rev. Microbiol. 52:19-230, 1998.
Storebakken, et al., Bacterial protein grown on natural gas in diets for Atlantic salmon, Salmo salar, in freshwater, Aquaculture 241(1-4):413-425, 2004.
Takeshita, T., et al., Studies on Dissolved Hydrogen Behavior in Autotrophic Culture of Alcaligenes eutrophus ATCC 17697, J. Fac. Kyushu Univ. 38(1-2):55-64, 1993.
Tanaka, K., et al., Production of Poly(D-3-Hydroxybutyrate) from CO2 H2, and O2 by High Cell Denisty Autotrophic Cultivation of Alcaligenes eutrophus, Biotechnology and Bioengineering 45:268-275, 1995.
Taub, F.B., Closed Ecological Systems, Annu. Rev. Ecol. Syst. 5:139-160, 1974.
NASA Ames Research Center, The Closed Life-Support System, Apr. 14-15, 1966, 229 pages.
Tokuda, H., et al., Effects of electrical pre-treatment on the hydrolysis of agricultural wastes, J. Brew. Soc . . . Japan 101(10):769-775, 2006.
Toyoda, K., et al., The role of two CbbRs in the transcriptional regulation of three ribulose-1,5-biphosphate carboxylase/oxygenase genes in Hydrogenovibrio marinus strain MH-110, Microbiology 151:3615-3625, 2005.
Turner, J., et al., Renewable hydrogen production, Int J Energy Res DOI:10.1002/er. 1372, 2007.
Volova, T.G., et al., Autotrophic synthesis of polyhydroxyalkanoates by the bacteria Ralstonia eutropha in the presence of carbon monoxide, Appl Microbiol Biotechnol 58:675-678, 2002.
Voss, I., et al., High cell density cultivation of Rhodococcus opacus for lipid production at a pilot-plant scale, Appl Microbiol Biotechnol 55:547-555, 2001.
Wahlund, T.M., et al., Bioconversion of CO2 to Ethanol and Other Compounds, Preprints of Papers—American Chemical Society Division Fuel Chemistry 41:1408-1406, 1996.
Walterman, M., et al., Rhodococcus opacus strain PD630 as a new source of high-value single-cell oil? Isolation and characterization of triacylglycerols and other storage lipids, Microbiology 146:1143-1149, 2000.
Watanabe, Y., et al., Microbial CO2 Fixation, Journal of the Agricultural Chemical Society of Japan, 61(10):1322-1325, 1987.
Yamamoto, M., et al., Role of two 2-oxoglutarate:ferredoxin oxidoreuctases in Hydrogenobacter thermophilus under aerobic and anaerobic conditions, FEMS Microbiol Lett 263:189-193, 2006.
U.S. Appl. No. 16/716,398 Office Action, filed Oct. 14, 2020.
U.S. Appl. No. 16/716,398 Office Action, filed Jan. 29, 2021.
Alvarez, H., et al., Formation of intracytoplasmic inclusions by Rhodococcus opacus strain PD630, Arch Microbiol 165:377-386, 1996.
Anderson, A.J., et al., Occurrence, Metabolism, Metabolic Role, and Industrial Uses of Bacterial Polyhydroxyalkanoates, Microbiological Reviews 54(4):450-472, 1990.
Barbir, F., PEM electrolysis for production of hydrogen from renewable energy sources, Solar Energy 78:661-669, 2005.
Barton, L.L., The Cell Wall Matrix, Structural and Functional Relationships in Prokaryotes, pp. 136-189, Springer, 2005.
Bligh, E.G., et al., A Rapid Method of Total Lipid Extraction and Purification, Canadian Journal of Biochemistry and Physiology 37(8):911-917, 1959.
Bogdahn, I., Agriculture-independent, sustainable, fail-safe and efficient food production by autotrophic single-cell protein, PeerJ PrePrints, https://dx.doi.org/10/7287/peerj.preprints. 1279v3, Sep. 17, 2015.
Bongers, L., Energy Generation and Utilization in Hydrogen Bacteria, Journal of Bacteriology 104(1):145-151, 1979.
Calloway, D.H., et al., Protein Quality of the Bacterium Hydrogenomonas eutropha, Applied Microbiology 17(1):176-178, 1969.
Calloway, D.H., et al., Investagation of the Nutritional Properties of Hydrogenomonas eutropha, Final Report to the National Aeronautics and Space Administration NGR 05-003-089, 1968.
Campbell, B.J., et al., Hydrogen isotopic fractionation in lipid biosynthesis by H2-consuming Desulfobacterium autotrophicum, Geochiica et Cosmochimica Acta 73:2744-2757, 2009.
Chang, C.C., et al., Hydrogenotrophic denitrification with immobilized Alcaligenes eutrophus for drinking water treatment, Bioresource Technology 69:53-58, 1999.
Chee, J.Y., et al., The Potential Applicataion of Cupriavidus necator as Polyhydroxy-alkanoates Producer and Single Cell Protein: A Review on Scientific, Cultural and Religious Perspectives, Applied Food Biotechnology 6(1):19-34, 2019.
Chung, S.Y., et al., Purification of form L2 RubisCO from a marine obligately autotrophic hydrogen-oxidizing bacterium, Hydrogenovibrio marinus strain MH-110, Fems Microbiology Letters 109, 49-54, 1993.
Decicco, B.T., Removal of Eutrophic Nutrients from Wastewater and their Bioconversion to Bacterial Single Cell Protein for Animal Feed Supplements Phase I, Water Resources Research Center, Nov. 1977.
Decicco, B.T., Removal of Eutrophic Nutrients from Wastewater and their Bioconversion to Bacterial Single Cell Protein for Animal Feed Supplements Phase I, Water Resources Research Center, Apr. 1979.
Siemensma, André, et al. Towards an understanding of how protein hydrolysates stimulate more efficient biosynthesis in cultured cells. Protein hydrolysates in biotechnology: 1-19 (1970).
U.S. Appl. No. 17/362,998 Office Action dated Sep. 4, 2024.
EP21743721.9 Extended European Search Report dated Jul. 9, 2024.
Okamoto, Yuta et al. Mammalian Cell Cultivation Using Nutrients Extracted from Microalgae. Biotechnology Progress 36(2):e2941, 1-9 (2020). Published online Dec. 9, 2019.
U.S. Appl. No. 17/362,990 Office Action dated Jul. 24, 2024.
U.S. Appl. No. 17/908,104 Restriction Requirement dated Nov. 14, 2024.
Co-pending U.S. Appl. No. 19/212,168, inventors Reed; John S. et al., filed on May 19, 2025.
Reedy, Charles J. et al. Development of a heme protein structure-electrochemical function database. Nucleic acids research 36(Database issue):D307-D313 (2008) Published online Oct. 11, 2007.
U.S. Appl. No. 17/362,990 Office Action dated Apr. 10, 2025.
U.S. Appl. No. 17/362,998 Office Action dated Jun. 16, 2025.
U.S. Appl. No. 17/908,104 Office Action dated Jun. 26, 2025.

* cited by examiner

HIGH PROTEIN FOOD COMPOSITIONS

CROSS-REFERENCE TO RELATED APPLICATIONS

This application is a continuation-in-part of PCT Application No. PCT/US2020/067555, filed Dec. 30, 2020, which claims the benefit of U.S. Provisional Application No. 62/956,110, filed on Dec. 31, 2019, both of which are hereby incorporated by reference herein in their entireties.

FIELD OF THE INVENTION

The present invention relates to novel protein compositions that are suitable for human consumption and which closely mimic the properties of meat and function as meat substitutes or artificial meat products.

BACKGROUND

Eating meat derived from animal sources is a part of everyday life for many people. Adverse impacts of a meat-based diet on human health and on the environment have been well documented. There is a growing consumer demand for alternative protein-rich foods that are not derived from animals but that provide similar textural and flavor characteristics of animal meat, without unhealthy components associated with meat, such as saturated fatty acids and cholesterol, and without the harmful environmental effects of animal agriculture.

BRIEF SUMMARY OF THE INVENTION

In accordance with the present invention, a microorganism, such as a chemoautotrophic microorganism, e.g., an oxyhydrogen microorganism, is grown in a bioreactor, e.g., in a culture growth medium in a bioreactor. In some embodiments, a gas composition is introduced into the bioreactor that contains a carbon and/or energy source for growth of a chemoautotrophic microorganism. In one embodiment, the gas composition comprises hydrogen, carbon dioxide, and oxygen for growth of an oxyhydrogen microorganism. Alternatively, the biomass may be grown heterotrophically using an organic carbon source, such as a sugar molecule, instead of gas feedstock. In one embodiment, the microorganism comprises *Cupriavidus necator*, such as, but not limited to, DSM 531 or DSM 541.

The biomass grown from this process may be harvested and processed into an artificial meat product, e.g., a meat analogue product, or another food product. The biomass may be initially processed into one or more protein products, including single cell protein (e.g., whole cell biomass), cell lysate, protein concentrate, protein isolate, protein extract, protein hydrolysate, free amino acids, peptides, oligopeptides, or combinations thereof. Such initial processing may comprise (1) freeing organic molecules (including at least a portion of proteins of the microorganism) from the microorganism cells through cellular excretion, secretion, or cell lysis; and (2) treating the freed organic molecules to break down the bonds between at least some of the proteins' amino acids to create peptides with a desired chain length (e.g., polypeptides, oligopeptides (peptides having 2-20 amino acids), or free amino acids). These protein products may then be processed into a food product, such as an artificial meat product.

In accordance with an embodiment, the protein product comprises any of about 50% to about 55%, about 55% to about 60%, about 60% to about 65%, about 65% to about 70%, about 70% to about 75%, about 75% to about 80%, about 80% to about 85%, about 85% to about 90%, about 90% to about 95%, about 95% to about 98%, at least about 50%, at least about 55%, at least about 60%, at least about 65%, at least about 70%, at least about 75%, at least about 80%, at least about 85%, at least about 90%, at least about 95%, or at least about 98% free amino acids. In accordance with an embodiment, the protein product comprises any of about 50% to about 55%, about 55% to about 60%, about 60% to about 65%, about 65% to about 70%, about 70% to about 75%, about 75% to about 80%, about 80% to about 85%, about 85% to about 90%, about 90% to about 95%, about 95% to about 98%, at least about 50%, at least about 55%, at least about 60%, at least about 65%, at least about 70%, at least about 75%, at least about 80%, at least about 85%, at least about 90%, at least about 95%, or at least about 98% oligopeptides. In accordance with an embodiment, the protein product comprises any of about 50% to about 55%, about 55% to about 60%, about 60% to about 65%, about 65% to about 70%, about 70% to about 75%, about 75% to about 80%, about 80% to about 85%, about 85% to about 90%, about 90% to about 95%, about 95% to about 98%, at least about 50%, at least about 55%, at least about 60%, at least about 65%, at least about 70%, at least about 75%, at least about 80%, at least about 85%, at least about 90%, at least about 95%, or at least about 98% polypeptides comprising 20 to 50 amino acids, or 21 to 50 amino acids. In accordance with an embodiment, the protein product comprises any of about 50% to about 55%, about 55% to about 60%, about 60% to about 65%, about 65% to about 70%, about 70% to about 75%, about 75% to about 80%, about 80% to about 85%, about 85% to about 90%, about 90% to about 95%, about 95% to about 98%, at least about 50%, at least about 55%, at least about 60%, at least about 65%, at least about 70%, at least about 75%, at least about 80%, at least about 85%, at least about 90%, at least about 95%, or at least about 98% polypeptides comprising 50 to 200 amino acids, or 51 to 200 amino acids. In accordance with an embodiment, the protein product comprises any of about 50% to about 55%, about 55% to about 60%, about 60% to about 65%, about 65% to about 70%, about 70% to about 75%, about 75% to about 80%, about 80% to about 85%, about 85% to about 90%, about 90% to about 95%, about 95% to about 98%, at least about 50%, at least about 55%, at least about 60%, at least about 65%, at least about 70%, at least about 75%, at least about 80%, at least about 85%, at least about 90%, at least about 95%, or at least about 98% polypeptides comprising 200 to 500 amino acids, or 201 to 500 amino acids. In accordance with an embodiment, the protein product comprises any of about 50% to about 55%, about 55% to about 60%, about 60% to about 65%, about 65% to about 70%, about 70% to about 75%, about 75% to about 80%, about 80% to about 85%, about 85% to about 90%, about 90% to about 95%, about 95% to about 98%, at least about 50%, at least about 55%, at least about 60%, at least about 65%, at least about 70%, at least about 75%, at least about 80%, at least about 85%, at least about 90%, at least about 95%, or at least about 98% polypeptides comprising less than 1000, 900, 800, 700, 600, 500, 400, 300, 200, or 100 amino acids. In accordance with an embodiment, the protein product comprises any of about 50% to about 55%, about 55% to about 60%, about 60% to about 65%, about 65% to about 70%, about 70% to about 75%, about 75% to about 80%, about 80% to about 85%, about 85% to about 90%, about 90% to about 95%, about 95% to about 98%, at least about 50%, at least about 55%, at least about 60%, at least about 65%, at least about 70%, at least about 75%, at least about 80%, at least about 85%, at least about 90%, at least about 95%, or at least about 98% of a combination of free amino acids, oligopeptides, and polypeptides having 20 to 50 amino acids, or 21 to 50 amino acids, wherein the ratio of free amino acids to oligopeptides to polypeptides having 20 to 50 amino acids, or 21 to 50 amino acids, is about 1:1:1, or about 0 to about 3:about 0 to about 3:about 0 to about 3, or about 3 to about 6:about 0 to about 3:about 0 to about 3, or about 0 to about 3:about 3 to about 6:about 0 to about 3, or about 0 to about 3:about 0 to about 3:about 3 to about 6, or about 3 to about 6:about 3 to about 6:about 0 to about 3, or about 3 to about 6:about 0 to about 3:about 3 to about 6, or about 0 to about 3:about 3 to about 6:about 3 to about 6, or about 3 to about 6:about 3 to about 6:about 3 to about 6, or about 3 to about 6:about 6 to about 9:about 0 to about 3:about 0 to about 3, or about 0 to about 3:about 6 to about 9:about 0 to about 3, or about 0 to about 3:about 0 to about 3:about 6 to about 9, or about 6 to about 9:about 6 to about 9:about 0 to about 3, or about 0 to about 3:about 6 to about 9:about 6 to about 9, or about 6 to about 9:about 0 to about 3:about 6 to about 9. In accordance with an embodiment, the protein product is free or essentially free of whole cells.

In accordance with an embodiment, the protein product is combined with other edible ingredients to form a food product, including an artificial meat product which mimics one or more physical characteristics and/or functional properties of meat, such as texture, flavor, aroma, and/or appearance. Such other ingredients may be selected from apple cider, apple cider vinegar, baking powder, baking soda, beans, beef, beet juice, beet powder, black pepper, brown sugar, butter, canola oil, caramel, carrot fiber, carrots, cashews, cheese, chicken, chocolate, citrus, citrus extract, coconut oil, condensed milk, dairy, egg, egg substitute, fish, flour, garbanzo bean, garlic powder, honey, liquid smoke, maple syrup, margarine, monosodium glutamate, mustard powder, oil, olive oil, onion powder, paprika, pork, potato, potato starch, rice flour, salt, sodium benzoate, soy (protein and/or oil), soy sauce, spices, *spirulina*, sugar, sunflower oil, tomato juice, tomato powder, tomato sauce, tomatoes, turmeric, vanilla, vinegar, vitamins and minerals, walnuts, water, wheat, wheat flour, wheat gluten, xanthan gum, yeast, and/or yeast extract.

In accordance with an embodiment, the protein product comprises at least about 5%, at least about 10%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, or at least about 85% of the artificial meat product on a dry basis, e.g., by weight on a dry basis.

DETAILED DESCRIPTION

The invention provides food products, such as artificial meat products, that include protein products derived from microorganisms.

Unless defined otherwise herein, all technical and scientific terms used herein have the same meaning as commonly understood by one of ordinary skill in the art to which this invention belongs. Singleton, et al., *Dictionary of Microbiology and Molecular Biology*, second ed., John Wiley and Sons, New York (1994), and Hale & Markham, The Harper Collins Dictionary of Biology, Harper Perennial, NY (1991) provide one of skill with a general dictionary of many of the terms used in this invention. Any methods and materials similar or equivalent to those described herein can be used in the practice or testing of the methods, systems, and compositions described herein.

The practice of the present invention will employ, unless otherwise indicated, conventional techniques of molecular biology (including recombinant techniques), microbiology, cell biology, and biochemistry, which are within the skill of the art. Such techniques are explained fully in the literature, for example, *Molecular Cloning: A Laboratory Manual*, second edition (Sambrook et al., 1989); *Oligonucleotide Synthesis* (M. J. Gait, ed., 1984; *Current Protocols in Molecular Biology* (F. M. Ausubel et al., eds., 1994); *PCR: The Polymerase Chain Reaction* (Mullis et al., eds., 1994); and *Gene Transfer and Expression: A Laboratory Manual* (Kriegler, 1990).

Numeric ranges provided herein are inclusive of the numbers defining the range.

Unless otherwise indicated, nucleic acids are written left to right in 5' to 3' orientation; amino acid sequences are written left to right in amino to carboxy orientation, respectively.

Definitions

"A," "an" and "the" include plural references unless the context clearly dictates, thus the indefinite articles "a", "an,", and "the" as used herein in the specification and in the claims, unless clearly indicated to the contrary, should be understood to mean "at least one."

The term "about" as used herein when referring to a measurable value such as an amount, a temporal duration, and the like, is meant to encompass variations of ±5%, ±1%, or ±0.1% from the specified value, as such variations are appropriate to perform the disclosed methods or in connection with a disclosed composition.

"Acetogen" refers to a microorganism that generates acetate and/or other short chain organic acids up to C4 chain length as a product of anaerobic respiration.

"Acidophile" refers to a type of extremophile that thrives under highly acidic conditions (usually at pH 2.0 or below).

The term "amino acid" refers to a molecule containing both an amine group and a carboxyl group that are bound to a carbon, which is designated the alpha-carbon. Suitable amino acids include, without limitation, both the D- and L-isomers of the naturally occurring amino acids, as well as non-naturally occurring amino acids prepared by organic synthesis or other metabolic routes. In some embodiments, a single "amino acid" might have multiple sidechain moieties, as available per an extended aliphatic or aromatic backbone scaffold. Unless the context specifically indicates otherwise, the term amino acid, as used herein, is intended to include amino acid analogs.

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The term "artificial meat" or "meat substitute" or "imitation meat" or "meat analogue" or "meat-like food product" as used herein refers to a food product that is not derived from an animal, or that contains a substantial amount of non-animal protein source, but has structure, texture, aesthetic qualities, and/or other properties comparable or similar to those of animal meat, including livestock (e.g., beef, pork), game (e.g., venison), poultry (e.g., chicken, turkey, duck), and/or fish or seafood substitutes/analogues. The term refers to uncooked, cooking, and cooked meat-like food product. These terms also encompass cultured meat products.

The term "biomass" refers to a material produced by growth and/or propagation of cells. Biomass may contain cells and/or intracellular contents as well as extracellular material, including, but not limited to, compounds secreted by a cell.

The term "bioreactor" or "fermenter" refers to a closed or partially closed vessel in which cells are grown and maintained. The cells may be, but are not necessarily, held in liquid suspension. In some embodiments, rather than being held in liquid suspension, cells may alternatively be grown and/or maintained in contact with, on, or within another non-liquid substrate including but not limited to a solid growth support material.

The term "carbon fixing" process, reaction or pathway refers to enzymatic reactions or metabolic pathways that convert forms of carbon that are gaseous under ambient conditions, including but not limited to $CO_2$, CO, and $CH_4$, into carbon-based biochemicals that are liquid or solid under ambient conditions, or which are dissolved into, or held in suspension in, aqueous solution.

"Carbon negative" refers a process that uses carbon from $CO_2$ that has been removed from the atmosphere via air-capture of $CO_2$ or via photosynthesis where the carbon is embodied in a solid, liquid, or dissolved product generated by the process.

"Carbon source" refers to the types of molecules from which a microorganism derives the carbon needed for organic biosynthesis.

"Carboxydotrophic" refers to microorganisms that can tolerate or oxidize carbon monoxide. In preferred embodiments a carboxydotrophic microorganism can utilize CO as a carbon source and/or as a source of reducing electrons for biosynthesis and/or respiration.

"Chemoautotrophic" refers to organisms that obtain energy by the oxidation of chemical electron donors by chemical electron acceptors and synthesize all the organic compounds needed by the organism to live and grow from carbon dioxide.

In the claims, as well as in the specification, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively.

A "consortium" refers herein to two or more different species or strains of microorganisms and/or multi-cellular organisms, which are grown together, for example, grown in co-culture in the same growth medium.

The term "culturing" refers to growing a population of cells, e.g., microbial cells, under suitable conditions for growth, in a liquid or solid medium.

The term "derived from" encompasses the terms "originated from," "obtained from," "obtainable from," "isolated from," and "created from," and generally indicates that one specified material finds its origin in another specified material or has features that can be described with reference to another specified material.

"Energy source" refers to either the electron donor that is oxidized by oxygen in aerobic respiration or the combination of electron donor that is oxidized and electron acceptor that is reduced in anaerobic respiration.

"Extremophile" refers to a microorganism that thrives in physically or geochemically extreme conditions (e.g., high or low temperature, pH, or high salinity) compared to conditions on the surface of the Earth or the ocean that are typically tolerated by most life forms found on or near the earth's surface.

The term "gasification" refers to a generally high temperature process that converts carbon-based materials into a mixture of gases including hydrogen, carbon monoxide, and carbon dioxide called synthesis gas, syngas or producer gas. The process generally involves partial combustion and/or the application of externally generated heat along with the controlled addition of oxygen and/or steam such that insufficient oxygen is present for complete combustion of the carbon-based material.

"Halophile" refers to a type of extremophile that thrives in environments with very high concentrations of salt.

"Heterotrophic" refers to organisms that cannot synthesize all the organic compounds needed by the organism to live and grow from carbon dioxide, and which must utilize organic compounds for growth. Heterotrophic organisms cannot produce their own food and instead obtain food and energy by taking in and metabolizing organic substances, such as plant or animal matter, i.e., rather than fixing carbon from inorganic sources such as carbon dioxide.

"Hydrogen-oxidizer" refers to a microorganism that utilizes reduced $H_2$ as an electron donor for the production of intracellular reducing equivalents and/or in respiration.

"Hyperthermophile" refers to a type of extremophile that thrives in extremely hot environments for life, typically about 60° C. (140° F.) or higher.

The term "knallgas" refers to the mixture of molecular hydrogen and oxygen gas. A "knallgas microorganism" is a microbe that can use hydrogen as an electron donor and oxygen as an electron acceptor in respiration for the generation of intracellular energy carriers such as Adenosine-5'-triphosphate (ATP). The terms "oxyhydrogen" and "oxyhydrogen microorganism" can be used synonymously with "knallgas" and "knallgas microorganism," respectively. Knallgas microorganisms generally use molecular hydrogen by means of hydrogenases, with some of the electrons donated from $H_2$ that is utilized for the reduction of $NAD^+$ (and/or other intracellular reducing equivalents) and some of the electrons from $H_2$ that is used for aerobic respiration. Knallgas microorganisms generally fix $CO_2$ autotrophically, through pathways including but not limited to the Calvin Cycle or the reverse citric acid cycle ["Thermophilic bacteria", Jakob Kristjansson, Chapter 5, Section III, CRC Press, (1992)].

The term "lipid" herein refers to one or more molecules (e.g., biomolecules) that include a fatty acyl group (e.g., saturated or unsaturated acyl chains). For example, the term lipids includes oils, phospholipids, free fatty acids, monoglycerides, diglycerides, and triglycerides.

The term "lysate" refers to the liquid containing a mixture and/or a solution of cell contents that result from cell lysis. In some embodiments, the methods described herein comprise a purification of chemicals or mixture of chemicals in a cellular lysate. In some embodiments, the methods comprise a purification of amino acids and/or protein in a cellular lysate.

The term "lysis" refers to the rupture of the plasma membrane and if present, the cell wall of a cell such that a significant amount of intracellular material escapes to the extracellular space. Lysis can be performed using electrochemical, mechanical, osmotic, thermal, or viral means. In some embodiments, the methods described herein comprise performing a lysis of cells or microorganisms as described herein in order to separate a chemical or mixture of chemicals from the contents of a bioreactor. In some embodiments, the methods comprise performing a lysis of cells or microorganisms described herein in order to separate an amino acid or mixture of amino acids and/or proteins from the contents of a bioreactor or cellular growth medium.

"Methanogen" refers to a microorganism that generates methane as a product of anaerobic respiration.

"Methylotroph" refers to a microorganism that can use reduced one-carbon compounds, such as but not limited to methanol or methane, as a carbon source and/or as an electron donor for their growth.

The terms "microorganism" and "microbe" mean microscopic single celled life forms.

The term "molecule" means any distinct or distinguishable structural unit of matter comprising one or more atoms, and includes for example hydrocarbons, lipids, polypeptides and polynucleotides.

"Oligopeptide" refers to a peptide that contains a relatively small number of amino-acid residues, for example, about 2 to about 20 amino acids.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

The term "organic compound" refers to any gaseous, liquid, or solid chemical compound that contains carbon atoms, with the following exceptions that are considered inorganic: carbides, carbonates, simple oxides of carbon, cyanides, and allotropes of pure carbon such as diamond and graphite.

"Peptide" refers to a compound (a polypeptide) consisting of two or more amino acids linked in a chain, the carboxyl group of each acid being joined to the amino group of the next by a bond of the type R—OC—NH—R', for example, about 2 amino acids to about 50 amino acids, or 21 amino acids to about 50 amino acids.

As used herein, the term "polynucleotide" refers to a polymeric form of nucleotides of any length and any three-dimensional structure and single- or multi-stranded (e.g., single-stranded, double-stranded, triple-helical, etc.), which contain deoxyribonucleotides, ribonucleotides, and/or analogs or modified forms of deoxyribonucleotides or ribonucleotides, including modified nucleotides or bases or their analogs. Because the genetic code is degenerate, more than one codon may be used to encode a particular amino acid, and the present invention encompasses polynucleotides which encode a particular amino acid sequence. Any type of modified nucleotide or nucleotide analog may be used, so long as the polynucleotide retains the desired functionality under conditions of use, including modifications that increase nuclease resistance (e.g., deoxy, 2'-O-Me, phosphorothioates, etc.). Labels may also be incorporated for purposes of detection or capture, for example, radioactive or nonradioactive labels or anchors, e.g., biotin. The term polynucleotide also includes peptide nucleic acids (PNA). Polynucleotides may be naturally occurring or non-naturally occurring. The terms "polynucleotide," "nucleic acid," and "oligonucleotide" are used herein interchangeably. Polynucleotides may contain RNA, DNA, or both, and/or modified forms and/or analogs thereof. A sequence of nucleotides may be interrupted by non-nucleotide components. One or more phosphodiester linkages may be replaced by alternative linking groups. These alternative linking groups include, but are not limited to, embodiments wherein phosphate is replaced by P(O)S ("thioate"), P(S)S ("dithioate"), (O)NR$_2$ ("amidate"), P(O)R, P(O)OR', CO or CH$_2$ ("formacetal"), in which each R or R' is independently H or substituted or unsubstituted alkyl (1-20 C) optionally containing an ether (—O—) linkage, aryl, alkenyl, cycloalkyl, cycloalkenyl or araldyl. Not all linkages in a polynucleotide need be identical. Polynucleotides may be linear or circular or comprise a combination of linear and circular portions.

As used herein, "polypeptide" refers to a composition comprised of amino acids and recognized as a protein by those of skill in the art. The conventional one-letter or three-letter code for amino acid residues is used herein. The terms "polypeptide" and "protein" are used interchangeably herein to refer to polymers of amino acids of any length. The polymer may be linear or branched, it may comprise modified amino acids, and it may be interrupted by non-amino acids. The terms also encompass an amino acid polymer that has been modified naturally or by intervention; for example, disulfide bond formation, glycosylation, lipidation, acetylation, phosphorylation, or any other manipulation or modification, such as conjugation with a labeling component. Also, included within the definition are, for example, polypeptides containing one or more analogs of an amino acid (including, for example, unnatural amino acids, etc.), as well as other modifications known in the art.

The term "precursor to" or "precursor of" is an intermediate towards the production of one or more of the components of a finished product.

"Producer gas" refers to a gas mixture containing various proportions of $H_2$, CO, and $CO_2$, and having heat value typically ranging between one half and one tenth that of natural gas per unit volume under standard conditions. Producer gas can be generated various ways from a variety of feedstocks, including gasification, steam reforming, or autoreforming of carbon-based feedstocks. In addition to $H_2$, CO, and $CO_2$, producer gases can contain other constituents including but not limited to methane, hydrogen sulfide, condensable gases, tars, and ash depending upon the generation process and feedstock. The proportion of $N_2$ in the mixture can be high or low depending whether air is used as an oxidant in the reactor or not and if the heat for the reaction is provided by direct combustion or through indirect heat exchange.

The term "producing" includes both the production of compounds intracellularly and extracellularly, including the secretion of compounds from the cell.

"Psychrophile" refers to a type of extremophile capable of growth and reproduction in cold temperatures, typically about 10° C. and lower.

The terms "recovered," "isolated," "purified," and "separated" as used herein refer to a material (e.g., a protein, nucleic acid, or cell) that is removed from at least one component with which it is naturally associated. For example, these terms may refer to a material that is substantially or essentially free from components which normally accompany it as found in its native state, such as, for example, an intact biological system.

The phrase "substantially free" or "essentially free" as to any given component means that such component is only present, if at all, in an amount that is a functionally insignificant amount, i.e., it does not significantly negatively impact the intended performance or function of any process or product. Typically, substantially free means less than about 1%, including less than about 0.5%, including less than about 0.1%, and also including zero percent, by weight of such component. The terms "substantially free" or "essentially free" shall me less than 1% of a component.

"Sulfur-oxidizer" refers to microorganisms that utilize reduced sulfur containing compounds including but not limited to $H_2S$ as electron donors for the production of intracellular reducing equivalents and/or in respiration.

"Syngas" or "Synthesis gas" refers to a type of gas mixture, which like producer gas contains $H_2$ and CO, but which has been more specifically tailored in terms of $H_2$ and CO content and ratio and levels of impurities for the synthesis of a particular type of chemical product, such as but not limited to methanol or fischer-tropsch diesel. Syngas generally contains $H_2$, CO, and $CO_2$ as major components, and it can be generated through established methods including: steam reforming of methane; or through gasification of any organic, flammable, carbon-based material, including but not limited to biomass, organic matter, or peat. The hydrogen component of syngas can be increased through the reaction of CO with steam in the water gas shift reaction, with a concomitant increase in $CO_2$ in the syngas mixture.

"Thermophile" refers to a type of extremophile that thrives at relatively high temperatures for life, typically about 45° C. to about 122° C.

"Wild-type" refers to a microorganism as it occurs in nature.

"Yield" refers to amount of a product produced from a feed material relative to the total amount of the substance that would be produced if all of the feed substance were converted to product. For example, yield of the product may be expressed as % of the product produced relative to a theoretical yield if 100% of the feed substance were converted to the product.

High Protein Food Products

In some embodiments, high protein food compositions are provided as well as methods of making the same. A "protein product" or "microbial protein product" (e.g., one or more of single cell protein, cell lysate, protein concentrate, protein isolate, protein extract, protein hydrolysate, free amino acids, peptides, oligopeptides, or combinations thereof), derived from one or more microorganisms described herein, may be processed or incorporated into a high-protein edible food composition for human and/or animal consumption. A food composition (food product) may be, for example, a food item, and/or a food ingredient, and/or a nutritional product, and/or an animal feed, and/or a pet food product. In some embodiments, the food composition may contain any of at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, or at least about 90% microbial protein product, as described herein, by weight, e.g., by weight on a dry weight basis.

In certain embodiments, the protein products as described herein are utilized in the production of a vegetarian or vegan food product. In certain embodiments, they are utilized in the production of an organic food product and/or pesticide-free and/or herbicide-free and/or fungicide-free and/or antibiotic-free and/or non-genetically modified (non-GMO) food product. In certain embodiments, they are utilized in a locally produced food product. In certain embodiments, they are utilized in a probiotic food product or in a prebiotic food product (e.g., prebiotic nutritional product).

Processes are provided for making a high protein food product, which includes one or more protein product from one or more microorganism as described herein. In certain embodiments, the food product has no animal protein or fats. In certain embodiments, the protein product(s) are incorporated into food products including, but not limited to, dairy products, dairy replacement products, meat products (including livestock, game, poultry, fish, or seafood products), meat replacement and/or imitation meat products (including imitation livestock, game, poultry, fish, or seafood products), bakery products, confections, health and protein bars, protein powders, sports and/or energy drinks, and/or protein shakes and/or smoothies. In certain embodiments, protein products are textured for incorporation into meat products and/or imitation meat products. In certain embodiments, the high protein ingredient can be used as a meat extender in beef patties.

In certain embodiments, a high protein food product as described herein does not include animal fats. In certain embodiments, it has a relatively high ratio of polyunsaturated fats to saturated fats. In certain embodiments, it has a high-quality protein content, roughly comparable to milk protein. In certain non-limiting embodiments, its amino acid content is substantially similar, very close, or identical to that recommended by the United Nations Food and Agriculture Organization as ideal. In certain embodiments, food products made using the protein products of the present invention represent healthy and/or low-calorie foods. In certain embodiments, the protein product has a bland flavor and/or a light cream color and/or easy dispersibility and/or a relatively high water absorption and/or relatively high fat adsorption. In certain embodiments, the protein product can be formed into fibers and/or thermally extruded and/or coagulated into a gel. In certain such non-limiting embodiments, gel coagulation occurs at pH falling in a range of about 3 to about 6 upon heating. In certain embodiments, one or more properties of the protein product makes it well suited for incorporation into food products, including but not limited to dairy products, dairy replacement products, meat products, meat replacement and/or imitation meat products, bakery products, confections, health and protein bars, protein powders, sports and/or energy drinks, and/or protein shakes and/or smoothies. In certain embodiments, the protein product is textured for incorporation into meat products and/or imitation meat products. In certain embodiments, the protein product can be used as a meat extender, for example, as a meat extender in beef patties. In certain non-limiting embodiments, roughly 30 parts of the protein product can be combined with 70 parts of meat, e.g., ground beef, and in other embodiments, roughly 10 parts of protein product per 90 parts meat, e.g., ground beef. In certain non-limiting embodiments, the protein product is combined with beef and/or other meat products in a ratio that conforms to the requirements set forth by the USDA and/or in accordance with regulations governing the National School Lunch Program (Type A School Lunch). In certain non-limiting embodiments, the protein product is included in a formulation having a combined protein equivalence ratio (PER) of around 2.6. In certain non-limiting embodiments, the water absorption and/or fat binding properties of the protein product aids in reducing shrinkage (fat and water loss) on cooking and/or enhances the moisture and texture of the cooked patty or other meat or food item.

In certain embodiments, protein product produced as described herein is included in a recipe and/or formulation along with one or more of the following ingredients: water; tomatoes; tomato juice; tomato sauce; beans; spices including but not limited to chili spice; seasoning; animal protein; beef; poultry (e.g., chicken, turkey, duck, goose); pork; fish; seafood; soy; wheat; flour; yeast; yeast extract; *spirulina*; margarine; butter; dairy; cheese; sugar; brown sugar; honey; egg; salt; vanilla; chocolate; baking soda; baking powder; condensed milk; and/or caramel. In certain embodiments said combined ingredients are subjected to one or more of hydrating; blending; mixing; beating; sifting; sprinkling; heating; cooking; frying; deep frying; baking; simmering; browning; boiling. In certain embodiments the said ingredients are fried at around 350° F. and/or are baked or cooked at around 375° F. to 450° F. In certain embodiments, the protein product is used as a meat extender or meat substitute in one or more of the following: patties; chili con carne; pizza toppings; ground beef; chicken nuggets; fish sticks. In certain embodiments as a meat extender and/or substitute, the protein product replaces about 50% or more than about 50% (e.g., any of at least about 50%, at least about 55%, at least about 60%, at least about 65%, at least about 70%, at least about 75%, or at least about 80%) of the meat ingredient in the food item, in other embodiments they replace less than 50% (e.g., any of less than about 45%, less than about 40%, less than about 35%, less than about 30%, less than about 25%, less than about 20%, less than about 15%, or less than about 10%).

In certain embodiments, the protein product ingredient imparts improved nutrition, water absorption, fat binding properties, texture, and/or eating qualities to a food product, such as a cereal based product. In certain embodiments, said protein product ingredient is used to fortify or is otherwise incorporated into a cereal based product. In certain said embodiments, said cereal based product is a breakfast cereal, cookie, cake, pie, brownie, muffin, or bread. In certain embodiments, the protein product is used as a replacement for milk proteins (e.g. sodium caseinate) and/or as a vitamin and/or mineral supplement in milk or dairy products. In certain such embodiments, the protein product ingredient is used in one or more of non-fat dried milk, powdered milk, or dairy type drinks, such as, but not limited to, instant breakfast mixes, or imitation dairy type drinks including but not limited to soy milk, rice milk, and almond milk. In certain embodiments, the protein product ingredient is used in nutritionally fortified (e.g., protein, vitamin, and/or mineral fortified) candies, deserts, or treats.

In some embodiments, protein product (e.g., one or more of single cell protein, cell lysate, protein concentrate, protein isolate, protein extract, protein hydrolysate, free amino acids, peptides, oligopeptides, or combinations thereof), derived from one or more microorganisms described herein, is processed to produce a food product or ingredient thereof, in a process that includes heating the protein product, optionally in combination with other ingredients such as, for example, plant-derived protein, under shearing agitation, followed by extrusion to produce a product of desired texture (e.g., chewy, crunchy, crispy, resists dispersion in water, etc.). In exemplary, non-limiting embodiments, an aqueous paste of protein product (for example, containing about 20% (w/w) to about 50% (w/w), about 20% (w/w) to about 40% (w/w), about 30% (w/w) to about 50% (w/w), about 20% (w/w) to about 35% (w/w) or about 35% (w/w) to about 50% (w/w) water), optionally in combination with plant-based materials such as vegetable protein (such as, for example, soybean meal, sesame meal, cottonseed meal, corn meal, wheat meal, and/or peanut meal), is heated to a temperature of about 150° F. to about 400° F., or about 225° F. to about 275° F., for about 10 seconds to about 300 seconds, applying a shearing force, optionally simultaneously with the heating, for example, with a shear rate of about 10 rpm to about 60 rpm and torque of about 200 to about 2,000 meter-grams, and extruding the heated and sheared protein product through a die to provide a shaped extrudate. Optionally, the extrudate is exposed to an oxygen-containing gas stream. In an embodiment, the oxygen-containing gas stream is an air stream (e.g., a dry air stream), for example, at a temperature of about 80° F. to about 212° F. for about 0.5 minutes to about 10 minutes.

In some embodiments, protein product (e.g., one or more of single cell protein, cell lysate, protein concentrate, protein isolate, protein extract, protein hydrolysate, free amino acids, peptides, oligopeptides, or combinations thereof), derived from one or more microorganisms described herein, is processed to produce a food product or ingredient thereof, in a process that includes combining the protein product with one or more additional protein source (such as, but not limited to, pea, rice, glutinous rice, wheat, gluten, soy, hemp, canola, insects, algae, and/or buckwheat), heating the mixture (e.g., at about 150° F. to about 400° F., and subjecting the mixture to a shearing force with an extruder to create a textured product with desired textural and/or functional characteristics (e.g., chewy, crunchy, crispy, resists dispersion in water, etc.).

In some embodiments, free amino acids are included, either as part of the protein product or supplemental to the protein product, to impart a desired flavor. In one non-limiting embodiment, glutamic acid is included, thereby imparting a umami flavor to the food product.

In some embodiments, for example, in a meat substitute or artificial meat product, a hydrogel, lipogel, and/or emulsion is included in the composition, for example, as an agent release system (e.g., for release of a coloring agent, a flavor agent, a fatty acid, a leavening agent, a gelling agent (e.g., bicarbonate (e.g., potassium bicarbonate), calcium hydroxide, and/or alginate (e.g., sodium or potassium alginate)), wherein the agent(s) may be released during cooking of the food product to simulate animal meat).

In some embodiments, a food product includes one or more plant protein source such as, but not limited to, pea, rice, glutinous rice, wheat, gluten, soy, hemp, canola, insects, algae, and/or buckwheat, in combination with a protein product produced by microorganisms as described herein (e.g., one or more of single cell protein, cell lysate, protein concentrate, protein isolate, protein extract, protein hydrolysate, free amino acids, peptides, oligopeptides, or combinations thereof), wherein the protein product imparts a flavor to the food composition, such as, for example, a meat-like flavor (including a livestock, game, poultry, or seafood meat-like flavor).

In some embodiments, a food product, for example, a meat substitute or artificial meat product, includes a heme compound, such as a heme-containing polypeptide. In one embodiment, the food product includes heme (e.g., heme-containing polypeptide) from the microorganism from which the protein product is derived. In certain such embodiments the said microorganism is a *Cupriavidus* microorganism, such as *Cupriavidus necator*.

In some embodiments, a meat substitute or artificial or imitation meat product (e.g., a livestock (e.g., beef, pork), game, poultry, fish, or seafood analogue product) includes a protein product produced by microorganisms as described herein (e.g., one or more of single cell protein, cell lysate, protein concentrate, protein isolate, protein extract, protein hydrolysate, free amino acids, peptides, oligopeptides, or combinations thereof). In some embodiments, the meat analogue product is a vegan product that does not contain any ingredients from animal sources. In some embodiments, an enhanced meat product which contains animal protein (e.g., a beef, poultry, pork, fish, seafood, or egg product, in which a portion of the product is a protein product ingredient produced by microorganisms as described herein (e.g., one or more of single cell protein, cell lysate, protein concentrate, protein isolate, protein extract, protein hydrolysate, free amino acids, peptides, oligopeptides, or combinations thereof)), is provided. For example, the protein product may be included as an extender in an enhanced meat product or in a meat analogue product, e.g., the protein product replaces any of at least about 10%, at least about 20%, at least about 30%, at least about 40%, at least about 50%, at least about 60%, or at least about 70% of the meat ingredient or an artificial or imitation meat ingredient (for example, a plant-based artificial or imitation meat analogue ingredient) to produce the enhanced meat product or meat analogue/imitation meat product, respectively. In some embodiments, the microorganisms are $CO_2$-grown or air-grown microorganisms, e.g., oxyhydrogen microorganisms. Nonlimiting examples of meat substitute products are provided in U.S. Pat. Nos. 10,327,464, 10,314,325, 10,287,568, 10,273,492, 10,172,380, 10,172,381, 10,093,913, 10,087,434, 10,039, 306, 9,943,096, 9,938,327, 9,833,768, 9,826,772, 9,808,029, 9,737,875, 9,700,067, and 9,011,949, which are incorporated by reference herein in their entireties.

In some embodiments, at least a portion, all, or substantially all of the protein product in a food product described herein, including but not limited to, a meat substitute or artificial meat product, includes protein product (e.g., one or more of single cell protein, cell lysate, protein concentrate, protein isolate, protein extract, protein hydrolysate, free amino acids, peptides, oligopeptides, or combinations thereof) derived from a *Cupriavidus* microorganism, such as, but not limited to, *Cupriavidus necator*, e.g., DSM 531 or DSM 541.

In some embodiments, at least a portion, all, or substantially all of the protein product in a food product described herein, including but not limited to, a meat substitute or artificial meat product, includes protein product (e.g., one or more of single cell protein, cell lysate, protein concentrate, protein isolate, protein extract, protein hydrolysate, free amino acids, peptides, oligopeptides, or combinations thereof) derived from a lactic acid bacterium, such as, but not limited to a *Lactococcus, Lactobacillus, Enterococcus, Streptococcus*, or *Pediococcus* bacterium. In some embodiments, the lactic acid bacterium is a Generally Recognized as Safe (GRAS) bacterium.

In some embodiments, at least a portion or all of the protein product in a food product described herein, including but not limited to, a meat substitute or artificial meat product, includes protein product (e.g., one or more of single cell protein, cell lysate, protein concentrate, protein isolate, protein extract, protein hydrolysate, free amino acids, peptides, oligopeptides, or combinations thereof) derived from a *Fusarium, Rhizopus*, or *Aspergillus* fungal microorganism, such as but not limited to, *Fusarium venenatum, Rhizopus oligosporus, Rhizopus oryzae, Aspergillus oryzae*, or *Aspergillus sojae*. In some embodiments, the fungal microorganism is a GRAS microorganism.

Engineering of chemoautotrophic, e.g., knallgas, microorganisms is described, for example, in U.S. Pat. No. 9,879,290, entitled INDUSTRIAL FATTY ACID ENGINEERING GENERAL SYSTEM FOR MODIFYING FATTY ACIDS, and in U.S. Pat. No. 9,506,086, entitled MICROORGANISMS FOR BIOSYNTHESIS OF LIMONENE ON GASEOUS SUBSTRATES, both of which are incorporated herein by reference in their entireties.

Use of knallgas microorganisms for the conversion of syngas, producer gas, or other $H_2$ and $CO_2$ and/or CO containing gas mixes in high energy density molecules is described in U.S. Pat. No. 9,085,785, entitled USE OF OXYHYDROGEN MICROORGANISMS FOR NON-PHOTOSYNTHETIC CARBON CAPTURE AND CONVERSION OF INORGANIC AND/OR C1 CARBON SOURCES INTO USEFUL ORGANIC COMPOUNDS, which is incorporated herein by reference in its entirety.

Use of chemotrophic microorganisms for the conversion of $CO_2$ into useful organic chemicals is described in PCT application no. WO2011/056183, entitled BIOLOGICAL AND CHEMICAL PROCESS UTILIZING CHEMOAUTOTROPHIC MICROORGANISMS FOR THE CHEMOSYNTHETIC FIXATION OF CARBON DIOXIDE AND/OR OTHER INORGANIC CARBON SOURCES INTO ORGANIC COMPOUNDS, AND THE GENERATION OF ADDITIONAL USEFUL PRODUCTS, which is incorporated herein by reference in its entirety.

Use of chemoautotrophic microorganisms for production of protein and other biomolecules is described in PCT Application Nos. WO2017/165244 and WO2018/144965, both of which are incorporated herein by reference in their entireties.

Use of chemoautotrophic microorganisms for production of proteins and other components of food products is described in PCT Application Nos. PCT/US21/14795, filed Jan. 22, 2021, PCT/US21/20147, filed Feb. 28, 2021, and PCT/US21/23949, filed Mar. 24, 2021, all of which are incorporated herein by reference in their entireties.

Meat Analogue Products

Artificial meat products are provided that resemble and/or have the flavor of animal meat (e.g., livestock, game, poultry, fish, or seafood meat). The artificial meat product contains protein product (e.g., one or more of single cell protein, cell lysate, protein concentrate, protein isolate, protein extract, protein hydrolysate, free amino acids, peptides, oligopeptides, or combinations thereof), derived from one or more microorganism as described herein, and simulates texture and/or physical characteristics of animal meat, such as, for example, flavor, aroma, texture, appearance, etc. In some embodiments, the protein product that is incorporated into the artificial meat product is produced by a GRAS microorganism.

In some embodiments, an artificial meat product includes at least about 10%, at least about 15%, at least about 20%, or at least about 25% by weight of microbial protein product as described herein, optionally bound together by one or more binding agents, to produce a food product that has one or more similar textural and/or functional characteristics in comparison to animal meat. In some embodiments, the artificial meat product resembles animal meat, for example, ground animal meat (e.g., ground beef, ground pork, ground turkey). In some embodiments, the artificial meat product is principally or entirely composed of ingredients derived from non-animal sources. In alternative embodiments, the artificial meat product is composed of ingredients partially derived from animal sources but supplemented with ingredients derived from non-animal sources. In some embodiments, the artificial meat product further includes one or more agent release systems and/or other ingredients. In various embodiments, artificial meat products herein may be sliced, cut, ground, shredded, grated, or otherwise processed, or left unprocessed. Examples of sliced forms include but are not limited to dried meats, cured meats, and sliced lunch or deli meats. In some embodiments, the artificial meat food products provided herein are shredded and then bound together, chunked and formed, ground and formed, or chopped and formed, for example, to produce a product similar in appearance and/or texture to animal jerky.

In some embodiments, the artificial meat products are vegan. In some embodiments, the artificial meat products comprise no GMO ingredients. In some embodiments, the artificial meat products comprise no ingredients derived from nuts. In some embodiments, the artificial meat products comprise less than about 0.6% or less than about 0.5% by weight of sodium. In some embodiments, the artificial meat products comprise less than about 850 mg, 500 mg, 400 mg, or 140 mg per 85 g serving, or less or comprise no or substantially no sodium. In some embodiments, the artificial meat products comprise less than about 10 g, less than about 5 g, less than about 3.5 g, or less than about 2.5 g fat per 85 g serving, e.g., less than about 6%, less than about 4% or less than about 3% by weight. In some embodiments, the meat-like food products comprise no gluten or substantially no gluten. In some embodiments, the meat-like food products comprise no soy or substantially no soy. In other embodiments, the meat-like food products comprise soy. In some embodiments, the meat-like food products comprise no pea or substantially no pea. In some embodiments, the meat-like food products comprise no artificial ingredients, such as, but not limited to, xanthan or methylcellulose.

In some embodiments, the artificial meat food product may contain any of at least about 2%, at least about 5%, at least about 10%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, or at least about 90%, or any of about 2% to about 5%, about 2% to about 10%, about 5% to about 10%, about 5% to about 20%, about 10% to about 40%, about 20% to about 50% about 40% to about 80%, or about 50% to about 90% microbial protein product, as described herein, by weight of the artificial meat product.

In some embodiments, the artificial meat food products provided herein comprise about 3% to about 6%, about 3% to about 30%, or about 5% to about 30% by weight of lipid, e.g., about 3% to about 10%, about 5% to about 10%, about 10% to about 15%, about 15% to about 20%, about 20% to about 30%, about 5% to about 15%, about 10% to about 20%, about 20% to about 30%, about 3% to about 15%, about 5% to about 15%, about 15% to about 30%, about 3% to about 25%, about 5% to about 25%, or about 10% to about 30% by weight of lipid.

In some embodiments, the lipid (including, but not limited to, fatty acids and/or oil) is produced by a microorganism, which may be the same as or different from the microorganism from which the protein product is derived. The microorganism may be grown in autotrophic culture conditions, heterotrophic culture conditions, or a combination of autotrophic and heterotrophic culture conditions, as described infra. In some embodiments, the lipid is produced by the microorganism from which the protein product is derived and is incorporated into the artificial meat product as a component of the protein product. In other embodiments, the lipid is produced by the microorganism from which the protein product is derived, and is isolated or extracted from the microorganism or from the protein product produced by the microorganism, and is then incorporated into the artificial meat product. In further embodiments, the lipid is produced by a different microorganism than the microorganism from which the protein product is derived (for example, produced by any of the microorganisms disclosed herein), and is isolated or extracted from this microorganism or a protein product thereof as described herein, and is then incorporated into the artificial meat product. Nonlimiting examples of lipid-producing microorganisms, such as chemoautotrophic microorganisms that produce lipids, and growth, production, and extraction of lipids thereof, are described in U.S. Pat. Nos. 9,085,785, 9,556,462, 9,879,290, and 9,957,534, and in U.S. Publication No. 2013/0078690, all of which are incorporated by reference herein in their entireties. In certain nonlimiting embodiments, the microorganism source of lipids is a *Rhodococcus* species (such as, but not limited to *Rhodococcus opacus*), e.g., DSM 44193, DSM 43205, DSM 43206, DSM 3346, or a *Cupriavidus* species (such as, but not limited to, *Cupriavidus necator* or *Cupriavidus metallidurans*), e.g., DSM 531, DSM 541, DSM 2839). Growth of chemoautotrophic microorganisms on gaseous carbon and/or energy sources is described in U.S. Pat. Nos. 9,085,785, 9,157,058, 9,556,462, 9,879,290, and 9,957,534, and 10,696,941, all of which are incorporated by reference herein in their entireties, and in U.S. Publication No. 2013/0078690, and in the disclosure herein, infra.

In some embodiments, the artificial meat products comprise about 0.5% to about 10% by weight of total carbohydrate, e.g., about 0.5% to about 1%, about 1% to about 5%, about 5% to about 10%, about 2% to about 8%, or about 3% to about 6% by weight of total carbohydrate.

In some embodiments, the artificial meat products comprise about 0.5% to about 5% by weight of edible fiber, e.g., about 0.5% to about 1%, about 1% to about 5%, about 5% to about 10%, about 2% to about 8%, or about 3% to about 6% by weight of edible fiber.

The artificial meat products provided herein comprise a moisture content (MC) of at least about 30%, at least about 40%, at least about 50%, at least about 60%, at least about 70%, at least about 80%, or at least about 90% by weight. In some embodiments, the artificial meat products comprise a similar MC as animal meat (e.g., livestock (e.g., beef, pork), game, poultry (e.g., chicken, turkey, duck), fish, or seafood (e.g, shrimp, crab, lobster, scallop).

In some embodiments, the artificial meat products comprise one or more coloring agents. In some embodiments, the artificial meat products comprise one or more color enhancers. In some embodiments, the meat-like food products comprise mixtures of two or more coloring agents, color stabilizers, and/or color enhancers. Non-limiting examples of such mixtures include beet extract and annatto, beet extract and turmeric, beet extract and saffron, beet extract and purple carrot, beet extract and grape seed extract, beet extract and tomato extract, beet extract and lycopene, beet extract and beta carotene, beet extract and anthocyanin, beet extract and anthocyanin and annatto, beet extract and annatto and lycopene, beet extract and ascorbic acid, anthocyanin and annatto, beet extract and annatto and ascorbic acid, beet extract and annatto and beta carotene, beet extract and turmeric and ascorbic acid, and anthocyanin and lycopene and annatto. In some such embodiments, the coloring agents, color stabilizers, and/or color enhancers are present at equal weight ratios. In other such embodiments, the coloring agents, color stabilizers, and/or color enhancers are present at unequal weight ratios (e.g., 55:45, 60:40, 65:35, 2:1, 70:30, 75:25, 80:20, 5:1, 85:15, 90:10, 20:1, 95:5, or 99:1). In some embodiments, the artificial meat products comprise browning agents, such as, but not limited to, pentose (e.g., ribose, arabinose, xylose), hexose (e.g., glucose, fructose, mannose, galactose), dextrins, and commercial browning agents (e.g., red arrow dextrose, wood-derived agents).

In some embodiments, an artificial meat product herein includes one or more plant protein source such as, but not limited to, pea, rice, glutinous rice, wheat, gluten, soy, hemp, canola, insects, algae, and/or buckwheat, in combination with a protein product produced by microorganisms as described herein, wherein the protein product imparts a meat-like flavor to the composition.

In some embodiments, an artificial meat product herein includes a heme compound, such as a heme-containing polypeptide. For example, the heme compound (e.g., heme-containing polypeptide) may be from the microorganism from which the protein product is derived. In certain such embodiments the heme compound is derived from a *Cupriavidus* microorganism, for example, *Cupriavidus necator*. In certain such embodiments the heme compound is a hemoglobin or flavohemoglobin.

A meat analogue product as described herein may include: one or more protein source (e.g. microbial protein product as described herein, and optionally, plant-based protein; one or more fats (e.g. plant-based oil, such as, but not limited to, sunflower, canola, coconut, palm, and/or vegetable oil); and/or microbially produced fat, lipid, and/or oil; one or more binding agents (e.g., carrageenan, gum cellulose, gum arabica, acacia gum, egg or milk protein, and/or starch); plant based or other sources of dietary fibers such as, but not limited to inulin, psyllium husk, citrus fibers, pea fiber, and/or hemp fiber, and one or more other ingredients, such as, but not limited to, spices and/or flavors (e.g., salt, spice(s), and/or aroma-producing compound(s)), vitamins (e.g., vitamin B12), and coloring agents. In some embodiments, the meat analogue product includes microbial protein product as described herein and one or more plant-based protein source, such as, but not limited to, protein from peas (e.g., pea protein isolate), mung beans, and/or fava beans, and/or protein from one or more of whey, soy, adzuki, chickpea, lupin, lentil seed, cashew nut, almond seed, walnut, peanut, wheat gluten, rice bran, oat, and seaweed (e.g., brown seaweed). In some embodiments, the meat analogue product includes microbial protein product as described herein and one or more plant-based protein source that is similar to the microbial protein product in one or more functional properties, such as oil holding capacity (OHC) (g/g), water holding capacity (WHC) (g/g), emulsion stability (min), foaming stability (%), foaming capacity (%), and gelation temperature (° C.), such as, but not limited to, protein from peas (e.g., pea protein isolate), mung beans, and/or fava beans.

In one embodiment, a chicken analogue composition contains: water; wheat gluten; microbial protein product as described herein, and optionally, plant-based protein; oil; salt; flavoring agents, spices (e.g., onion powder, garlic powder), seasonings (e.g., nutritional yeast). In another embodiment, a chicken analogue composition contains: water; wheat gluten; microbial protein product as described herein, and optionally, plant-based protein; oil; seasonings (e.g., nutritional yeast); flavoring agents, spices (e.g., onion powder, garlic powder); salt. In another embodiment, a chicken analogue composition contains: water; textured microbial protein product as described herein, and optionally, plant-based protein; oil; seasonings (e.g., nutritional yeast); flavoring agents, spices (e.g., onion powder, garlic powder); salt. In another embodiment, a chicken analogue composition contains: water; textured microbial protein product as described herein, and optionally, plant-based protein; oil; seasonings derived from processes utilizing hydrolysis of microbial proteins; flavoring agents, spices (e.g., onion powder, garlic powder); salt. In another embodiment, a seafood analogue composition contains: water; flour; binding agent; base; starch; microbial protein product as described herein, and optionally, plant-based protein. In another embodiment, a fish analogue composition contains: water; textured microbial protein product as described herein, and optionally, plant-based protein; first plant-derived oil, edible fiber, second plant-derived oil, filler/thickening agent, spices (e.g., onion powder, garlic powder); salt. It will be apparent to one of skill in the art that different ingredients may be substituted for those listed, additional ingredients may be added, listed ingredients may be deleted, and/or proportions of ingredients may be modified to achieve a desired texture, nutritional profile, and/or flavor of the meat analogue product. In some embodiments of any of the meat analogue products described herein, microbial protein product (e.g., textured microbial protein product) is the sole or main protein source in the product.

In some embodiments, a meat analogue product includes microbial protein product as described herein in combination with cultured meat (meat produced by in vitro culturing of animal cells). For example, a cultured meat product may include any of at least about 5%, 10%, 15%, 20%, 25%, 30%, 35%, 40%, 45%, 50%, 55%, 60%, 65%, 70%, 75%, 80%, 85%, or 90% microbial protein product as described herein (e.g., one or more of single cell protein, cell lysate, protein concentrate, protein isolate, protein extract, protein hydrolysate, free amino acids, peptides, oligopeptides, or combinations thereof), with the remainder cultured meat cells and other ingredients suitable for production of a meat analogue product, as described herein. In some embodiments, the microbial protein product, such as, but not limited to, a microbial protein hydrolysate, or one or more of single cell protein, cell lysate, protein concentrate, protein isolate, protein extract, protein hydrolysate, free amino acids, peptides, oligopeptides, or combinations thereof, includes components that improve the flavor of the cultured meat product. In certain embodiments, the protein product, e.g., microbial protein hydrolysate, or one or more of single cell protein, cell lysate, protein concentrate, protein isolate, protein extract, protein hydrolysate, free amino acids, peptides, oligopeptides, or combinations thereof, stimulates the development of flavor-enhancing elements in the cultured meat product. "Enhancing the flavor" of a food product, e.g., a meat analogue product, such as a cultured meat product, includes rendering the product more palatable, or imparting one or more flavor components that are found in the naturally-produced counterpart of the cultured product (i.e., in a meat product from the animal from which the cultured cells are derived). In some embodiments, the cultured meat product includes lipid (including, but not limited to, fatty acids and/or oil) from the protein product as described herein, from the same or different microorganism as described supra, from animal cells, or from a plant-based source.

Flavoring Agents

One or more flavoring agent may be included in a meat analogue product as described herein. For example, a flavoring agent or a combination of two or more flavoring agents may be included that are designed to mimic the natural flavor of a meat product, such as a beef, chicken, pork, fish, or seafood (e.g., shrimp, crab, lobster) product.

Precursors of meat flavor may include water soluble components (e.g., amino acids, peptides, carbohydrates, nucleotides, thiamine) and/or lipid or water insoluble components. In some embodiments, meat flavor precursors include free sugars, sugar phosphates, nucleotides, free amino acids, peptides, and/or thiamine. In some examples, hydrolysates produced from microbial protein products described herein may contain meat flavor precursors. In some embodiments, glutamic acids naturally produced during hydrolysis of microbial proteins may be favored for imparting a sweet umami flavor. In some embodiments, such amino acids may form part of a savory meaty flavor base. In some embodiments, enzymes such as glutaminase, exo/endo peptidases, proteases may be used to generate flavor precursors. In some embodiments, combinations of microbial protein hydrolysates with wheat gluten hydrolysates and enzymes such as glutaminase may result in kokumi flavors which impart a thickness, richness and mouthfulness. In some embodiments, these combinations may generate salty, sweet or umami properties. In other embodiments enzymes such as amino-terminal exopeptidases or carboxy-terminal exopeptidases or other enzymes such as papain with proteases may produce flavor or flavor precursors from microbial derived protein or protein hydrolysates.

Compounds such as 2-methyl-3-furanthiol, 2-furfurylthiol, methionol, 2,4,5-trimethyl-thiazole, nonanol, 2-trans-nonenal,2-furanmethanethiol, 3-methylthiopropanal. may be incorporated into or produced upon cooking of a meat analogue product as described herein, thereby imparting a meat like flavor to the product. In some embodiments, reaction of a sulfur containing amino acid such as cysteine generated from microbial protein product and a sugar in, results in production of 2-methyl-3-furanthiol, which imparts a meat like flavor, such as a chicken flavor In some embodiments, a protein product as described herein, for example, a protein hydrolysate and/or free amino acids, derived from one or more microorganisms, may be reacted with thiamine and one or more monosaccharide (e.g., ribose, xylose, arabinose, glucose) and/or polysaccharide to produce a flavoring agent that imparts a meat like flavor. In one embodiment, thiamine is reacted with xylose.

Carbon Negative Food Products

In some embodiments, a food product as described herein, such as a meat analogue product, is carbon negative. In certain embodiments, the protein utilized within the food product, e.g., meat analogue product, as described herein is carbon negative. In certain embodiments, a meat analogue product as described herein is produced in a carbon negative process. The carbon embodied within certain food products, e.g., meat analogues, described herein (e.g., carbon within protein product incorporated into the food product) may be derived from the $CO_2$ byproduct of anaerobic or aerobic fermentation of sugar molecules or other types of biological compounds. In certain such embodiments, the said $CO_2$ byproduct is captured from the fermentation of sugars to produce ethanol. The carbon embodied within certain food products, such as meat analogues, described herein may be derived from $CO_2$ captured directly from the atmosphere using direct air capture technologies. (See, e.g., Fasihi, M., Efimova, O., & Breyer, C. (2019) "Techno-economic assessment of CO2 direct air capture plants" https://doi.org/10.1016/j.jclepro.2019.03.086, which is incorporated by reference herein in its entirety)

In certain embodiments, the $CO_2$ is reduced using $H_2$ generated via electrolysis of water and/or the thermolytic splitting of water to produce protein and other nutrients that are incorporated into a meat analogue product as described herein. In certain such embodiments, the said splitting of water to produce $H_2$ is powered by renewable and/or low carbon emission energy technologies including but not limited to one or more of: photovoltaics, solar thermal, wind power, hydroelectric, nuclear, geothermal, enhanced geothermal, ocean thermal, ocean wave power, tidal power. In certain such embodiments, the levelized $CO_2$ emissions of the electrical power used in electrolysis is ≤300 gCO2eq/kWh; or ≤200 gCO2eq/kWh; or ≤100 gCO2eq/kWh; or ≤50 gCO2eq/kWh; or ≤45 gCO2eq/kWh; or ≤40 gCO2eq/kWh; or ≤30 gCO2eq/kWh; or ≤20 gCO2eq/kWh; or ≤15 gCO2eq/kWh; or ≤10 gCO2eq/kWh; or ≤7 gCO2eq/kWh; or ≤5 gCO2eq/kWh.

In certain embodiments of the present invention, the electrical, heat, and steam requirements of any dewatering, heating, or cooling steps used in the production of a meat analogue product as described herein are not met using natural gas or any other fossil fuel. In certain such embodiments, the said electrical requirements are met using one or more of the aforementioned renewable and/or low carbon emission energy technologies. In certain such embodiments, heat and steam requirements are generated using electrical power from one or more of the aforementioned renewable and/or low carbon emission energy technologies. In certain embodiments, heat and steam requirements are generated using one or more of the following heat sources: solar thermal power, geothermal power, biogas, or producer gas from gasification of biomass.

Protein Products

A protein product (e.g., one or more of single cell protein, cell lysate, protein concentrate, protein isolate, protein extract, protein hydrolysate, free amino acids, peptides, oligopeptides, or combinations thereof), is derived from and/or includes biomass and/or protein isolate, protein extract, protein hydrolysate, free amino acids, peptides, and/or oligopeptides derived from one or more microorganisms described herein.

In accordance with an embodiment, the protein product comprises about 50% to about 55%, about 55% to about 60%, about 60% to about 65%, about 65% to about 70%, about 70% to about 75%, about 75% to about 80%, about 80% to about 85%, about 85% to about 90%, about 90% to about 95%, about 95% to about 98%, at least about 75%, at least about 80%, at least about 85%, at least about 90%, at least about 95%, or at least about 98% amino acids, e.g., free amino acids. In accordance with an embodiment, the protein product comprises peptides that comprise about 50% to about 55%, about 55% to about 60%, about 60% to about 65%, about 65% to about 70%, about 70% to about 75%, about 75% to about 80%, about 80% to about 85%, about 85% to about 90%, about 90% to about 95%, about 95% to about 98%, at least about 50%, at least about 55%, at least about 60%, at least about 65%, at least about 70%, at least about 75%, at least about 80%, at least about 85%, at least about 90%, at least about 95%, or at least about 98% oligopeptides. In accordance with an embodiment, the protein product comprises peptides that comprise about 50% to about 55%, about 55% to about 60%, about 60% to about 65%, about 65% to about 70%, about 70% to about 75%, about 75% to about 80%, about 80% to about 85%, about 85% to about 90%, about 90% to about 95%, about 95% to about 98%, at least about 50%, at least about 55%, at least about 60%, at least about 65%, at least about 70%, at least about 75%, at least about 80%, at least about 85%, at least about 90%, at least about 95%, or at least about 98% polypeptides comprising about 20 to about 50 amino acids (e.g., 21 to 50 amino acids). In accordance with an embodiment, the protein product comprises peptides that comprise about 50% to about 55%, about 55% to about 60%, about 60% to about 65%, about 65% to about 70%, about 70% to about 75%, about 75% to about 80%, about 80% to about 85%, about 85% to about 90%, about 90% to about 95%, about 95% to about 98%, at least about 50%, at least about 55%, at least about 60%, at least about 65%, at least about 70%, at least about 75%, at least about 80%, at least about 85%, at least about 90%, at least about 95%, or at least about 98% polypeptides comprising about 50 to about 200 amino acids (e.g., 51 to 200 amino acids). In accordance with an embodiment, the protein product comprises peptides that comprise about 50% to about 55%, about 55% to about 60%, about 60% to about 65%, about 65% to about 70%, about 70% to about 75%, about 75% to about 80%, about 80% to about 85%, about 85% to about 90%, about 90% to about 95%, about 95% to about 98%, at least about 50%, at least about 55%, at least about 60%, at least about 65%, at least about 70%, at least about 75%, at least about 80%, at least about 85%, at least about 90%, at least about 95%, or at least about 98% polypeptides comprising about 200 to about 500 amino acids (e.g., 201 to 500 amino acids). In accordance with an embodiment, the protein product comprises peptides that comprise about 50% to about 55%, about 55% to about 60%, about 60% to about 65%, about 65% to about 70%, about 70% to about 75%, about 75% to about 80%, about 80% to about 85%, about 85% to about 90%, about 90% to about 95%, about 95% to about 98%, at least about 50%, at least about 55%, at least about 60%, at least about 65%, at least about 70%, at least about 75%, at least about 80%, at least about 85%, at least about 90%, at least about 95%, or at least about 98% polypeptides comprising less than 1000, 900, 800, 700, 600, 500, 400, 300, 200, or 100 amino acids. In accordance with an embodiment, the protein product comprises about 50% to about 55%, about 55% to about 60%, about 60% to about 65%, about 65% to about 70%, about 70% to about 75%, about 75% to about 80%, about 80% to about 85%, about 85% to about 90%, about 90% to about 95%, about 95% to about 98%, at least about 50%, at least about 55%, at least about 60%, at least about 65%, at least about 70%, at least about 75%, at least about 80%, at least about 85%, at least about 90%, at least about 95%, or at least about 98% of a combination of free amino acids, oligopeptides, and polypeptides having 21 to 50 amino acids, wherein the ratio of free amino acids to oligopeptides to polypeptides having 21 to 50 amino acids is about 1:1:1, or about 0 to about 3:about 0 to about 3:about 0 to about 3, or about 3 to about 6:about 0 to about 3:about 0 to about 3, or about 0 to about 3:about 3 to about 6:about 0 to about 3, or about 0 to about 3:about 0 to about 3:about 3 to about 6, or about 3 to about 6:about 3 to about 6:about 0 to about 3, or about 0 to about 3:about 3 to about 6:about 3 to about 6, or about 3 to about 6:about 0 to about 3:about 3 to about 6, or about 6 to about 9:about 0 to about 3:about 0 to about 3, or about 0 to about 3:about 6 to about 9:about 0 to about 3, or about 0 to about 3:about 0 to about 3:about 6 to about 9, or about 6 to about 9:about 6 to about 9:about 0 to about 3, or about 0 to about 3:about 6 to about 9:about 6 to about 9, or about 6 to about 9:about 0 to about 3:about 6 to about 9.

In some embodiments, the protein product includes free amino acids. In certain embodiments, amino acids are produced by, and in some embodiments may be secreted by a microorganism described herein. Nonlimiting examples of microbial amino acid production may be found in PCT Application No. WO2014/145194, which is incorporated herein by reference in its entirety.

In some embodiments, the protein product exhibits water and/or oil absorption at a level that is suitable for incorporation into a food composition as described herein, such as, but not limited to an artificial meat or meat substitute composition. For example, the water holding capacity of the protein product may be about 1 to about 10, e.g., about 2 to about 4, times by weight (g/g). For example, the oil holding capacity of the protein product may be about 0.5 to about 10, or about 0.8 to about 5, times by weight (g/g).

In one embodiment, the protein product includes heme (e.g., heme-containing polypeptide), which is produced by the microorganism from which the protein product is derived, such as a *Cupriavidus* microorganism, e.g., *Cupriavidus necator*.

In some embodiments, at least a portion, all, or substantially all of the protein in a protein product described herein, including but not limited to, single cell protein, cell lysate, protein concentrate, protein isolate, protein extract, protein hydrolysate, free amino acids, peptides, and/or oligopeptides, is derived from a *Cupriavidus* microorganism, such as, but not limited to, *Cupriavidus necator*, e.g., DSM 531 or DSM 541.

In some embodiments, at least a portion, all, or substantially all of the protein in a protein product described herein, including but not limited to, single cell protein, cell lysate, protein concentrate, protein isolate, protein extract, protein hydrolysate, free amino acids, peptides, and/or oligopeptides, is derived from a lactic acid bacterium, such as, but not limited to a *Lactococcus, Lactobacillus, Enterococcus, Streptococcus,* or *Pediococcus* bacterium. In some embodiments, the lactic acid bacterium is a GRAS bacterium.

In some embodiments, at least a portion, all, or substantially all of the protein product in a protein product described herein, including but not limited to, single cell protein, cell lysate, protein concentrate, protein isolate, protein extract, protein hydrolysate, free amino acids, peptides, and/or oligopeptides, is derived from a *Fusarium*, a *Rhizopus*, or an *Aspergillus* fungal microorganism, such as but not limited to, *Fusarium venenatum, Rhizopus oligosporus, Rhizopus oryzae, Aspergillus oryzae,* or *Aspergillus sojae*. In some embodiments, the fungal microorganism is a GRAS microorganism.

Protein Concentrates

In certain embodiments, methods are employed that extract non-protein fractions (e.g. lipids, nucleic acids, polysaccharides) without solubilizing the major protein fractions. The insoluble protein fractions that are recovered are protein concentrates. In certain embodiments, a protein concentrate is produced from protein-containing biomass produced by one or more microorganisms as described herein.

In certain embodiments, a protein concentrate is produced via a solvent extraction process. In certain such embodiments, the solvent extraction process comprises an alcohol extraction or wash, such as, for example, an aqueous alcohol wash. In certain embodiments an acid treatment is utilized to produce a protein concentrate. In certain embodiments a protein concentrate is produced via a heat denaturation process.

In certain embodiments, one or more of solvent extraction, acid treatment, and/or heat denaturation steps are deployed, and may be used sequentially or in parallel for production of a protein concentrate. In certain embodiments, a solvent extraction step is followed by a heat denaturation step in the production of a protein concentrate. In certain embodiments, a heat denaturation step is followed by a solvent extraction step in the production of a protein concentrate. In certain embodiment a heat denaturation step and an acid treatment are combined in the production of a protein concentrate. In certain such embodiments, an insoluble material resulting from heat+acid treatment is subjected to a solvent extraction step. In certain embodiments, a protein concentrate produced via one or more of solvent extraction, acid treatment, and/or heat denaturation step(s) is subjected to a water wash.

In certain embodiments, a protein concentrate as described herein contains at least a portion, or most, of the oil and/or water soluble non-protein constituents that were present in the starting biomass removed by the protein concentrate process.

In certain embodiments, a protein concentrate as described herein contains at least about 60%, at least about 70%, at least about 80%, or at least about 90% protein by weight, on a moisture free basis. The crude protein content may be defined as the total nitrogen weight percentage (% N) of a material multiplied by a Jones factor equal to 6.25, i.e., crude protein=6.25*% N. In certain embodiments, a protein concentrate as described herein contains a crude protein content of at least about 60%, at least about 70%, at least about 80%, or at least about 90% protein by weight, on a moisture free basis. The determination of the total amino acid content of a proteinaceous material is well established in the science of biochemical analysis (e.g., using AOAC method 994.12). In certain embodiments, a protein concentrate as described herein contains a total amino acid content of at least about 60%, at least about 70%, at least about 80%, or at least about 90% by weight of the concentrate, on a moisture free basis. In certain embodiments, a protein concentrate produced according to the present invention contains a higher protein content and/or higher crude protein content and/or higher total amino acid content, than a soy protein concentrate.

In certain embodiments, a protein concentrate as described herein contains a carbohydrate content of less than about 20%, less than about 10%, less than about 5%, or less than about 1% by weight. In certain embodiments, a protein as described herein contains an ash content of less than about 10%, less than about 8%, less than about 5%, less than about 4%, less than about 3%, less than about 2%, or less than about 1% by weight. In certain embodiments, a protein concentrate as described herein contains a lipid content of less than about 10%, less than about 8%, less than about 5%, less than about 4%, less than about 3%, less than about 2%, or less than about 1% by weight.

In certain embodiments, a solvent extraction process is applied in the production of a protein concentrate. The solvent may include one or more alcohols or one or more alcohols in aqueous solution. The production of a protein concentrate using alcohol solvent is based on the ability of solutions comprising lower aliphatic alcohols (e.g., methanol, ethanol, isopropyl alcohol) to extract lipids and the soluble sugar fractions without solubilizing proteins and/or by rendering protein insoluble by denaturization. In certain embodiments, the concentration of alcohol used in the solvent in a solvent extraction process is at least about 10%, at least about 20%, at least about 30%, at least about 40%, at least about 50%, at least about 60%, at least about 70%, at least about 80%, at least about 90%, at least about 95%, or at least about 99% by weight.

Starting with wet or dry microbial biomass produced as described herein, in certain embodiments, the protein concentration process comprises one or more of the following steps: liquid-solid extraction, removal and recovery of a solvent from the liquid extract, removal and recovery of a solvent from the solid (e.g., the protein concentrate), and drying and grinding of the solid (e.g., the protein concentrate).

In certain embodiments, solid-liquid extraction is performed batchwise or continuously. In certain embodiments, solid-liquid extraction is performing using one or more of: horizontal belt extractors; basket extractors; stationary extractors; and/or rotary cell extractors.

Heat treatment may render sugars less soluble by binding them to proteins (e.g., Maillard reaction) or by caramelization. Such condensation reactions may make sugars less extractable by solvent. They may also result in darker colors for the concentrates that may be undesirable in certain applications. In certain embodiments, a heat treatment is not performed until after solvent extraction. In certain embodiments, the protein concentrate process utilized avoids the occurrence of the Maillard reaction.

In certain embodiments, a non-polar solvent is utilized in a solvent extraction step. In certain embodiments, a non-polar solvent is utilized in combination with an alcohol solvent. In certain embodiments a non-polar solvent is utilized in combination with an aqueous alcohol solution. In certain embodiments, a non-polar solvent is utilized to extract neutral lipids from an extract produced using alcohol and/or an aqueous alcohol solution. In certain non-limiting embodiments, a non-polar solvent is utilized that has a boiling point range (i.e., distillation range) of 65° C. to 70° C. In certain non-limiting embodiments, a non-polar solvent is utilized that consists primarily of six-carbon alkanes. In certain embodiments, hexane is utilized as a non-polar solvent. In certain such embodiments, the hexane utilized as a non-polar solvent complies with the strict quality specifications required for the extraction of edible oils from soybean and other plant-based sources, including but not limited to: boiling (distillation) range, maximum non-volatile residue, flash point, maximum sulfur, maximum cyclic hydrocarbons, color and specific gravity.

In certain embodiments, "supercritical extraction" using liquid carbon dioxide under high pressure is utilized for solvent extraction.

It is known that the rate-limiting process in solvent extraction of biological materials is often diffusion. For this reason, typically substantial effort and energy are directed toward size reduction of the biomass to be extracted. For example, soybeans and oilseeds are often rolled into thin flakes, thus reducing one dimension to facilitate diffusion. In certain embodiments, the microscopic dimensions of the single cell microorganisms as described herein obviate the need to perform any size reduction prior to solvent extraction. In certain embodiments, solvent extraction is more efficient, i.e., requires less solvent and/or recovers a higher percentage of extractable solute, than comparable solvent extraction performed on higher plant or animal biomass.

In certain embodiments, the cell mass, i.e., microbial biomass produced as described herein is kept in liquid suspension when subjected to solvent extraction or if dried, is fed as a loose power with open, porous structure into a solvent extraction process.

In certain embodiments, the rate of extraction is increased by applying one or more of agitation and/or increasing the temperature. Higher temperature can result in higher solubility of the extractable material (e.g., lipid), and/or higher diffusion coefficients.

Water-free (absolute) low aliphatic alcohols, such as ethanol or isopropanol, are fairly good solvents for lipids at high temperature, but the solubility of oils in these solvents decreases drastically as the temperature is lowered. In certain embodiments, lipid extraction takes place at high temperature one or more alcohol, including but not limited to ethanol, isopropanol, and/or methanol. In certain such embodiments, the lipid extract is cooled, and lipid saturation occurs. In certain such embodiments, the excess lipid separates as a distinct phase, which can be recovered by a solid-liquid separation process, such as, but not limited to, centrifugation. In certain such embodiments, the solvent, i.e., alcohol(s), is reheated and sent back for solvent extraction.

When a concentration gradient is used to transfer the extractable substance out of a solid, keeping the gradient high can facilitate the extraction process. In certain embodiments, the principle of counter-current multistage extraction is utilized to exploit this effect. In certain embodiments, the solvent extraction process is divided into a number of contact stages. In certain embodiments, each stage comprises the mixing of solid, e.g., microbial biomass and/or protein concentrate, and the solvent phases, and the separation of the two streams after extraction is achieved. In certain embodiments, in going from one stage to the next, the solids, e.g., microbial biomass and/or protein concentrate, and the solvent flow in opposite directions. Thus, microbial biomass and/or protein concentrate with the lowest extractable content (e.g., lipids) are contacted with the leanest solvent, resulting in higher extractable yield (e.g., lipid yield) and high driving force throughout the extractor.

In certain embodiments, solvent extraction is performed using batch, semi-continuous and/or continuous solvent extractors.

In batch processes, a certain quantity of microbial biomass and/or biological material is contacted with a certain volume of fresh solvent. In certain embodiments, the extract is drained off, distilled and the solvent is recirculated through the extractor until the residual extractable content (e.g., lipid content) in the batch of microbial biomass and/or biological material is reduced to a targeted level.

In certain embodiments, a semi-continuous solvent extraction system is utilized that consists of several batch extractors connected in series. In certain such embodiments, the solvent and/or extract flows from one extractor to the next one in the series. In certain non-limiting embodiments, a French Stationary Basket Extractor is utilized.

In certain embodiments, a continuous solvent extraction process is utilized in which microbial biomass and/or biological material and/or protein concentrate and solvent are fed continuously into an extractor. In certain embodiments, one or more of: belt extractors, such as but not limited to a De Smet extractor; moving basket extractors, such as but not limited to a Lurgi moving basket extractor or T.O.M. (Turning Over of Material) HLS extractor; and/or carrousel extractors are utilized for solvent extraction.

In certain embodiments, a protein concentrate produced as described herein invention has a residual lipid content of no more than about 0.6% by weight, about 0.25% to about 0.6% by weight, or no more than about 0.25% by weight. In certain embodiments of protein concentration production as described herein that utilize solvent extraction, the solvent losses per extraction are no more than about 0.3% per extraction, or about 0.07% to about 0.3% per extraction, or no more than about 0.07% per extraction.

In certain embodiments, at least two streams leave the solvent extraction step, including: an extract (e.g., lipid extract) stream and a solid (e.g., protein concentrate) stream. In certain such embodiments, the solid stream contains solvent residues. In certain embodiments, one or more processes are utilized for removing and recovering the solvent from one or the other or both of the streams.

In certain embodiments, alcohols are removed from the liquid extract by evaporation and rectified by distillation. In certain such embodiments, the alcohols are then brought to the proper concentration for further extraction. In certain such embodiments, the recovered solvent is recycled through an extractor. In certain embodiments the distillation residue includes lipids and/or an aqueous solution comprising nucleic acids, sugars, and/or other solubles. In certain embodiments the aqueous residue is concentrated to roughly 50% total soluble solids. In certain embodiments the lipids and/or aqueous residue are used as a caloric ingredient and/or as a binding agent in animal feeds. In certain embodiments, the lipids and/or aqueous residues are fed back into a bioreactor. In certain embodiments the lipids and/or aqueous residues are fed back into a bioreactor where they may be used for mixotrophic growth. In certain such cases, the mixotrophic growth comprises the growth on $H_2$ and organic substrates, including but not limited to lipids and/or nucleic acids. In certain embodiments the extraction contains 30% or less lipids. In certain embodiments, for every ton of lipid recovered, roughly 2.5 tons of solvent is recovered by distillation. In certain embodiments, one or more methods of solvent removal are utilized such as, but not limited to: flash evaporation, vacuum distillation, and/or steam stripping.

In certain embodiments, solvents are removed from the solid resulting from one or more solvent extraction steps. In certain embodiments, flash desolventizing is utilized to remove solvent residues. In certain embodiments, superheated vapors of an alcohol-water mixture are applied to protein concentrates produced as described herein. In certain embodiments, steam distillation is used to remove solvent residues or traces of solvent from solids resulting from solvent extraction. In certain such embodiments, the said solids recovered from solvent extraction are used to produce a protein concentrate. In certain embodiments, desolventizing of solids recovered from solvent extraction is performed via flash desolventizing (FD). In certain such embodiments, solids with solvent residues coming out of an extractor are fluidized in a stream of superheated solvent vapors where the superheat of the vapor provides the energy for the evaporation of solvent from the solids. In certain such embodiments, the turbulent nature of the solid-vapor flow facilitates rapid heat and mass transfer. In certain embodiments, a short stripping stage is utilized for complete solvent removal. In certain embodiments, rapid cooling follows the removal of residual solvents. In certain embodiments, any excess water left in protein concentrate after desolventizing is removed by methods such as but not limited to hot air drying, drying under hot inert gases, vacuum drying, or freeze drying.

In certain embodiments, an acid treatment or acid-wash process is utilized to precipitate proteins from solution, and the precipitated protein is used to produce a protein concentrate. In certain embodiments, the pH of the broth or biomass or biomass lysate emerging from the bioreactor is roughly pH=7, or roughly in the range of pH 6 to pH 8. Proteins generally exhibit minimum aqueous solubility at pH ranges corresponding to the isoelectric range of the protein. In certain embodiments, the isoelectric range of the proteins produced as described herein (e.g., proteins produced utilizing a $CO_2$ carbon source) occurs at a pH less than pH=6, or in a range of pH 3 to pH 6, pH 4 to pH 5, pH 4.2 to 4.5, or at pH of about 4, or around pH 4.2 or around pH 4.5. In certain embodiments, an acid, such as, but not limited to, one or more of: phosphoric acid, sulfuric acid, hydrochloric acid, acetic acid, and/or carbonic acid/$CO_2$ (aqueous), is utilized to lower the pH of the culture broth and/or biomass and/or biomass lysate to the isoelectric range. In certain embodiments, proteins are precipitated by lowering the pH to the isoelectric range, and nucleic acids, sugars, and/or other soluble non-proteins are extracted using as a solvent water to which an acid has been added, so as to keep the pH in the isoelectric region. In certain embodiments, rotary vacuum filters or decanting centrifuges are used for solid-liquid separation with the solids comprising the precipitated protein.

In certain embodiments, lysed or defatted microbial biomass produced as described herein is mixed with acidified water in an agitation vessel. In certain such embodiments, the slurry is then fed to a decanter centrifuge, which separates the extracted solids from the extract. In certain such embodiments, the solids are continuously discharged from the decanter centrifuge. In certain such embodiments the discharged solids have about 10%, about 20%, about 30%, or about 10% to about 30% by weight dry matter content. In certain such embodiments, the solids recovered in this way are dried to yield an isoelectric protein concentrate. In certain embodiments, an isoelectric solid cake is resuspended in water and the acidity is neutralized, and a second step of centrifugal separation produces a cake of neutral protein concentrate. In certain such embodiments, the protein concentrate has a protein content of at least about 60%, at least about 70%, at least about 75%, or at least about 80% by weight on a dry matter basis.

In certain embodiments, the protein solubility of the neutralized product as indicated by the nitrogen solubility index (NSI) is an NSI of at least about 40%, at least 50%, at least 60%, or an NSI value greater than about 60%.

In certain embodiments, the liquid extract containing soluble components such as nucleic acids, sugars, minerals, and the protein fractions which are soluble at a pH of less than 6, pH 3 to pH 6, pH less than 5, pH about 4.5, or pH 4 to pH 5, are fed back to the original bioreactor and/or to another bioreactor for mixotrophic or heterotrophic microbial biomass production. In certain such embodiments, additional proteinaceous biomass is produced.

In certain embodiments, a heat denaturation and/or water extraction process is used in the production of a protein concentrate. In certain embodiments, the proteins produced as described herein are rendered insoluble by thermal denaturation, using humid heat. In certain embodiments, microbial biomass produced as described herein is heated in boiling water or in a pressure cooker or in an autoclave. In certain embodiments, microbial biomass produced as described herein is submitted to a continuous high temperature-short time humid heat treatment, using for example, an extruder-cooker. In certain embodiments, the heat treatment of the microbial biomass involves subjecting the biomass to temperatures of at least about 60° C., at least about 70° C., at least about 80° C., at least about 90° C., at least about 100° C., at least about 110° C., at least about 120° C., at least about 130° C., or at least about 140° C., or temperatures of about 60° C. to about 90° C. or about 100° C. to about 121° C., or temperatures of at most 150° C. In certain embodiments, the duration of heat treatment is at least about 5 minutes, at least about 10 minutes, at least about 15 minutes, at least about 30 minutes, at least about 45 minutes, or at least about one hour, at least about three hours, at least about five hours, or about 24 hours, or the duration is less than about 48 hours, or less than about 72 hours. In certain embodiments, heat-treated microbial biomass produced as described herein is extracted with hot water, which dissolves nucleic acids, sugars, and/or other non-protein solubles. In certain embodiments, following heat treatment and protein denaturation, solid-liquid separation steps well known in the science of producing protein concentrates from soy and other plant-based sources of protein are utilized to separate the solid denatured proteins from the non-protein solubles. Examples of equipment and processes that may be used in the present invention to separate the protein-rich solids, from the protein-depleted liquid include but are not limited to one or more of: rotary vacuum filters, decanting centrifuges, continuous centrifuges, and belt presses.

In certain embodiments, protein-rich solids (i.e., cake) produced through one or more of the previously described processes, and specifically one or more of: solvent extraction, heat denaturation, and acid/isoelectric precipitation, are run through an extruder. In certain such embodiments, the extrudate is cooled and then ground.

In certain embodiments, protein-rich solids (i.e., cake) and/or extrudate, produced through one or more of the previously described processes, and specifically one or more of: solvent extraction, heat denaturation, and acid/isoelectric precipitation, optionally followed by extrusion, are dried using drying processes well established in the production of protein concentrates from soybeans and other plant-based sources. In certain embodiments, the protein-rich cake is wet-milled to a fine slurry. In certain such embodiments, the slurry is then spray dried. In certain embodiments, the protein-rich cake or extrudate is freeze dried. In certain embodiments, the protein-rich cake or extrudate is dried in forced circulation driers. In certain embodiments, the protein-rich cake or extrudate is dried to a moisture content of about 10% or less.

In certain embodiments, a protein-rich cake or extrudate is ground into a fine powder. In certain such embodiments, at least about 97% of the ground product passes through a 100-mesh standard screen. In other embodiments of the present invention, the protein-rich cake or extrudate is converted to the form of grits, with a coarser granulation. In certain embodiments, a protein-rich cake or extrudate is converted to powder or grits using one or more of: hammer mills, pin mills, impact turbo mills and/or similar pulverizers. In certain said embodiments, not more than about 3% of the ground product is retained by a 100-mesh screen. In certain embodiments, an air classification system is used to separate fine product from coarse fractions. In certain embodiments, coarse fractions are recirculated back through the mill or pulverizer.

In certain embodiments, the final form of the protein concentrate emerging from the process as described herein is granular, or flour-like, or spray dried, or texturized.

In certain embodiments, a protein concentrate produced as described herein contains less than about 1% lipid by weight. In other embodiments, a protein concentrate produced as described herein contains less than about 20%, less than about 15%, less than about 10%, or less than about 5% lipid by weight. In certain embodiments, the lipid content of a protein concentrate produced as described herein varies from about 1% to about 10% by weight, or in certain embodiments about 4.5% to about 9% or about 5% to about 6%.

In certain embodiments, a plant-based oil or fat is combined with a protein concentrate produced as described herein, where the combined lipid content of the protein concentrate and plant-oil or -fat formulation varies from about 4.5% to about 9%, about 5% to about 6%, about 9% to about 15%, or about 15% and about 20%, by weight. In certain embodiments, the said formulation of protein concentrate and plant-oil or -fat has a total lipid content of about 15% by weight.

In certain embodiments, a lecithin, such as, but not limited to, a soybean lecithin or an egg lecithin, is combined with a protein concentrate produced as described herein. In certain such embodiments, the addition of lecithin increases the dispersibility and emulsifying properties of the protein concentrate. In certain such embodiments, the lecithin content of the formulation comprising the protein concentrate and lecithin, varies up to about 15% by weight.

In certain embodiments, the oil and/or phospholipid content of the microbial biomass produced as described herein possesses egg and/or shortening type effects and can act as an emulsifier.

It is known that high lipid content in a protein concentrate can lead to poor storage stability. In certain embodiments, a low lipid protein concentrate is produced with increased storage stability.

In certain embodiments, a protein concentrate produced as described herein can have an NSI of up to about 80%, about 70%, about 60%, about 50%, about 40%, about 30%, about 20%, or about 10%. In certain embodiments, a protein concentrate produced as described herein can have an NSI of about 10% to about 20%, about 10% to about 30%, about 20% to about 30%, or about 10% to about 15%.

In certain embodiments, the dispersibility and functionality of the protein concentrate is increased by steam injection or jet-cooking, and/or by high-shear homogenization.

Protein Hydrolysates

In some embodiments, at least a portion, all, or substantially all of the protein product is produced by hydrolyzing protein (e.g., single cell protein, cell lysate, protein concentrate, protein isolate, and/or protein extract) from at least one microorganism described herein. For example, hydrolysis of cellular protein may produce peptides, oligopeptides, and/or free amino acids.

Hydrolysis of microbial protein may be performed by acidic, basic, and/or enzymatic processes. Methods for hydrolyzing protein are well known in the art. Nonlimiting examples of microbial protein hydrolysis methods and hydrolysate compositions may be found in U.S. Provisional Application Nos. 62/901,169 and 62/943,754, and in PCT Application No. US20/50902, which are incorporated herein by reference in their entireties.

In some embodiments, a hydrolysis method may include raising or lowering the pH of a proteinaceous suspension, e.g., a suspension of microbial biomass, thereby producing an alkaline or acidic suspension, respectively. The starting biomass suspension may include a suitable amount of the biomass in liquid, for example, microbial biomass in a growth medium. In some embodiments, the amount of the biomass, dried weight/reaction volume, is at least about 0.01%, at least about 0.2%, at least about 0.5%, at least about 1%, at least about 2%, or at least about 3%, or about 0.1% to about 8%, e.g., about 0.2% to about 8%, about 0.5% to about 6%, about 1% to about 6%, about 2% to about 6%, about 3% to about 5%, about 4% to about 8%, about 6% to about 8% about 5% to about 7%, or about 5% to about 8%.

In some embodiments, microorganism cells within the biomass are subjected to lysis at the beginning of the process, e.g., prior to raising or lowering the pH, to facilitate harvesting the protein from the biomass into a suspension composition.

In certain embodiments, the alkaline or acidic suspension may be subjected to heat for a suitable amount of time, to generate a protein hydrolysate composition. The suspension may be concentrated, dried (e.g., lyophilized), or utilized directly as a liquid suspension. In certain embodiments, the alkaline or acidic suspension is subjected to heat and elevated pressure, e.g., by autoclaving the alkaline or acidic suspension, to generate a protein hydrolysate composition. In some embodiments, the suspension is neutralized with buffer to lower or raise the pH after the heat or heat/pressure treatment. In certain embodiments, the pH is lowered (for an alkaline suspension) or raised (for an acidic suspension) sufficiently to allow subsequent enzymatic treatment of the suspension with a hydrolytic enzyme, such as a protease (e.g., alkaline protease, acid protease, or metalloprotease). After enzymatic hydrolysis, a protein hydrolysate composition is produced. In other embodiments, the biomass suspension is hydrolyzed with a proteolytic enzyme, such as a protease (e.g., alkaline protease, acid protease, or metalloprotease), without prior alkaline or acid treatment.

In certain embodiments, the hydrolyzed protein in the protein hydrolysate is predominantly in the soluble fraction of the suspension. The resulting suspension may be clarified, e.g., by centrifuge, to obtain a supernatant fraction, which contains hydrolyzed protein. In some embodiments, the hydrolytic treatment (e.g., alkaline or acid hydrolysis, optionally including enzymatic (e.g., protease) treatment or enzymatic hydrolysis alone) is followed by clarification of the suspension (hydrolysate) to remove undissolved material in the suspension, e.g., separation of soluble and insoluble fractions. The suspension may be clarified using any suitable method, such as centrifugation, filtration, etc. In some embodiments, after the suspension is clarified, e.g., centrifuged, the supernatant may be separated from the pellet.

In some embodiments, the clarified liquid composition (e.g., soluble fraction, such as supernatant of separated suspension), which contains hydrolyzed protein, is dried, e.g., lyophilized, to produce a dry or substantially dry composition. In some embodiments, the lyophilized composition has a water content of about 10% or less, e.g., about 8% or less, about 6% or less, about 5% or less, or about 3% or less. In some embodiments, the lyophilized protein hydrolysate composition has a water content of about 1% to about 10%, e.g., about 1% to about 8%, about 1% to about 6%, about 2% to about 5%, about 2% to about 6%, about 3% to about 5%, about 4% to about 8%, about 6% to about 8% about 5% to about 7%, or about 5% to about 8%.

In some embodiments, the clarified liquid composition (e.g., soluble fraction, such as supernatant of separated suspension) is dewatered or concentrated to lower the water content. In some embodiments, the concentrated composition has a water content of about 80% or less, e.g., about 75% or less, about 50% or less, about 40% or less, or about 30% or less; and in some embodiments, each of the foregoing water content ranges may be at least about 20%, at least about 25%, at least about 30%, at least about 40%, or at least about 50% (to the extent such foregoing ranges exceed such lower limits). In some embodiments, the dewatered product is dried, e.g., using heat and/or evaporation, employing a method such as, but not limited to, one or more of spray drying; drum drying; oven drying; vacuum drying; vacuum oven drying; drying under an inert gas such as $N_2$; and solar evaporation. In some embodiments, the clarified product is dewatered initially with a rotary evaporator, e.g., such that about 50% to about 65% or more of the moisture is removed. In some embodiments, further dewatering is achieved by lyophilization, e.g., such that the lyophilized protein hydrolysate composition has a water content from about 1% to about 10%, e.g., about 1% to about 8%, about 1% to about 6%, about 2% to about 5%, about 2% to about 6%, about 3% to about 5%, about 4% to about 8%, about 6% to about 8% about 5% to about 7%, or about 5% to about 8%.

In some embodiments, at least a portion or all of the protein from which a protein hydrolysate is produced (e.g., single cell protein, cell lysate, protein concentrate, protein isolate, and/or protein extract) is from a *Cupriavidus* microorganism, such as, but not limited to, *Cupriavidus necator*, e.g., DSM 531 or DSM 541. In some embodiments, a protein hydrolysate composition (e.g., containing peptides, oligopeptides, and/or free amino acids) is derived from protein from a *Cupriavidus* microorganism, such as, but not limited to, *Cupriavidus necator*, e.g., DSM 531 or DSM 541.

In some embodiments, at least a portion, all, or substantially all of the protein from which a protein hydrolysate is produced (e.g., single cell protein, cell lysate, protein concentrate, protein isolate, and/or protein extract) is from a lactic acid bacterium, such as, but not limited to a *Lactococcus, Lactobacillus, Enterococcus, Streptococcus,* or *Pediococcus* bacterium. In some embodiments, a protein hydrolysate composition (e.g., containing peptides, oligopeptides, and/or free amino acids) is derived from protein from a lactic acid bacterium, such as, but not limited to, a *Lactococcus, Lactobacillus, Enterococcus, Streptococcus,* or *Pediococcus* bacterium. In some embodiments, the lactic acid bacterium is a GRAS bacterium.

In some embodiments, at least a portion or all of the protein from which a protein hydrolysate is produced (e.g., single cell protein, cell lysate, protein concentrate, protein isolate, and/or protein extract) is from a *Fusarium*, a *Rhizopus*, or an *Aspergillus* fungal microorganism, such as but not limited to, *Fusarium venenatum, Rhizopus oligosporus, Rhizopus oryzae, Aspergillus oryzae,* or *Aspergillus sojae*. In some embodiments, a protein hydrolysate composition (e.g., containing peptides, oligopeptides, and/or free amino acids) is derived from protein from a *Fusarium*, a *Rhizopus*, or an *Aspergillus* fungal microorganism, such as but not limited to, *Fusarium venenatum, Rhizopus oligosporus, Rhizopus oryzae, Aspergillus oryzae,* or *Aspergillus sojae*.

In some embodiments, protein hydrolysates herein include peptides that comprise or consist of peptides that are of a size range that is typically non-allergenic, e.g., non-allergenic to humans. In some embodiments, protein hydrolysates that are incorporated into food compositions as described herein include peptides and free amino acids, wherein the peptides are of a size range that is typically non-allergenic. In some embodiments, non-allergenic peptides are of a size range that is about 800 to about 1500 Da average molecular weight distribution. For example, peptides obtained by protein hydrolysis as described herein may be less than any of about 1500, 1400, 1300, 1200, 1100, 1000, 900, or 800 Da average molecular weight.

In some embodiments, salts are removed from protein hydrolysates (for example, where acid or alkaline salts are used for hydrolysis), prior to incorporation of the hydrolysate into a food composition as described herein. For example, the protein hydrolysate may be purified by filtration (e.g., ultrafiltration) or dialysis to remove salts and/or other impurities.

Microorganisms

Proteinaceous material (protein product as described herein) used in the methods and incorporated into the compositions described herein is derived from one or more microorganism. The microbial organisms from which single cell protein, cell lysate, protein concentrate, protein isolate, protein hydrolysate, free amino acids, peptides, oligopeptides, or combinations thereof is derived may be photoautotrophic, heterotrophic, methanotrophic, methylotrophic, carboxydotrophic or chemoautotrophic organisms. In some embodiments, the microbial organisms include oxyhydrogen microorganism. The microbial organisms may be wild-type, or may be genetically modified (e.g., recombinant), or a combination thereof.

Microbial biomass may be collected from a culture of one or more suitable microorganism, e.g., in a fermenter or bioreactor. Biomass may be collected using any suitable method, such as a centrifuge, to separate the cell mass from the culture medium. In some embodiments, the collected biomass may be used to produce a protein hydrolysate composition. In some embodiments, the collected biomass is spray dried or lyophilized to generate a dry biomass, which then may be used as an ingredient for production of a food composition as described herein or to produce a protein hydrolysate composition. In some embodiments, a protein product (e.g., single cell protein, cell lysate, protein extract, protein-containing extract, protein concentrate, protein isolate, protein hydrolysate, free amino acids, peptides, oligopeptides, or combinations thereof) is produced from the collected biomass.

In some embodiments, the microorganisms or protein product thereof includes a strain within the genus *Cupriavidus* or *Ralstonia* or *Hydrogenobacter*. In some embodiments, the microorganisms include the species *Cupriavidus necator* or *Cupriavidus metallidurans*. In some embodiments, the microorganisms include a strain of the species *Cupriavidus necator* DSM 531 or DSM 541. In some embodiments, the microorganisms includes the species *Cupriavidus metallidurans*. In some embodiments, the microorganisms include a strain of the species *Cupriavidus metallidurans* DSM 2839.

In some embodiments, the microorganisms or protein product thereof includes a strain within the genus *Xanthobacter*. In some embodiments, the microorganisms includes the species *Xanthobacter autotrophicus*. In some embodiments, the microorganisms include a strain of the species *Xanthobacter autotrophicus* DSM 432.

In some embodiments, the microorganisms or protein product thereof includes a *Rhodococcus* or *Gordonia* microorganism. In some embodiments, the microorganisms include *Rhodococcus opacus*. In some embodiments, the microorganisms include *Rhodococcus opacus* (DSM 43205) or *Rhodococcus* sp. (DSM 3346). In some embodiments, the microorganisms include *Rhodococcus opacus; Hydrogenovibrio marinus; Rhodopseudomonas capsulate; Hydrogenobacter thermophilus*; or *Rhodobacter sphaeroides*. In some embodiments, the microorganisms include a strain within the family burkholderiaceae.

In some embodiments, the microorganisms or protein product thereof includes a lactic acid bacterium, such as, but not limited to a *Lactococcus, Lactobacillus, Enterococcus, Streptococcus*, or *Pediococcus* bacterium. In some embodiments, the lactic acid bacterium is a GRAS bacterium.

In some embodiments, the microorganisms or protein product thereof includes a *Fusarium*, a *Rhizopus*, or an *Aspergillus* fungal microorganism, such as but not limited to, *Fusarium venenatum, Rhizopus oligosporus, Rhizopus oryzae, Aspergillus oryzae*, or *Aspergillus sojae*. In some embodiments, the fungal microorganism is a GRAS microorganism.

In some embodiments, a consortium of microorganisms (i.e., two or more microorganisms grown together) is used as a source of protein product in the methods and compositions described herein. The consortium may include one or more of any of the microorganism species or strains described herein or one or more microorganisms having one or more microorganism traits described herein. In some embodiments, the consortium includes two or more of any of the microorganism species or strains or microorganisms described herein or two or more microorganisms having one or more microorganism traits described herein.

In some embodiments, a microorganism as described herein can accumulate protein to about 50% or more of the total cell mass by weight. In some embodiments, a microorganism as described herein can accumulate protein to about 60% or more of the total cell mass by weight. In some embodiments, the microorganism can accumulate protein to about 70% or more of the total cell mass by weight. In some embodiments, the microorganism can accumulate protein to about 80% or more of the total cell mass by weight. In some non-limiting embodiments, the microorganism exhibiting these traits is a *Cupriavidus* microorganism, for example, *Cupriavidus necator*, e.g., *Cupriavidus necator* DSM 531 or DSM 541.

In certain embodiments, the biomass that is produced (e.g., microorganism cells) has a higher protein content and/or a lower fat content than soybeans. In certain embodiments the biomass produced (e.g., microorganism cells) has a protein content higher than or at least about any of about 40%, about 50%, about 60%, about 70%, or about 80% by weight, and a fat content of about or lower than any of about 20%, about 15%, about 10%, or about 5% by weight. For example, the biomass may have a protein content higher about than or at least about 40% by weight and a fat content of about or lower than about 20% by weight, or a protein content higher than about or at least about 40% by weight and a fat content of about or lower than about 15% by weight, or a protein content higher than about or at least about 40% by weight and a fat content of about or lower than about 10% by weight, or a protein content higher than about or at least about 40% by weight and a fat content of about or lower than about 5% by weight, or a protein content higher than about or at least about 50% by weight and a fat content of about or lower than about 20% by weight, or a protein content higher than about or at least about 50% by weight and a fat content of about or lower than about 15% by weight, or a protein content higher than about or at least about 50% by weight and a fat content of about or lower than about 10% by weight, or a protein content higher than about or at least about 50% by weight and a fat content of about or lower than about 5% by weight, or a protein content higher than about or at least about 60% by weight and a fat content of about or lower than about 20% by weight, or a protein content higher than about or at least about 60% by weight and a fat content of about or lower than about 15% by weight, or a protein content higher than about or at least about 60% by weight and a fat content of about or lower than about 10% by weight, or a protein content higher than about or at least about 60% by weight and a fat content of about or lower than about 5% by weight, or a protein content higher than about or at least about 70% by weight and a fat content of about or lower than about 20% by weight, or a protein content higher than about or at least about 70% by weight and a fat content of about or lower than about 15% by weight, or a protein content higher than about or at least about 70% by weight and a fat content of about or lower than about 10% by weight, or a protein content higher than about or at least about 70% by weight and a fat content of about or lower than about 5% by weight, or a protein content higher than about or at least about 80% by weight and a fat content of about or lower than about 15% by weight, or a protein content higher than about or at least about 80% by weight and a fat content of about or lower than about 10% by weight, or a protein content higher than about or at least about 80% by weight and a fat content of about or lower than about 5% by weight. In some non-limiting embodiments, the microorganism exhibiting these traits is a *Cupriavidus* microorganism, for example, *Cupriavidus necator*, e.g., *Cupriavidus necator* DSM 531 or DSM 541.

In some embodiments, a microorganism as described herein can naturally grow on $H_2/CO_2$ and/or syngas and/or producer gas. In some embodiments, the microorganism can naturally accumulate polyhydroxyalkanoate (PHA) (e.g., polyhydroxybutyrate (PHB)) to about 50% or more of the cell biomass by weight. In some embodiments, the microorganism has a native ability to direct a high flux of carbon through the acetyl-CoA metabolic intermediate, which can lead into fatty acid biosynthesis, along with a number of other synthetic pathways, for example, PHA, e.g., PHB, synthesis, and/or amino acid biosynthesis. In some embodiments, the microorganism exhibiting these traits is a *Cupriavidus* microorganism, for example, *Cupriavidus necator*, e.g., *Cupriavidus necator* DSM 531 or DSM 541). In some embodiments, the microorganism does not produce and/or accumulate PHA (e.g., PHB).

In some nonlimiting embodiments, the microorganisms or protein product thereof includes *Corynebacterium autotrophicum*. In some nonlimiting embodiments, the microorganisms include *Corynebacterium autotrophicum* and/or *Corynebacterium glutamicum*. In some embodiments, the microorganisms include *Hydrogenovibrio marinus*. In some embodiments, the microorganisms include *Rhodopseudomonas capsulate, Rhodopseudomonas palustris*, or *Rhodobacter sphaeroides*.

In some embodiments, the microorganisms or protein product thereof includes one or more of the following genera: *Cupriavidus, Rhodococcus, Hydrogenovibrio, Rhodopseudomonas, Hydrogenobacter, Gordonia, Arthrobacter, Streptomycetes, Rhodobacter*, and/or *Xanthobacter*.

In some embodiments, the microorganisms or protein product thereof includes a microorganism of the class Actinobacteria. In some embodiments, the microorganisms include a microorganism of the suborder corynebacterineae (*corynebacterium*, gordoniaceae, mycobacteriaceae and nocardiaceae). In some embodiments, the microorganisms include a microorganism of the family of Nocardiaceae. In some embodiments, the microorganisms include a microorganism drawn from one or more of the following classifications: *Corynebacterium, Gordonia, Rhodococcus, Mycobacterium* and *Tsukamurella*. In some embodiments, the microorganisms include a microorganism of the genus *Rhodococcus*, such as *Rhodococcus opacus, Rhodococcus aurantiacus; Rhodococcus baikonurensis; Rhodococcus boritolerans; Rhodococcus equi; Rhodococcus coprophilus; Rhodococcus corynebacterioides; Nocardia corynebacterioides* (synonym: *Nocardia corynebacterioides*); *Rhodococcus erythropolis; Rhodococcus fascians; Rhodococcus globerulus; Rhodococcus gordoniae; Rhodococcus jostii; Rhodococcus koreensis; Rhodococcus kroppenstedtii; Rhodococcus maanshanensis; Rhodococcus marinonascens; Rhodococcus opacus; Rhodococcus percolatus; Rhodococcus phenolicus; Rhodococcus polyvorum; Rhodococcus pyridinivorans; Rhodococcus rhodochrous; Rhodococcus rhodnii;* (synonym: *Nocardia rhodnii*); *Rhodococcus ruber* (synonym: *Streptothrix rubra*); *Rhodococcus* sp. RHA1; *Rhodococcus triatomae; Rhodococcus tukisamuensis; Rhodococcus wratislaviensis* (synonym: *Tsukamurella wratislaviensis*); *Rhodococcus yunnanensis*; or *Rhodococcus zopfii*. In some embodiments, the microorganisms include *Rhodococcus opacus* strain DSM 43205 or DSM 43206. In some embodiments, the microorganisms include strain *Rhodococcus* sp. DSM 3346.

In some embodiments, the microorganisms or protein product thereof includes a microorganism (e.g., a microorganism of any of the microorganism genera or species described herein) that can naturally grow on $H_2/CO_2$ and/or syngas and/or producer gas, and that can naturally accumulate lipid to any of at least about 10% about, 20% about, 30%, about 40%, about 50%, about 60%, about 70%, about 80%, or more of the cell biomass by weight. In some embodiments, the microorganisms include a microorganism (e.g., a microorganism of any of the microorganism genera or species described herein) that has a native ability to send a high flux of carbon down the fatty acid biosynthesis pathway. In some embodiments, the microorganism exhibiting these traits is a *Rhodococcus* microorganism, for example, *Rhodococcus opacus* (e.g., *Rhodococcus opacus* DSM 43205 or DSM 43206 or DSM 44193), or a *Cupriavidus* microorganism, for example, *Cupriavidus necator* (e.g., *Cupriavidus necator* DSM 531 or DSM 541).

In some embodiments, the microorganisms or protein product thereof include an oxyhydrogen or knallgas strain. In some embodiments, the microorganisms include one or more of the following knallgas microorganisms: *Aquifex pyrophilus, Aquifex aeolicus*, or other *Aquifex* sp.; *Cupriavidus necator* or *Cupriavidus metallidurans* or other *Cupriavidus* sp.; *Corynebacterium autotrophicum* or other *Corynebacterium* sp.; *Gordonia desulfuricans, Gordonia polyisoprenivorans, Gordonia rubripertincta, Gordonia hydrophobica, Gordonia westfalica*, or other *Gordonia* sp.; *Nocardia autotrophica, Nocardia opaca*, or other *Nocardia* sp.; purple non-sulfur photosynthetic bacteria, including but not limited to, *Rhodobacter sphaeroides, Rhodopseudomonas palustris, Rhodopseudomonas capsulate, Rhodopseudomonas viridis, Rhodopseudomonas sulfoviridis, Rhodopseudomonas blastica, Rhodopseudomonas spheroides, Rhodopseudomonas acidophila*, or other *Rhodopseudomonas* sp.; *Rhodobacter* sp., *Rhodospirillum rubrum*, or other *Rhodospirillum* sp.; *Rhodococcus opacus* or other *Rhodococcus* sp.; *Rhizobium japonicum* or other *Rhizobium* sp.; *Thiocapsa roseopersicina* or other *Thiocapsa* sp.; *Pseudomonas facilis, Pseudomonas flava, Pseudomonas putida, Pseudomonas hydrogenovora, Pseudomonas hydrogenothermophila, Pseudomonas palleronii, Pseudomonas pseudoflava, Pseudomonas saccharophila, Pseudomonas thermophile*, or other *Pseudomonas* sp.; *Hydrogenomonas pantotropha, Hydrogenomonas eutropha, Hydrogenomonas facilis*, or other *Hydrogenomonas* sp.; *Hydrogenobacter thermophiles, Hydrogenobacter halophilus, Hydrogenobacter hydrogenophilus*, or other *Hydrogenobacter* sp.; *Hydrogenophilus islandicus* or other *Hydrogenophilus* sp.; *Hydrogenovibrio marinus* or other *Hydrogenovibrio* sp.; *Hydrogenothermus marinus* or other *Hydrogenothermus* sp.; *Helicobacter pylori* or other *Helicobacter* sp.; *Xanthobacter autotrophicus, Xanthobacter flavus*, or other *Xanthobacter* sp.; *Hydrogenophaga flava, Hydrogenophaga palleronii, Hydrogenophaga pseudoflava*, or other *Hydrogenophaga* sp.; *Bradyrhizobium japonicum* or other *Bradyrhizobium* sp.; *Ralstonia eutropha* or other *Ralstonia* sp.; *Alcaligenes eutrophus, Alcaligenes facilis, Alcaligenes hydrogenophilus, Alcaligenes latus, Alcaligenes paradoxus, Alcaligenes ruhlandii*, or other *Alcaligenes* sp.; *Amycolata* sp.; *Aquaspirillum autotrophicum* or other *Aquaspirillum* sp.; *Arthrobacter* strain 11/X, *Arthrobacter methylotrophus*, or other *Arthrobacter* sp.; *Azospirillum lipoferum* or other *Azospirillum* sp.; *Variovorax paradoxus* or other *Variovorax* sp.; *Acidovorax facilis*, or other *Acidovorax* sp.; *Bacillus schlegeffi, Bacillus tusciae*, other *Bacillus* sp.; *Calderobacterium hydrogenophilum* or other *Calderobacterium* sp.; *Derxia gummosa* or other *Derxia* sp.; *Flavobacterium autothermophilum* or other *Flavobacterium* sp.; *Microcyclus aquaticus* or other *Microcyclus* sp.; *Mycobacterium gordoniae* or other *Mycobacterium* sp.; *Paracoccus denitrificans* or other *Paracoccus* sp.; *Persephonella marina, Persephonella guaymasensis*, or other *Persephonella* sp.; *Renobacter vacuolatum* or other *Renobacter* sp.; *Seliberia carboxydohydrogena* or other *Seliberia* sp., *Streptomycetes coelicoflavus, Streptomycetes griseus, Streptomycetes xanthochromogenes, Streptomycetes thermocarboxydus*, and other *Streptomycetes* sp.; *Thermocrinis ruber* or other *Thermocrinis* sp.; *Wautersia* sp.; cyanobacteria including but not limited to *Anabaena oscillarioides, Anabaena spiroides, Anabaena cylindrica*, or other *Anabaena* sp., and *Arthrospira platensis, Arthrospira maxima*, or other *Arthrospira* sp.; green algae including but not limited to *Scenedesmus obliquus* or other *Scenedesmus* sp., *Chlamydomonas reinhardii* or other *Chlamydomonas* sp., *Ankistrodesmus* sp., and *Raphidium polymorphium* or other *Rhaphidium* sp. In some embodiments, a consortium of microorganisms that includes an oxyhydrogen microorganism, such as any of the above oxyhydrogen microorganisms, is used for production of protein product as described herein.

In some embodiments, the microorganisms or protein product thereof includes one or more of the following genera: *Cupriavidus; Xanthobacter, Dietzia; Gordonia; Mycobacterium; Nocardia; Pseudonocardia; Arthrobacter, Alcanivorax; Rhodococcus; Streptomyces; Rhodopseudomonas; Rhodobacter*, and *Acinetobacter*, or a consortium of microorganisms that includes one or more of these microorganism genera.

In some embodiments, the microorganisms or protein product thereof includes one or more of the following: *Arthrobacter methylotrophus* DSM 14008; *Rhodococcus opacus* DSM 44304; *Rhodococcus opacus* DSM 44311; *Xanthobacter autotrophicus* DSM 431; *Rhodococcus opa-* cus DSM 44236; *Rhodococcus ruber* DSM 43338; *Rhodococcus opacus* DSM 44315; *Cupriavidus metallidurans* DSM 2839; *Cupriavidus necator* DSM 531; *Cupriavidus necator* DSM 541; *Rhodococcus aetherivorans* DSM 44752; *Gordonia desulfuricans* DSM 44462; *Gordonia polyisoprenivorans* DSM 44266; *Gordonia polyisoprenivorans* DSM 44439; *Gordonia rubripertincta* DSM 46039; *Rhodococcus percolatus* DSM 44240; *Rhodococcus opacus* DSM 43206; *Gordonia hydrophobica* DSM 44015; *Rhodococcus zopfii* DSM 44189; *Gordonia westfalica* DSM 44215, *Xanthobacter autotrophicus* DSM 1618; *Xanthobacter autotrophicus* DSM 2267; *Xanthobacter autotrophicus* DSM 3874; *Streptomycetes coelicoflavus* DSM 41471; *Streptomycetes griseus* DSM 40236; *Streptomycetes* sp. DSM 40434; *Streptomycetes xanthochromogenes* DSM 40111; *Streptomycetes thermocarboxydus* DSM 44293; *Rhodobacter sphaeroides* DSM 158. In some embodiments, the microorganisms or protein product thereof includes a consortium of microorganisms that includes one or more of these microorganism strains, or one or more of any of the microorganism genera or species disclosed herein.

A number of different microorganisms have been characterized that are capable of growing on carbon monoxide as an electron donor and/or carbon source (i.e., carboxydotrophic microorganisms). In some cases, carboxydotrophic microorganisms can also use $H_2$ as an electron donor and/or grow mixotrophically. In some cases, the carboxydotrophic microorganisms are facultative chemolithoautotrophs [Biology of the Prokaryotes, edited by J Lengeler, G. Drews, H. Schlegel, John Wiley & Sons, Jul. 10, 2009, which is incorporated herein by reference in its entirety]. In some embodiments, the microorganisms or protein product thereof includes one or more of the following carboxydotrophic microorganisms: *Acinetobacter* sp.; *Alcaligenes carboxydus* or other *Alcaligenes* sp.; *Arthrobacter* sp.; *Azomonas* sp.; *Azotobacter* sp.; *Bacillus schlegelii* or other *Bacillus* sp.; *Hydrogenophaga pseudoflava* or other *Hydrogenophaga* sp.; *Pseudomonas carboxydohydrogena*, *Pseudomonas carboxydovorans*, *Pseudomonas compransoris*, *Pseudomonas gazotropha*, *Pseudomonas thermocarboxydovorans*, or other *Pseudomonas* sp.; *Rhizobium japonicum* or other *Rhizobium* sp.; and *Streptomyces* G26, *Streptomyces thermoautotrophicus*, or other *Streptomyces* sp. In some embodiments, the microorganisms or protein product thereof includes a consortium of microorganisms that includes carboxydotrophic microorganisms, such as one or more of the above carboxydotrophic microorganisms. In certain embodiments, a carboxydotrophic microorganism that is capable of chemolithoautotrophy is used. In certain embodiments, a carboxydotrophic microorganism that is able to utilize $H_2$ as an electron donor in respiration and/or biosynthesis is used.

In some embodiments, the microorganisms or protein product thereof includes obligate and/or facultative chemoautotrophic microorganisms, such as one or more of the following: *Acetoanaerobium* sp.; *Acetobacterium* sp.; *Acetogenium* sp.; *Achromobacter* sp.; *Acidianus* sp.; *Acinetobacter* sp.; *Actinomadura* sp.; *Aeromonas* sp.; *Alcaligenes* sp.; *Alcaligenes* sp.; *Aquaspirillum* sp.; *Arcobacter* sp.; *Aureobacterium* sp.; *Bacillus* sp.; *Beggiatoa* sp.; *Butyribacterium* sp.; *Carboxydothermus* sp.; *Clostridium* sp.; *Comamonas* sp.; *Cupriavidus* sp.; *Dehalobacter* sp.; *Dehalococcoide* sp.; *Dehalospirillum* sp.; *Desulfobacterium* sp.; *Desulfomonile* sp.; *Desulfotomaculum* sp.; *Desulfovibrio* sp.; *Desulfurosarcina* sp.; *Ectothiorhodospira* sp.; *Enterobacter* sp.; *Eubacterium* sp.; *Ferroplasma* sp.; *Halothibacillus* sp.; *Hydrogenobacter* sp.; *Hydrogenomonas* sp.; *Leptospirillum* sp.; *Metallosphaera* sp.; *Methanobacterium* sp.; *Methanobrevibacter* sp.; *Methanococcus* sp.; *Methanococcoides* sp.; *Methanogenium* sp.; *Methanolobus* sp.; *Methanomicrobium* sp.; *Methanoplanus* sp.; *Methanosarcina* sp.; *Methanospirillum* sp.; *Methanothermus* sp.; *Methanothrix* sp.; *Micrococcus* sp.; *Nitrobacter* sp.; *Nitrobacteraceae* sp., *Nitrococcus* sp., *Nitrosococcus* sp.; *Nitrospina* sp., *Nitrospira* sp., *Nitrosolobus* sp.; *Nitrosomonas* sp.; *Nitrosospira* sp.; *Nitrosovibrio* sp.; *Nitrospina* sp.; *Oleomonas* sp.; *Paracoccus* sp.; *Peptostreptococcus* sp.; *Planctomycetes* sp.; *Pseudomonas* sp.; *Ralstonia* sp.; *Rhodobacter* sp.; *Rhodococcus* sp.; *Rhodocyclus* sp.; *Rhodomicrobium* sp.; *Rhodopseudomonas* sp.; *Rhodospirillum* sp.; *Shewanella* sp.; *Siderococcus* sp.; *Streptomyces* sp.; *Sulfobacillus* sp.; *Sulfolobus* sp.; *Thermothrix* sp., *Thiobacillus* sp.; *Thiomicrospira* sp.; *Thioploca* sp.; *Thiosphaera* sp.; *Thiothrix* sp.; *Thiovulum* sp.; sulfur-oxidizers; hydrogen-oxidizers; iron-oxidizers; acetogens; and methanogens; consortiums of microorganisms that include chemoautotrophs; chemoautotrophs native to at least one of hydrothermal vents, geothermal vents, hot springs, cold seeps, underground aquifers, salt lakes, saline formations, and soils; and extremophiles selected from one or more of thermophiles, hyperthermophiles, acidophiles, halophiles, and psychrophiles. In some embodiments, the microorganisms, or protein product thereof includes a consortium of microorganisms that includes chemoautotrophic microorganisms, such as one or more of the above chemoautotrophic microorganisms.

In some embodiments, the microorganisms or protein product thereof include extremophiles that can withstand extremes in various environmental parameters, such as temperature, radiation, pressure, gravity, vacuum, desiccation, salinity, pH, oxygen tension, and/or chemicals. Such microorganisms include hyperthermophiles, such as *Pyrolobus fumarii*; thermophiles, such as *Synechococcus lividis*; mesophiles and psychrophiles, such as *Psychrobacter*, and/or extremely thermophilic sulfur-metabolizers such as *Thermoproteus* sp., *Pyrodictium* sp., *Sulfolobus* sp., and *Acidianus* sp.; radiation tolerant organisms such as *Deinococcus radiodurans*; pressure tolerant microorganisms including piezophiles or barophiles; desiccant tolerant and anhydrobiotic microorganisms including xerophiles, such as *Artemia salina*; microbes and fungi; salt tolerant microorganisms including halophiles, such as *Halobacteriacea* and *Dunaliella salina*; pH tolerant microorganisms including alkaliphiles, such as *Natronobacterium, Bacillus firmus* OF4, *Spirulina* spp., and acidophiles such as *Cyanidium caldarium* and *Ferroplasma* sp; gas tolerant microorganisms, e.g., tolerant to pure $CO_2$, including *Cyanidium caldarium*; and metal tolerant microorganisms (metalotolerants), such as *Ferroplasma acidarmanus* and *Ralstonia* sp.

In certain embodiments, the microorganisms or protein product thereof, include a cell line selected from eukaryotic plants, algae, cyanobacteria, green-sulfur bacteria, green non-sulfur bacteria, purple sulfur bacteria, purple non-sulfur bacteria, extremophiles, yeast, fungi, proteobacteria, engineered organisms thereof, and synthetic organisms. In certain embodiments, *Spirulina* is utilized.

In certain embodiments, the microorganisms or protein product thereof includes green non-sulfur bacteria, which include but are not limited to the following genera: *Chloroflexus, Chloronema, Oscillochloris, Heliothrix, Herpetosiphon, Roseiflexus,* and *Thermomicrobium*.

In certain embodiments, the microorganisms or protein product thereof includes green sulfur bacteria, which include but are not limited to the following genera: *Chlorobium, Clathrochloris,* and *Prosthecochloris*.

In certain embodiments, the microorganisms or protein product thereof includes purple sulfur bacteria, which include but are not limited to the following genera: *Allochromatium, Chromatium, Halochromatium, Isochromatium, Marichromatium, Rhodovulum, Thermochromatium, Thiocapsa, Thiorhodococcus*, and *Thiocystis*.

In certain embodiments, the microorganisms or protein product thereof includes purple non-sulfur bacteria, which include but are not limited to the following genera: *Phaeospirillum, Rhodobaca, Rhodobacter, Rhodomicrobium, Rhodopila, Rhodopseudomonas, Rhodothalassium, Rhodospirillum, Rodovibrio*, and *Roseospira*.

In some embodiments, the microorganisms or protein product thereof include a methanotroph and/or a methylotroph. In some embodiments, the microorganism is in the genus *Methylococcus*. In some embodiments, the microorganism is *Methylococcus capsulatus*. In some embodiments, the microorganism is a methylotroph. In some embodiments, the microorganism is in the genus *Methylobacterium*. In some embodiments, the microorganisms include one or more of the following species: *Methylobacterium zatmanii; Methylobacterium extorquens; Methylobacterium chloromethanicum*.

In some embodiments, the microorganisms or protein product thereof a hydrogen-oxidizing chemoautotroph and/or a carboxydotroph and/or a methylotroph and/or methanotroph.

In certain embodiments, the microorganisms or protein product thereof includes microorganisms that can grow heterotrophically, utilizing multi-carbon organic molecules as carbon sources, such as, but not limited to sugars, for example, but not limited to, glucose and/or fructose and/or sucrose. In some embodiments, the microorganism is capable of growing on untreated crude glycerol and/or glucose and/or methanol and/or acetate as the sole electron donor(s) and carbon source(s). In some embodiments, the microorganism is able to grow mixotrophically, for example, mixotrophic growth on an organic carbon source and an inorganic energy source (e.g., inorganic electron donor).

In certain embodiments, the microorganisms or protein product thereof includes one or more of eukaryotic plants, algae, cyanobacteria, green-sulfur bacteria, green non-sulfur bacteria, purple sulfur bacteria, purple non-sulfur bacteria, extremophiles, archaea, yeast, fungi, proteobacteria, engineered organisms thereof, and synthetic organisms.

In some embodiments, the microorganisms comprise or consist of gram-positive bacteria. In other embodiments, the microorganisms comprise or consist of gram-negative bacteria.

In certain embodiments, the microorganisms or protein product thereof includes naturally occurring and/or non-genetically modified (non-GMO) microorganisms and/or non-pathogenic and/or are grown in specific environmental conditions provided by the bioprocesses that are absent from the surrounding environment.

In certain embodiments, the microorganisms or consortium of microorganisms are isolated from environmental samples and enriched with desirable microorganisms using methods known in the art of microbiology, for example, growth in the presence of targeted electron donors, including, but not limited to, one or more of: $H_2$, CO, syngas and/or methane, and/or electron acceptors including, but not limited to, one or more of $O_2$, nitrate, ferric iron, and/or $CO_2$, and/or environmental conditions (e.g., temperature, pH, pressure, dissolved oxygen (DO), salinity, the presence of various impurities and pollutants, etc.).

In certain embodiments, the microorganisms or consortium of microorganisms include probiotic microorganisms. In certain embodiments, the microorganisms or consortium of microorganisms include "generally recognized as safe" (GRAS) microorganisms, e.g., bacterial and/or fungal GRAS microorganisms. In certain embodiments, the microorganisms or consortium of microorganisms include yeast, such as, but not limited to, one or more of the following: *Candida humilis; Candida milleri; Debaryomyces hansenii; Kazachstania exigua (Saccharomyces exiguous); Saccharomyces cerevisiae; Saccharomyces florentinus; Torulaspora delbrueckii; Trichosporon beigelli;* and/or include fungi, such as, but not limited to, one or more of the following: *Aspergillus oryzae; Aspergillus sojae; Fusarium venenatum* A3/5; *Neurospora intermedia* var. *oncomensis; Rhizopus oligosporus; Rhizopus oryzae; Aspergillus luchuensis*; and/or include bacteria, such as, but not limited to, I one or more of the following: *Bacillus amyloliquefaciens; Bacillus subtilis; Bifidobacterium animalis (lactis); Bifidobacterium bifidum; Bifidobacterium breve; Bifidobacterium longum; Lactobacillus acidophilus; Lactobacillus brevis; Lactobacillus casei; Lactobacillus delbrueckii* subsp. *Bulgaricus; Lactobacillus fermentum; Lactobacillus helveticus; Lactobacillus kefiranofaciens; Lactobacillus lactis; Lactobacillus plantarum; Lactobacillus rhamnosus; Lactobacillus reuteri; Lactobacillus sakei; Lactobacillus sanfranciscensis; Lactococcus lactis (Streptococcus lactis, Streptococcus lactis* subsp. *Diacetylactis); Leuconostoc; Leuconostoc carnosum; Leuconostoc cremoris; Leuconostoc mesenteroides; Pediococcus; Propionibacterium freudenreichii; Arthrospira (Spirulina) platensis; Streptococcus faecalis; Streptococcus thermophilus*.

The protein containing biomass from which the protein product is derived may be produced by a consortium of different species of microorganisms. The consortium may optionally include multi-cellular organisms. In some embodiments, the consortium includes one or more of: an oxyhydrogen microorganism; a carboxydotroph; a methanotroph; a methylotroph; a chemoautotroph; a photoautotroph; and a heterotroph.

In some embodiments, the protein product also includes one or more vitamin produced by the microorganisms from which the protein product was derived. In some non-limiting embodiments, the microorganisms include a *Cupriavidus* microorganism, for example, *Cupriavidus necator* (e.g., *Cupriavidus necator* DSM 531 or *Cupriavidus necator* DSM 541). In some non-limiting embodiments, the vitamin is a B vitamin, including but not limited to, vitamin B1, B2, and/or B12. In a non-limiting example, the B vitamin (e.g., B1, B2, and/or B12) may be produced by a *Cupriavidus* microorganism, for example, *Cupriavidus necator* (e.g., *Cupriavidus necator* DSM 531 or *Cupriavidus necator* DSM 541).

Microbial Cultures

Any suitable methods may be used to culture the microorganisms. The microorganism may be grown under any suitable conditions, in an environment that is suitable for growth and production of biomass. In some embodiments, the microorganism may be grown in autotrophic culture conditions, heterotrophic culture conditions, or a combination of autotrophic and heterotrophic culture conditions. A heterotrophic culture may include a suitable source of carbon and energy, such as one or more sugar (e.g., glucose, fructose, sucrose, etc.). An autotrophic culture may include C1 chemicals such as carbon monoxide, carbon dioxide, methane, methanol, formate, and/or formic acid, and/or mixtures containing C1 chemicals, including, but not limited to various syngas compositions or various producer gas compositions, e.g., generated from low value sources of carbon and energy, such as, but not limited to, lignocellulosic energy crops, crop residues, bagasse, saw dust, forestry residue, or food, through the gasification, partial oxidation, pyrolysis, or steam reforming of said low value carbon sources, that can be used by an oxyhydrogen microorganism or hydrogen-oxidizing microorganism or carbon monoxide oxidizing microorganism as a carbon source and an energy source. Suitable methods and apparatus for culturing the microorganisms and generating a biomass for use in the present methods are described, e.g., in PCT Application Nos. US2010/001402, US2011/034218, US2013/032362, US2014/029916, US2017/023110, US2018/016779, and U.S. Pat. No. 9,157,058, each of which is hereby incorporated by reference herein in its entirety. In some embodiments, the organism may be grown photosynthetically in a bioreactor, in a hydroponics system, in a greenhouse, or in a cultivated field, or may be collected from waste or natural sources.

The liquid cultures used to grow microorganism cells described herein can be housed in culture vessels known and used in the art. In some embodiments, large scale production in a bioreactor vessel can be used to produce large quantities of a desired molecule and/or biomass.

In certain embodiments, bioreactor vessels are used to contain, isolate, and/or protect the culture environment. The culture vessels include those that are known to those of ordinary skill in the art of large scale microbial culturing. Such culture vessels include but are not limited to one or more of the following: airlift reactors; biological scrubber columns; bubble columns; stirred tank reactors; continuous stirred tank reactors; counter-current, upflow, expanded-bed reactors; digesters and in particular digester systems, for example, such known in the art of bioremediation; filters including but not limited to trickling filters, rotating biological contactor filters, rotating discs, soil filters; fluidized bed reactors; gas lift fermenters; immobilized cell reactors; loop reactors; membrane biofilm reactors; pachuca tanks; packed-bed reactors; plug-flow reactors; static mixers; trickle bed reactors; and/or vertical shaft bioreactors.

Microbial culturing aimed at the commercial production of biomass and/or organic compounds, e.g., protein product as described herein, specifically single cell protein, cell lysate, protein extract, protein-containing extract, protein concentrate, protein isolate, protein hydrolysate, free amino acids, peptides, oligopeptides, or combinations thereof, and/or other nutrients, such as, but not limited to vitamins (e.g., B vitamins, for example, B1, B2, and/or B12) may be performed in bioreactors at large scale (e.g., 500 L, 1,000 L, 5,000 L, 10,000 L, 50,000 L, 100,000 L, 1,000,000 L bioreactor volumes and higher).

In certain embodiments, chemoautotrophic and/or heterotrophic and/or carboxydotrophic and/or methanotrophic and/or methylotrophic microorganisms are grown in a liquid media inside a bioreactor using methods described herein.

In some embodiments, the bioreactor containing the microorganisms is constructed of opaque materials that keep the culture in near or total darkness. Bioreactors constructed out of opaque materials such as steel and/or other metallic alloys and/or reinforced concrete and/or fiberglass and/or various high strength plastic materials can be designed to have large working volumes. In some embodiments, fermenters constructed of steel or other metallic alloys that are 50,000 liters and greater in volume are utilized. In some embodiments, bioreactors capable of containing positive headspace pressures above ambient pressure are utilized. In some embodiments, egg-shape or cylindrical digesters or vertical shaft bioreactors 3,000,000 liters and greater in volume are utilized. In some embodiments, the bioreactor comprising the microorganism does not allow light to penetrate part or most or all of its contained liquid volume. In certain non-limiting embodiments, the microorganism used in the $CO_2$-fixation step is not photosynthetic. In certain non-limiting embodiments, the bioreactor design does not confine the culture in thin layers or have transparent walls so as to have light available to all parts, as is generally necessary with photosynthesis. In some embodiments, the microorganism is cultured without significant or any exposure to light. In certain such embodiments, net $CO_2$ consumption still occurs in the absence of light due to chemoautotrophic metabolism and conditions. In certain embodiments, converting electricity to artificial light is not required in a biological system for $CO_2$ capture and conversion.

In certain embodiments, the lack of light dependence facilitates continuous $CO_2$ capture operations, day and night, year-round, in all weather conditions, without the need for any artificial lighting.

In some embodiments, the microorganisms are grown and maintained in a medium containing a gaseous carbon source, such as but not limited to syngas, producer gas, or gas mixtures containing $H_2$ and $CO_2$, in the absence of light; where such growth is known as chemoautotrophic growth.

In some embodiments, syngas, for example, generated from gasification of organic matter is utilized by the microorganisms for chemoautotrophic growth. The organic matter may be, for example, from an agricultural source (e.g., corn stover, bagasse).

In some embodiments, food grade $CO_2$ and/or air that goes through a direct air capture unit is utilized by the microorganisms for chemoautotrophic growth. Non-limiting examples of direct air capture may be found in U.S. Publication No. 2017/0106330 and Keith, D., et al. (2018) Joule 2 (8):1573-1594, which are incorporated by reference herein in their entireties. In some embodiments, $CO_2$ is provided from an industrial source, and optionally may be concentrated via a gas separation procedure, thereby resulting in high concentration food grade $CO_2$.

In certain embodiments, an increase in system capacity is met by vertical scaling, rather than only scaling horizontally. This is in contrast to phototrophic approaches using algae, cyanobacteria, or higher-plants for $CO_2$ capture. Although various vertical farming schemes have been proposed for photosynthetic systems, practically and economically speaking, phototrophic systems must expand horizontally, for example in shallow ponds or photobioreactors in the case of algae. This results in large geographic footprints and many negative environmental impacts.

An algal or higher plant system grown with artificial lighting is challenged by inefficient utilization of light energy, and by inefficient conversion of electrical energy to light energy. In certain embodiments, a comparable algal or high-plant culture grown under artificial lighting will require more electrical power than the $CO_2$ capture and/or biomass production system described herein, in terms of $CO_2$ capture and/or biomass production. In certain embodiments, a comparable algal or higher-plant culture grown under artificial lighting will require at least ten times more electrical power than the $CO_2$ capture and/or biomass production system described herein, in terms of power per unit $CO_2$ capture and/or biomass production. For algae or higher-plants grown on artificial lighting, the heat rejection requirement is almost in direct proportion to the electrical input. In certain embodiments of the methods described herein, the heat rejection requirements are lower than for a comparable algal or higher plant system, in terms of $CO_2$ capture and/or biomass production when grown on artificial lighting. In certain embodiments, the heat rejection requirements are at least ten times lower than for a comparable algal or higher plant system, in terms of $CO_2$ capture and/or biomass production when grown on artificial lighting.

In an exemplary but nonlimiting embodiment, a bioreactor containing nutrient medium is inoculated with production cells. Generally, there will follow a lag phase prior to the cells beginning to double. After the lag phase, the cell doubling time decreases and the culture goes into the logarithmic phase. The logarithmic phase is eventually followed by an increase of the doubling time that, while not intending to be limited by theory, is thought to result from either a mass transfer limitation, depletion of nutrients including nitrogen or mineral sources, or a rise in the concentration of inhibitory chemicals, or quorum sensing by the microbes. The growth slows down and then ceases when the culture enters the stationary phase. In certain embodiments, there is an arithmetic growth phase preceding the stationary phase. In order to harvest cell mass, the culture in certain embodiments is harvested in the logarithmic phase and/or in the arithmetic phase and/or in the stationary phase.

The bioreactor or fermenter is used to culture cells through the various phases of their physiological cycle. A bioreactor is utilized for the cultivation of cells, which may be maintained at particular phases in their growth curve. The use of bioreactors is advantageous in many ways for cultivating chemoautotrophic growth. For certain embodiments, protein-rich cell mass, which is used to produce proteins or protein hydrolysates, is grown to high densities in liquid suspension. Generally, the control of growth conditions, including control of dissolved carbon dioxide, oxygen, and other gases such as hydrogen, as well as other dissolved nutrients, trace elements, temperature and pH, is facilitated in a bioreactor. For certain embodiments, protein-rich cell mass, which is used to produce amino acids, peptides, proteins, hydrolysates, extracts, or whole cell products, is grown to high densities and/or grown at high productivities, in liquid suspension within a bioreactor.

Nutrient media, as well as gases, can be added to the bioreactor as either a batch addition, or periodically, or in response to a detected depletion or programmed set point, or continuously over the period the culture is grown and/or maintained. For certain embodiments, the bioreactor at inoculation is filled with a starting batch of nutrient media and/or one or more gases at the beginning of growth, and no additional nutrient media and/or one or more gases are added after inoculation. For certain embodiments, nutrient media and/or one or more gases are added periodically after inoculation. For certain embodiments, nutrient media and/or one or more gases are added after inoculation in response to a detected depletion of nutrient and/or gas. For certain embodiments, nutrient media and/or one or more gases are added continuously after inoculation.

For certain embodiments, the added nutrient media does not contain any organic compounds.

In certain embodiments, a small amount of microorganism cells (i.e., an inoculum) is added to a set volume of culture medium; the culture is then incubated; and the cell mass passes through lag, exponential, deceleration, and stationary phases of growth.

In batch culture systems, the conditions (e.g., nutrient concentration, pH, etc.) under which the microorganism is cultivated generally change continuously throughout the period of growth. In certain non-limiting embodiments, to avoid the fluctuating conditions inherent in batch cultures, and to improve the overall productivity of the culture system, the microorganisms that are used for the production of protein and/or vitamins and/or other nutrients are grown in a continuous culture system called a chemostat. In such systems. The culture may be maintained in a perpetual exponential phase of growth by feeding it with fresh medium at a constant rate [F] while at the same time maintaining the volume [V] of the culture constant. In certain embodiments, a continuous culture system ensures that cells are cultivated under environmental conditions that remain roughly constant. In certain embodiments, the cells are maintained in a perpetual exponential phase through the use of a chemostat system. In certain cases, the culture is maintained in a steady state with a roughly fixed amount of standing biomass maintained in the bioreactor over time. In such a case the dilution rate (D) of the culture equals the growth rate of the microorganism, and is given by: $D=F/V$. The growth rate of a microorganism in continuous culture may be changed by altering the dilution rate. In certain embodiments, the growth rate of the microorganism is changed by altering the dilution rate. In certain non-limiting embodiments, cells are grown in a chemostat at a dilution rate of around $0.2\ h^{-1}$. In certain embodiments, the continuous bioreactor is maintained as a turbidostat, where a fixed amount of standing biomass is maintained in the bioreactor over time, and where all surplus biomass that is produced beyond that necessary to maintain the fixed amount of standing biomass within the bioreactor, is harvested continuously from the bioreactor.

In certain embodiments, inoculation of the culture into the bioreactor is performed by methods including but not limited to transfer of culture from an existing culture inhabiting another bioreactor, or incubation from a seed stock raised in an incubator. In certain embodiments, the seed stock of the strain may be transported and stored in forms including but not limited to a powder, liquid, frozen, or freeze-dried form as well as any other suitable form, which may be readily recognized by one skilled in the art. In certain non-limiting embodiments, the reserve bacterial cultures are kept in a metabolically inactive, freeze-dried state until required for restart. In certain embodiments, when establishing a culture in a very large reactor, cultures are grown and established in progressively larger intermediate scale vessels prior to inoculation of the full-scale vessel.

For certain embodiments, the bioreactors have mechanisms to enable mixing of the nutrient media that include, but are not limited to, one or more of the following: spinning stir bars, blades, impellers, or turbines; spinning, rocking, or turning vessels; gas lifts, sparging; recirculation of broth from the bottom of the container to the top via a recirculation conduit, flowing the broth through a loop and/or static mixers. The culture media may be mixed continuously or intermittently.

In certain embodiments the microorganism-containing nutrient medium may be removed from the bioreactor partially or completely, periodically or continuously, and in certain embodiments is replaced with fresh cell-free medium to maintain the cell culture in an exponential growth phase, and/or in another targeted growth phase (e.g. arithmetic growth), and/or to replenish the depleted nutrients in the growth medium, and/or remove inhibitory waste products.

The ports that are standard in bioreactors may be utilized to deliver, or withdraw, gases, liquids, solids, and/or slurries, into and/or from the bioreactor vessel enclosing the microbes. Many bioreactors have multiple ports for different purposes (e.g., ports for media addition, gas addition, probes for pH and DO, and sampling), and a given port may be used for various purposes during the course of a fermentation run. As an example, a port might be used to add nutrient media to the bioreactor at one point in time, and at another time might be used for sampling. Preferably, the multiple uses of a sampling port can be performed without introducing contamination or invasive species into the growth environment. A valve or other actuator enabling control of the sample flow or continuous sampling can be provided to a sampling port. For certain embodiments, the bioreactors are equipped with at least one port suitable for culture inoculation that can additionally serve other uses including the addition of media or gas. Bioreactor ports enable control of the gas composition and flow rate into the culture environment. For example, the ports can be used as gas inlets into the bioreactor through which gases are pumped.

For some embodiments, gases that may be pumped into a bioreactor include, but not are not limited to, one or more of the following: syngas, producer gas, hydrogen gas, CO, $CO_2$, $O_2$, air, air/$CO_2$ mixtures, natural gas, methane, ammonia, nitrogen, noble gases, such as argon, as well as other gases. In some embodiments the $CO_2$ pumped into the system may come from sources including, but not limited to: $CO_2$ from the gasification of organic matter; $CO_2$ from the calcination of limestone, $CaCO_3$, to produce quicklime, CaO; $CO_2$ from methane steam reforming, such as the $CO_2$ byproduct from ammonia, methanol, or hydrogen production; $CO_2$ from combustion, incineration, or flaring; $CO_2$ byproduct of anaerobic or aerobic fermentation of sugar; $CO_2$ byproduct of a methanotrophic bioprocess; geologically or geothermally produced or emitted $CO_2$; $CO_2$ removed from acid gas or natural gas. In certain non-limiting embodiments, the $CO_2$ has been removed from an industrial flue gas, or intercepted from a geological source that would otherwise naturally emit into the atmosphere. In certain embodiments, the carbon source is $CO_2$ and/or bicarbonate and/or carbonate dissolved in sea water or other bodies of surface or underground water. In certain such embodiments the inorganic carbon may be introduced to the bioreactor dissolved in liquid water and/or as a solid. In certain embodiments, the carbon source is $CO_2$ captured from the atmosphere. In certain non-limiting embodiments, the $CO_2$ has been captured from a closed cabin as part of a closed-loop life support system, using equipment such as but not limited to a $CO_2$ removal assembly (CDRA), which is utilized, for example, on the International Space Station (ISS).

In certain non-limiting embodiments, geological features such as, but not limited to, geothermal and/or hydrothermal vents that emit high concentrations of energy sources (e.g. $H_2$, $H_2S$, CO gases) and/or carbon sources (e.g. $CO_2$, $HCO_3^-$, $CO_3^{2-}$) and/or other dissolved minerals may be utilized as nutrient sources for the microorganisms herein.

In certain embodiments, one or more gases in addition to carbon dioxide, or in place of carbon dioxide as an alternative carbon source, are either dissolved into solution and fed to the culture broth and/or dissolved directly into the culture broth, including but not limited to gaseous electron donors and/or carbon sources (e.g., hydrogen and/or CO and/or methane gas). In certain embodiments, input gases may include other electron donors and/or electron acceptors and/or carbon sources and/or mineral nutrients such as, but not limited to, other gas constituents and impurities of syngas (e.g., hydrocarbons); ammonia; hydrogen sulfide; and/or other sour gases; and/or $O_2$; and/or mineral containing particulates and ash.

In certain embodiments, one or more gases are dissolved into the culture broth, including but not limited to gaseous electron donors such as, but not limited to, one or more of the following: hydrogen, carbon monoxide, methane, hydrogen sulfide or other sour gases; gaseous carbon sources such as, but not limited to one or more of the following: $CO_2$, CO, $CH_4$; and electron acceptors such as, but not limited to, oxygen, either within air (e.g., 20.9% oxygen) or as pure $O_2$ or as an $O_2$-enriched gas. In some embodiments, the dissolution of these and other gases into solution is achieved using a system of compressors, flowmeters, and flow valves known to one skilled in the art of fermentation engineering, that feed into one of more of the following widely used systems for dispersing gas into solution: sparging equipment; diffusers including but not limited to dome, tubular, disc, or doughnut geometries; coarse or fine bubble aerators; venturi equipment. In certain embodiments, surface aeration and/or gas mass transfer may also be performed using paddle aerators and the like. In certain embodiments, gas dissolution is enhanced by mechanical mixing with an impeller or turbine, as well as hydraulic shear devices to reduce bubble size. Following passage through the reactor system holding microorganisms which uptake the gases, in certain embodiments the residual gases may either be recirculated back to the bioreactor, or burned for process heat, or flared, or injected underground, or released into the atmosphere. In certain embodiments herein utilizing $H_2$ as electron donor, $H_2$ may be fed to the culture vessel either by bubbling it through the culture medium, or by diffusing it through a hydrogen permeable-water impermeable membrane known in the art that interfaces with the liquid culture medium.

In certain embodiments, the microorganisms grow and multiply on $H_2$ and $CO_2$ and other dissolved nutrients under microaerobic conditions. In certain embodiments, a C1 chemical such as but not limited to carbon monoxide, methane, methanol, formate, or formic acid, and/or mixtures containing C1 chemicals including but not limited to various syngas compositions generated from various gasified, pyrolyzed, or steam-reformed fixed carbon feedstocks, are biochemically converted into longer chain organic chemicals (i.e., C2 or longer and, in some embodiments, C5 or longer carbon chain molecules) under one or more of the following conditions: aerobic, microaerobic, anoxic, anaerobic, and/or facultative conditions.

A controlled amount of oxygen can also be maintained in the culture broth of some embodiments, and in certain embodiments, oxygen will be actively dissolved into solution fed to the culture broth and/or directly dissolved into the culture broth. In certain aerobic or microaerobic embodiments that require the pumping of air or oxygen into the culture broth in order to maintain targeted DO levels, oxygen bubbles may be injected into the broth at an optimal diameter for mixing and oxygen transfer. In some embodiments, conditions suitable for growth of an oxyhydrogen microorganism are deployed, such as use of $H_2$ and $O_2$ gas substrates (electron donors and acceptors), and optionally a C1 gaseous carbon source, such as $CO_2$ and/or CO.

In some embodiments, the microorganisms convert a fuel gas, including but not limited to syngas, producer gas, CO, $CO_2$, $H_2$, natural gas, methane, and mixtures thereof. In some embodiments, the heat content of the fuel gas is at least 100 BTU per standard cubic foot (scf). In some embodiments, a bioreactor that is used to contain and grow the microorganisms is equipped with fine-bubble diffusers and/or high-shear impellers for gas delivery.

Introducing and/or raising the gas flow rate into a bioreactor can enhance mixing of the culture and produce turbulence if the gas inlet is positioned beneath the surface of the liquid media such that gas bubbles or sparges up through the media. In certain embodiments, mixing is enhanced through turbulence provided by gas bubbles and/or sparging and/or gas plugging up through the liquid media. In some embodiments, a bioreactor comprises gas outlet ports for gas escape and pressure release. In some embodiments, gas inlets and outlets are preferably equipped with check valves to prevent gas backflow.

In certain embodiments where chemosynthetic reactions occur within the bioreactor, one or more types of electron donor and one or more types of electron acceptor are pumped or otherwise added as either a bolus addition, or periodically, or continuously to the nutrient medium containing chemoautotrophic organisms in the reaction vessel. The chemosynthetic reaction, driven by the transfer of electrons from electron donor to electron acceptor in cellular respiration, fixes inorganic carbon dioxide and/or other dissolved carbonates and/or other carbon oxides into organic compounds and biomass.

In certain embodiments a nutrient media for culture growth and production is used, comprising an aqueous solution containing suitable minerals, salts, vitamins, cofactors, buffers, and other components needed for microbial growth, known to those skilled in the art [Bailey and Ollis, Biochemical Engineering Fundamentals, $2^{nd}$ ed; pp 383-384 and 620-622; McGraw-Hill: New York (1986)].

In certain embodiments, the chemicals used for maintenance and growth of microbial cultures as known in the art are included in the nutrient media. In certain embodiments, these chemicals may include but are not limited to one or more of the following: nitrogen sources such as ammonia, ammonium (e.g., ammonium chloride ($NH_4Cl$), ammonium sulfate (($NH_4)_2SO_4$)), nitrate (e.g., potassium nitrate ($KNO_3$)), urea or an organic nitrogen source; phosphate (e.g., disodium phosphate ($Na_2HPO_4$), potassium phosphate ($KH_2PO_4$), phosphoric acid ($H_3PO_4$), potassium dithiophosphate ($K_3PS_2O_2$), potassium orthophosphate ($K_3PO_4$), dipotassium phosphate ($K_2HPO_4$)); sulfate; yeast extract; chelated iron; potassium (e.g., potassium phosphate ($KH_2PO_4$), potassium nitrate ($KNO_3$), potassium iodide (KI), potassium bromide (KBr)); and other inorganic salts, minerals, and trace nutrients (e.g., sodium chloride (NaCl), magnesium sulfate ($MgSO_4 \cdot 7H_2O$) or magnesium chloride ($MgCl_2$), calcium chloride ($CaCl_2$) or calcium carbonate ($CaCO_3$), manganese sulfate ($MnSO_4 \cdot 7H_2O$) or manganese chloride ($MnCl_2$), ferric chloride ($FeCl_3$), ferrous sulfate ($FeSO_4 \cdot 7H_2O$) or ferrous chloride ($FeCl_2 \cdot 4H_2O$), sodium bicarbonate ($NaHCO_3$) or sodium carbonate ($Na_2CO_3$), zinc sulfate ($ZnSO_4$) or zinc chloride ($ZnCl_2$), ammonium molybdate ($NH_4MoO_4$) or sodium molybdate ($Na_2MoO_4 \cdot 2H_2O$), cuprous sulfate ($CuSO_4$) or copper chloride ($CuCl_2 \cdot 2H_2O$), cobalt chloride ($CoCl_2 \cdot 6H_2O$), aluminum chloride ($AlCl_3 \cdot 6H_2O$), lithium chloride (LiCl), boric acid ($H_3BO_3$), nickel chloride $NiCl_2 \cdot 6H_2O$), tin chloride ($SnCl_2 \cdot H_2O$), barium chloride ($BaCl_2 \cdot 2H_2O$), copper selenate ($CuSeO_4 \cdot 5H_2O$) or sodium selenite ($Na_2SeO_3$), sodium metavanadate ($NaVO_3$), chromium salts). In certain embodiments, the mineral salts medium (MSM) formulated by Schlegel et al may be used ["Thermophilic bacteria", Jakob Kristjansson, Chapter 5, Section III, CRC Press, (1992)].

Microorganisms described herein can be cultured in some embodiments in media of any type (rich or minimal), including fermentation medium, and any composition. As would be understood by one of ordinary skill in the art, routine optimization would allow for use of a variety of types of media. The selected medium can be supplemented with various additional components. Some non-limiting examples of supplemental components include glucose, fructose, sucrose, starches, polysaccharides, protein hydrolysates, antibiotics, IPTG for gene induction, and ATCC Trace Mineral Supplement. Similarly, other aspects of the medium and growth conditions of the microorganisms described herein may be optimized through routine experimentation. For example, pH and temperature are non-limiting examples of factors which can be optimized. In some embodiments, factors such as choice of media, media supplements, and temperature can influence production levels of a desired molecule. In some embodiments, the concentration and amount of a supplemental component may be optimized. In some embodiments, how often the media is supplemented with one or more supplemental components, and the amount of time that the media is cultured before harvesting the desired molecule is optimized.

In certain embodiments, the concentrations of nutrient chemicals (e.g., electron donors, electron acceptors, carbon sources, and/or various mineral nutrients), are maintained within the bioreactor close to or at their respective optimal levels for optimal carbon uptake and/or fixation and/or conversion and/or production of biomass and/or organic compounds, and in particular protein, which varies depending upon the microorganism utilized but may be routinely determined and/or optimized by one of ordinary skill in the art of culturing microorganisms.

In certain embodiments, one or more of the following parameters are monitored and/or controlled in the bioreactor: waste product levels; pH; temperature; salinity; dissolved oxygen; dissolved carbon dioxide gas; liquid flow rates; agitation rate; gas pressure. In certain embodiments, the operating parameters affecting chemoautotrophic growth, and/or other types of growth (e.g., heterotrophic growth) are monitored with sensors (e.g., dissolved oxygen probe or oxidation-reduction probe to gauge electron donor/acceptor concentrations), and/or are controlled either manually or automatically based upon feedback from sensors through the use of equipment including but not limited to actuating valves, pumps, and agitators. In certain embodiments, the temperature of the incoming broth as well as of incoming gases is regulated by systems such as, but not limited to, coolers, heaters, and/or heat exchangers.

In certain embodiments, the microbial culture and bioreaction is maintained using continuous influx and removal of nutrient medium and/or biomass, in steady state where the cell population and environmental parameters (e.g., cell density, pH, DO, chemical concentrations) are targeted at a constant level over time. In certain embodiments, the constant level is an optimal level for feedstock conversion and/or production of targeted organic compounds. In certain embodiments the targeted organic compounds comprise proteins and/or amino acids. In certain embodiments, cell densities can be monitored by direct sampling, by a correlation of optical density to cell density, and/or with a particle size analyzer. In certain embodiments, the hydraulic and biomass retention times can be decoupled so as to allow independent control of both the broth chemistry and the cell density. In certain embodiments, dilution rates can be kept high enough so that the hydraulic retention time is relatively low compared to the biomass retention time, resulting in a highly replenished broth for cell growth and/or feedstock conversion and/or production of organic compounds. In certain embodiments, dilution rates are set at an optimal technoeconomic trade-off between culture broth and nutrient replenishment and/or waste product removal, and increased process costs from pumping, increased inputs, and other demands that rise with dilution rates.

In certain embodiments, the pH of the microbial culture is controlled. In certain embodiments, pH is controlled within an optimal range for microbial maintenance and/or growth and/or conversion of feedstock and/or production of organic compounds and/or survival. To address a decrease in pH, in certain embodiments a neutralization step can be performed directly in the bioreactor environment or prior to recycling the media back into the culture vessel through a recirculation loop. Neutralization of acid in the broth of certain embodiments can be accomplished by the addition of bases, including but not limited to one or more of the following: limestone, lime, sodium hydroxide, ammonia, ammonium hydroxide, caustic potash, magnesium oxide, iron oxide, alkaline ash.

In certain embodiments, an aqueous suspension of chemoautotrophic microorganisms converts one or more electron donors and $CO_2$ into protoplasm. In certain embodiments the said protoplasm comprises proteins, peptides, and/or amino acids. In certain embodiments, an aqueous suspension of hydrogen-oxidizing microorganisms can be used to convert hydrogen and carbon dioxide into microbial protoplasm. In certain embodiments, an aqueous suspension of carbon monoxide-oxidizing microorganisms can be used to convert carbon monoxide and hydrogen and/or water into protoplasm. In certain embodiments, an aqueous suspension of methane-oxidizing microorganisms can be used to convert methane into protoplasm. In certain embodiments, the microorganism in suspension is a bacterium or an archaeon. In certain non-limiting embodiments, an aqueous suspension or biofilm of $H_2$-oxidizing chemoautotrophic microorganisms converts $H_2$ and $CO_2$, along with some other dissolved mineral nutrients, into biochemicals and protoplasm. In certain embodiments the said biochemicals and/or protoplasm comprises proteins, peptides, and/or amino acids. In certain embodiments, the other dissolved mineral nutrients include, but are not limited to, a nitrogen source, a phosphorous source, and a potassium source. In certain embodiments, the protoplasm produced is of food value to humans and/or other animals and/or other heterotrophs. In certain embodiments, certain biochemicals may be extracted from the protoplasm and/or extracellular broth, which have nutrient value, and/or value in a variety of organic chemistry or fuel applications. In certain embodiments, the intracellular energy to drive this production of protoplasm is derived from the oxidation of an electron donor by an electron acceptor. In certain non-limiting embodiments, the electron donor includes, but is not limited to, one or more of the following: $H_2$; CO; $CH_4$. In certain non-limiting embodiments, the electron acceptor includes but is not limited to $O_2$ and/or $CO_2$. In certain non-limiting embodiments, the product of the energy generating reaction, or respiration, includes but is not limited to water. In certain embodiments, the intracellular energy derived from respiration used to drive this synthesis of biochemicals and protoplasm from $CO_2$ is stored and carried in biochemical molecules including, but not limited to, ATP. For the knallgas microbes used in certain embodiments herein, the electron acceptor is $O_2$ and the product of respiration is water.

In some embodiments the protein production and/or distribution of amino acid molecules produced is optimized through one or more of the following: control of bioreactor conditions, control of nutrient levels, and/or genetic modifications of the cells. In certain embodiments, pathways to amino acids, or proteins, or other nutrients, or whole cell products are controlled and optimized for the production of chemical products by maintaining specific growth conditions (e.g., levels of electron donors, nitrogen, oxygen, phosphorous, sulfur, trace micronutrients such as inorganic ions, and if present any regulatory molecules that might not generally be considered a nutrient or energy source). In certain embodiments, dissolved oxygen (DO) may be optimized by maintaining the broth in aerobic, microaerobic, anoxic, anaerobic, or facultative conditions, depending upon the requirements of the microorganisms. A facultative environment is considered to be one having aerobic upper layers and anaerobic lower layers caused by stratification of the water column. The biosynthesis of amino acids, or proteins, or other nutrients, or whole cell products by the microbes disclosed herein can happen during the logarithmic phase, the arithmetic phase, or afterwards during the stationary phase when cell doubling has stopped, provided there is sufficient supply of carbon and energy and other nutrient sources.

In some embodiments, the growth medium for a microorganism described herein includes a protein and/or nutrient source from another microorganism (e.g., cell lysate, protein hydrolysate, peptides, oligopeptides, and/or amino acids, and/or organic molecules and/or other nutrients from a different microorganism). In some embodiments, the microorganism in the growth medium is a GRAS microorganism. In one embodiment, the growth medium for a lactic acid bacterium, such as, but not limited to, a *Lactococcus, Lactobacillus, Enterococcus, Streptococcus*, or *Pediococcus* bacterium (for example, a GRAS lactic acid bacterium, such as a GRAS *Lactococcus, Lactobacillus, Enterococcus, Streptococcus*, or *Pediococcus* bacterium), includes cell lysate, protein hydrolysate, peptides, oligopeptides, and/or amino acids, and/or organic molecules and/or other nutrients from a different microorganism, such as, but not limited to, a *Cupriavidus* microorganism, such as, but not limited to *Cupriavidus necator*, for example, *Cupriavidus necator* DSM 531 or DSM 541. In another embodiment, growth medium for a fungal microorganism, such as a *Fusarium* or *Rhizopus* or *Aspergillus* fungal microorganism (for example, a GRAS fungal microorganism, such as a GRAS *Fusarium* or *Rhizopus* or *Aspergillus* fungal microorganism), such as but not limited to, *Fusarium venenatum, Rhizopus oligosporus, Rhizopus oryzae, Aspergillus oryzae*, or *Aspergillus sojae* includes whole cell biomass, cell lysate, protein hydrolysate, peptides, oligopeptides, and/or amino acids, and/or organic molecules and/or other nutrients from a different microorganism, such as, but not limited to, a *Cupriavidus* microorganism, such as, but not limited to *Cupriavidus necator*, for example, *Cupriavidus necator* DSM 531 or DSM 541.

In some embodiments, a fungal microorganism that is capable of lysing bacterial cells and/or hydrolyzing bacterial protein is cultured in the presence of such bacterial cells or nutrients derived from such bacterial cells. For example, bacterial biomass may be isolated and optionally dewatered or optionally deactivated, and then fungal microorganisms inoculated onto the bacterial biomass, or fungal microorganisms may be cultured in a growth medium as described herein, in the presence of bacterial biomass and/or bacterially derived nutrients. In certain nonlimiting embodiments, the fungal microorganisms include *Fusarium* or *Rhizopus* or *Aspergillus* microorganisms, such as but not limited to,

*Fusarium venenatum, Rhizopus oligosporus, Rhizopus oryzae, Aspergillus oryzae*, or *Aspergillus sojae*. In certain non-limiting embodiments, the edible fungal species *Agaricus bisporus* is cultivated on media comprising protein-rich cells and/or nutrients produced according to the present invention. In certain embodiments, *Agaricus bisporus* lyses cells produced according to the present invention. In certain such embodiments the *Agaricus bisporus* utilizes proteins, amino acids, and/or other nutrients released by the said lysis of cells for nutrition and growth.

The specific examples of bioreactors, culture conditions, heterotrophic and chemotrophic growth, maintenance, and amino acids, or proteins, or other nutrients, or whole cell product production methods described herein can be combined in any suitable manner to improve efficiencies of microbial growth and amino acid, or protein, or other nutrient, or whole cell production.

Electron Donors and Acceptors

In certain non-limiting embodiments, microorganisms described herein are grown chemoautotrophically. For example, the microorganism growth may utilize biosynthetic reduction of $CO_2$, utilizing $O_2$ electron acceptor and/or $H_2$ electron donor. In certain embodiments, $O_2$ and $H_2$ are generated by the electrolysis of water. In certain non-limiting embodiments, part of the $O_2$ generated by electrolysis of water, and all of the $H_2$, is fed to an aqueous suspension of microorganisms as described herein. In certain non-limiting embodiments, the molar ratio of $H_2$ fed to an aqueous suspension of microorganisms to the moles of $O_2$ is greater than 2:1. In certain non-limiting embodiments where $O_2$ electron acceptor and $H_2$ electron donor are generated by the electrolysis of water, there is a surplus of $O_2$ remaining after all of the metabolic requirements for $H_2$ and $O_2$ of the microorganisms described herein have been met. In certain such embodiments the surplus $O_2$ may be supplied to humans and/or other aerobic lifeforms and/or to hydroponic systems for root aeration and/or is used in a gasification or partial oxidation or combustion process and/or is stored and sold as a chemical co-product.

In certain embodiments that utilize molecular hydrogen as an electron donor, there can be a chemical co-product formed in the generation of molecular hydrogen using a renewable and/or $CO_2$ emission-free energy input. In certain embodiments, the oxyhydrogen reaction used in respiration is enzymatically linked to oxidative phosphorylation. In certain embodiments, the ATP and/or other intracellular energy carriers thus formed are utilized in the anabolic synthesis of amino acids and/or proteins. In certain embodiments, the oxygen produced by water-splitting in excess of what is required for respiration in order to maintain optimal conditions for carbon fixation and organic compound production by the knallgas microorganisms, may be processed into a form suitable for sale through process steps known in the art and science of commercial oxygen gas production.

Certain embodiments apply hydrogen-oxidizing and/or CO-oxidizing and/or $CH_4$ oxidizing microorganisms that use more electronegative electron acceptors than $CO_2$ in energy conserving reactions for ATP production (e.g., respiration), such as but not limited to $O_2$. For example, hydrogenotrophic oxyhydrogen or knallgas microbes that couple the oxyhydrogen reaction, $2H_2+O_2 \rightarrow 2 H_2O$, to ATP production, can produce more ATP per $H_2$ and/or other electron donor consumed for respiration, than acetogens or methanogens that use $CO_2$ as an electron acceptor in respiration. For example, knallgas microorganisms can produce at least two ATP per $H_2$ consumed in respiration [L. Bongers (1970) "Energy generation and utilization in hydrogen bacteria" *Journal of bacteriology* 104 (1):145-151 (http://jb.asm.org/content/104/1/145.abstract), which is incorporated herein by reference in its entirety], which is eight times more ATP produced per $H_2$ consumed in respiration than what can be produced in microorganisms undergoing methanogenesis or acetogenesis, using $H_2$ as electron donor and $CO_2$ as electron acceptor in respiration. For this reason, using microorganisms that can utilize more electronegative electron acceptors in respiration and in the production of ATP, such as but not limited to knallgas microbes, for anabolic biosynthesis such as but not limited to amino acid or protein or fatty acid biosynthesis from syngas or $H_2$, can be more efficient than using acetogens or methanogens, such as those which are currently used in biological gas-to-chemical (GTC) technologies for the production of short chain acids or alcohols (e.g., acetic acid or ethanol). In certain embodiments, the oxyhydrogen reaction used in respiration is enzymatically linked to oxidative phosphorylation. In certain embodiments, aerobic respiration is utilized by the microorganism cells described herein for the production of ATP. In certain embodiments, the ATP and/or other intracellular energy carriers thus formed are utilized in the anabolic biosynthesis of amino acids and/or proteins. In some embodiments, a knallgas and/or carboxydotrophic and/or methanotrophic and/or heterotrophic microorganism or a composition or consortium comprising these microorganisms is utilized, wherein the microorganism expresses one or more enzymes that enables biosynthesis of useful carbon-based products of interest including but not limited to chemicals, monomers, polymers, proteins, polysaccharides, vitamins, nutraceuticals, antibiotics, or pharmaceutical products or intermediates thereof from a carbon-containing gas feedstock, including but not limited to syngas or producer gas or natural gas or biogas or $CO_2$ combined with renewable $H_2$ or CO or methane containing gases. In some embodiments, these said carbon-based products of interest can be biosynthesized heterotrophically from an organic multi-carbon feedstock, such as, but not limited to glucose, fructose, sucrose, and other sugars. In some non-limiting embodiments, a microorganism, or a composition comprising a microorganism is utilized, wherein the microorganism requires less than $4H_2$ or NADH to produce one ATP through respiration. In other non-limiting embodiments, a microorganism is utilized that produces more than one ATP per $H_2$ or NADH consumed through respiration. In other non-limiting embodiments a microorganism is utilized that produces at least two ATP per $H_2$ or NADH consumed through respiration, or at least 2.5 ATP per $H_2$ or NADH consumed through respiration.

An additional feature of certain non-limiting embodiments regards the source, production, or recycling of the electron donors used by chemoautotrophic microorganisms to fix carbon dioxide and/or other C1 feedstocks into organic compounds. The electron donors used for carbon dioxide capture and carbon fixation can be produced or recycled in certain embodiments electrochemically or thermochemically using power from a number of different renewable and/or low carbon emission energy technologies including but not limited to: photovoltaics, solar thermal, wind power, hydroelectric, nuclear, geothermal, enhanced geothermal, ocean thermal, ocean wave power, tidal power. Many of the reduced inorganic chemicals upon which chemoautotrophs can grow (e.g. $H_2$, CO, $H_2S$, ferrous iron, ammonium, $Mn^{2+}$) can be readily produced using electrochemical and/or thermochemical processes well known in the art and science of chemical engineering that can be powered by a variety carbon dioxide emission-free or low-carbon emission and/or renewable sources of power including but not limited to photovoltaics, solar thermal, wind power, hydroelectric, nuclear, geothermal, enhanced geothermal, ocean thermal, ocean wave power, or tidal power.

The production of hydrogen from renewable energy sources is gradually replacing the generation from fossil feedstock systems, and the technical advances in the energy sector are expected to lower the prices of green hydrogen production in the near future. For instance, electrical energy efficiencies up to 73% are already achieved by commercial and industrial grade electrolyzers, and research on new materials and electrolyzer configurations have shown possible efficiencies as high as 96%. Certain embodiments utilize a commercially available electrolysis technology with electrical energy efficiency of over 70% for the generation of $H_2$ electron donor and/or $O_2$ electron acceptor. Certain embodiments use electrolysis technologies with 73% or higher energy efficiency, and/or up to 96% energy efficiency, or higher.

In certain embodiments that use molecular hydrogen as electron donor, the $H_2$ is generated by methods well known to art and science of chemical and process engineering, including but not limited to one or more of the following: through electrolysis of water including but not limited to approaches using Proton Exchange Membranes (PEM), liquid electrolytes such as KOH, alkaline electrolysis, Solid Polymer Electrolyte electrolysis, high-pressure electrolysis, high temperature electrolysis of steam (HTES), two-step electrochemical-chemical cycles such as those utilizing nickel oxide and nickel hydroxide electrodes, and/or through the thermochemical splitting of water through methods including but not limited to the iron oxide cycle, cerium(IV) oxide-cerium(III) oxide cycle, zinc zinc-oxide cycle, sulfur-iodine cycle, copper-chlorine cycle, calcium-bromine-iron cycle, hybrid sulfur cycle; and/or electrolysis of hydrogen sulfide; and/or thermochemical splitting of hydrogen sulfide; and/or other electrochemical or thermochemical processes known to produce hydrogen with low- or no-carbon dioxide emissions including but not limited to: carbon capture and sequestration (CCS) enabled methane reforming or biomass gasification. In certain embodiments, the approach to generating $H_2$ includes but is not limited to electrolysis powered by renewable electrical energy and/or electricity from a low-GHG source. In certain embodiments, electrolysis is powered by one or more of the following: solar, including but not limited to, photovoltaics and/or solar thermal; wind power, hydroelectric; nuclear; geothermal; enhanced geothermal; ocean thermal; ocean wave power; tidal power.

Worldwide there are enormous wind energy resources, of which only a tiny percentage is utilized. The low current utilization is mainly attributed to the intermittent nature of wind resources, resulting in varying electricity generation over time, and underutilization of capacity to meet energy demand at most hours. The common mismatch between wind power supply and grid demand is manifested in examples from around the world, such as in Scotland where wind farms have been paid to shut down turbines due to oversupply [http://www.mnn.com/earth-matters/energy/blogs/blown-away-wind-turbines-generate-enough-energy-to-power-every-home-in], and in parts of Texas where electricity has been provided for free at night when wind power is high and grid demand is low [http://www.nytimes.com/2015/11/09/business/energy-environment/a-texas-utility-offers-a-nighttime-special-free-electricity.html?_r=2]. This challenge may be resolvable by utilizing wind power produced during off-peak demand hours to produce $H_2$ feedstock for the process in certain embodiments herein.

Currently, hydrogen is increasingly regarded as a possible energy storage system in the so-called "power-to-gas" approach. The inherent instability of renewable energy production (particularly solar and wind energy), and excess grid electricity (off-peak energy) may be mitigated by the production of hydrogen through water electrolysis. According to most current schemes, the produced hydrogen gas may then be converted back to electricity, by fuel cells and/or gas turbines, during periods of peak demand. Or alternatively the $H_2$ may be fed into the gas grid, or converted to methane via methanation. Furthermore, the hydrogen may be used as a raw material in the chemical, petrochemical, metallurgy and food industries. Certain embodiments provide new options within the power-to-gas framework, by enabling the $H_2$ to be used in a wider range of products, including biochemicals and in particular proteins, amino acids, fertilizers, and biostimulants. In certain embodiments, hydrogen produced using excess grid electricity and/or off-peak energy is used as an electron donor for one or more metabolic pathways occurring in hydrogen-utilizing microorganisms. In certain embodiments, the hydrogen and/or the oxygen needed for the microbial biosynthesis by hydrogen-oxidizing bacteria and/or aerobic bacteria is generated by water electrolysis using renewable energy, and in particular off-peak electricity, i.e., electrical power available when the energy supply exceeds demand, and which, in the current situation, is often wasted.

In certain embodiments, onsite storage of $H_2$ and $CO_2$ gases enables diversion of power from the grid only during periods when renewable generation exceeds electrical demand. In certain embodiments, power is allowed to flow as usual into the grid during periods of higher demand. In certain embodiments, the process does not disrupt renewable power supply, but rather facilitates more complete utilization of renewable generation capacity such as, but not limited to, wind and solar. Certain embodiments allow continued renewable operation and generation even during periods when electrical generation exceeds grid demand (e.g., off-peak wind or solar generation).

In certain embodiments, hydrogen electron donors are not necessarily generated with low- or no-carbon dioxide emissions. However, in certain such embodiments the hydrogen is generated from sustainable or low value sources of energy and/or carbon using methods known in the art of chemical and process engineering. Such methods include but are not limited to gasification, pyrolysis, steam-reforming, or autothermal reforming of feedstock such as but not limited to one or more of the following: agricultural materials, wood, methane hydrates, straw, sea weed and kelp, and low value, highly lignocellulosic biomass in general. In certain embodiments, a synthesis gas or producer gas containing $H_2$ and/or CO and/or $CO_2$ is utilized as an electron donor and/or as a carbon source. In certain embodiments, the $H_2$ and/or CO and/or $CO_2$ contained in a syngas or producer gas is supplemented by $H_2$ generated using a renewable and/or low-GHG energy source and conversion process such as one or more of those described herein.

In certain non-limiting embodiments, reduction of $CO_2$ occurs and/or synthesis of cellular material that can be utilized as a food or nutrition source.

In certain embodiments, the ratio of hydrogen to carbon monoxide in syngas or producer gas may be adjusted through the water gas shift reaction and/or carbon capture, prior to the gas being delivered to the microbial culture. In certain embodiments, C1 compounds are generated through methane steam reforming of methane or natural gas, and particularly stranded natural gas, or natural gas that would be otherwise flared or released to the atmosphere, or biogas, or landfill gas, and provided as a syngas and/or producer gas or liquid stream of C1 compounds to the culture of microorganisms, where in certain embodiments the ratio of hydrogen to carbon monoxide in the syngas or producer gas may be adjusted through the water gas shift reaction and/or carbon capture, prior to the gas being delivered to the microbial culture.

The following examples are intended to illustrate, but not limit, the invention.

EXAMPLES

Example 1—Processing of Single Cell Protein

Microorganism cells are washed to remove culture medium carried over from bioprocessing. The cells are lysed and deactivated (confirm zero viability), and nucleic acids are removed. Optionally, cell walls are removed, and optionally the protein isolate is hydrolyzed to minimize risk of allergenic reactions.

Protein digestibility-corrected amino acid score (PDCAAS) and Digestible Indispensable Amino Acid Score (DIAAS) are determined to assess nutritional value.

Taste is assessed to ensure that the isolate has a neutral or non-offensive flavor. If needed, compounds or ingredients may be added mask the flavor.

Functional properties are assessed, including solubility, emulsification, water holding, fat holding, and gelation.

Allergenicity is assessed to ensure that the isolate is hypoallergenic.

Example 2—Analysis of Microbial Protein Isolates

Protein isolates were prepared from *Cupriavidus necator* microbial whole cell biomass, as described in Example 1. Preparation of the protein isolates enriched the amino acid content and decreased the nucleic acid content of biomass. Functional properties were measured, and indicated high water and oil absorption of the protein isolate (PI) samples. The PI samples displayed a high PDCAAS value, indicating excellent digestibility and nutritional value.

The % N, % total amino acids, and % nucleic acids of the sugar grown whole cell biomass (WCB), in comparison with PI samples, are shown in Table 1.

TABLE 1

| Sample Type | N % in dry mass | % total AA | % nucleic acids |
| --- | --- | --- | --- |
| WCB | 11.87 | 54.02 | 13.73 |
| PI #3 | 13.46 | 78.67 | 5.71 |
| PI #4 | 13.91 | 68.80 | 6.61 |
| PI #5a | 11.95 | 66.54 | 5.65 |
| PI #5b | 12.90 | 78.65 | 5.61 |
| PI #6 | 13.88 | 73.03 | 3.41 |

Density and water and oil absorption of sugar grown WCB, sugar grown PI samples (PI #1, 2, and 3), and gas grown PI (PI #4), in comparison with pea isolate (Nutrassuma pea protein), is shown in Table 2.

TABLE 2

| Sample Type | Bulk density (g/ml) | Water absorbed (g/g sample) | Oil absorbed (g/g sample) |
| --- | --- | --- | --- |
| WCB | 0.46 | 2.21 | 0.89 |
| PI #1 | 0.16 | 3.93 | 4.6 |
| PI #2 | 0.29 | 2.86 | 3.2 |
| PI #3 | 0.53 | 3.3 | 1.61 |
| PI #4 | ND | 3.65 | 1.4 |
| Pea Isolate | ND | 2.7 | 0.94 |

Digestibility of sugar grown WCB, in comparison with other protein sources (data from Miller, et al., Nutritional factors in SCP, pp. 79-89, Single Cell Protein, MIT Press, Eds. Mattales and Tannenbaum), is shown in Table 3.

TABLE 3

|  | WCB | Egg | Milk | Beef | Wheat |
| --- | --- | --- | --- | --- | --- |
| Total essential aa (mg/g N) | 2692 | 3215 | 3200 | 2720 | 2089 |
| Limiting amino acid | His | None | Sulfur AA | Sulfur AA | Lys |
| Digestibility | 99% | 98% | 95% | 98% | 91% |
| PDCAAS | .99 | 1 | 1 | .92 | .42 |

Example 3—Preparation of Food Compositions from Microbial Protein Isolates

Several meat analogues were prepared from *Cupriavidus necator* whole cell biomass (WCB) or protein isolate (PI), including burgers, carne asada bits, and bacon bits. The PI displayed high fat absorption capacity. Hence, when pan or deep fried, it absorbs the oil, resulting in an oily aftertaste. The PI samples also exhibited high water holding capacity. Thus, boiling may prevent the issue of high fat absorption. Cooking via boiling will promote water absorption and will also ensure that the food composition is cooked completely. Pan frying, after boiling, will lend texture to the food composition and provide a crisp exterior. This may mimic meat-like structure, both externally and internally.

Two burgers of 400 g total weight were prepared from WCB. The ingredients are shown in Table 4.

TABLE 4

| Ingredient | B1 | B2 |
| --- | --- | --- |
| WCB | 30 g | 30 g |
| Walnuts | 100 g | 60 g |
| Cashews |  | 40 g |
| Garbanzo beans | 220 g | 220 g |
| Wheat flour | 2 tsp |  |
| Wheat gluten |  | 2 tsp |

Common spices: Apple cider vinegar (1 tsp); Garlic powder (¼ tsp); Onion powder (¼ tsp); Turmeric (⅛ tsp); Baking soda (¼ tsp); Paprika (¼ tsp); Maple syrup (1 tsp); Oil (2 tsp)

B1: All ingredients were first powdered in a Nutri bullet and then blended in a food processor. The appearance was very smooth. The burger was sticky in consistency. Use of 100% walnuts made the burger dark in color.

B2: All ingredients were blended in a food processor. It appeared chunky and looked pleasant. Vital wheat gluten was included, which may have contributed to the chunky texture. Use of 60:40 walnut:cashew made the burger light in color.

Ingredients for color: Carrot fiber binder; Beet powder and tomato powder

A burger of 464 g total weight were prepared from PI. % protein was 6.5% by weight (wet). The ingredients are shown in Table 5.

TABLE 5

| Ingredient | |
|---|---|
| Vital wheat gluten flour | 75 g |
| PI | 30 g |
| Walnuts | 100 g |
| Garbanzo beans | 164 g |
| Mustard powder | 1 tsp |
| Paprika | ½ tsp |
| Salt | ½ tsp |
| Black pepper | ½ tsp |
| Garlic powder | ½ tsp |
| Tomato powder | 1 tsp |
| Olive oil | 1 tsp |
| Liquid smoke | ½ tsp |
| Water | 95 g |

The burger was dark in color. A color change occurred after cooking, attributed to walnut lipid oxidation. It had a good taste, and no aftertaste.

Desirable traits for burgers: For lighter color, rice flour may be used instead of garbanzo beans, cashews may be used instead of walnuts, and/or beet juice may be included to add a reddish color. For a less cracked texture, egg or egg substitute may be included. For additional moisture, fat may be added, such as olive oil or margarine.

Bacon analogue was prepared with ingredients as shown in Table 6. Recipe 1 included 25% WCB dry basis (uncooked), and Recipe 2 included 48% WCB dry basis and 16% wet basis (uncooked).

TABLE 6

| Ingredient | Recipe 1 | Recipe 2 |
|---|---|---|
| Vital wheat gluten flour | 142 g | 125 g |
| WCB | 33 g | 60 g |
| Mustard powder | 2 tsp | ¼ tsp |
| Paprika | 1 tsp | 1 tsp |
| Salt | ½ tsp | |
| Black pepper | 1½ tsp | 1 tsp |
| Garlic powder | 1 tsp | ½ tsp |
| Cayenne pepper | ¼ tsp | 1/4 tsp |
| Sugar | ¾ tsp | |
| Tomato paste | 1/8 cup | 1/8 cup |
| Olive oil | 2 tsp | 2 tsp |
| Liquid smoke | 2 tsp | 4 drops |

Carne asada/bacon analogue was prepared with ingredients shown in Table 7. Total weight was 402 g. % protein was 15% wet and 28.5% dry.

TABLE 7

| Ingredient | |
|---|---|
| Vital wheat gluten flour | 125 g |
| PI | 60 g |
| Mustard powder | ½ tsp |
| Paprika | ½ tsp |
| Salt | ½ tsp |
| Black pepper | ½ tsp |
| Garlic powder | ½ tsp |
| Tomato powder | 1 tsp |
| Olive oil | 1 tsp |

TABLE 7-continued

| Ingredient | |
|---|---|
| Liquid smoke | ½ tsp |
| Water | 192 g |

The protein integrated well with the wheat gluten to form a dough which is pliable. This dough may be texturized via rolling and re-rolling. The dough once baked or boiled resembled meat like texture. The meat like texture was more evident after boiling. The surface of the product displayed meat like striations. On tasting, the flavor was neutral and bland. The product flavor takes on the flavor of the added flavor ingredients.

Carne asada/bacon analogue was prepared with ingredients shown in Table 8.

TABLE 8

| Ingredient | |
|---|---|
| Vital wheat gluten flour | 125 g |
| Water | 192 g |
| PI | 60 g |
| Mustard powder | 2 tsp |
| Paprika | 1 tsp |
| Salt | ½ tsp |
| Black pepper | 1½ tsp |
| Garlic powder | 1 tsp |
| Cayenne pepper | ¼ tsp |
| Sugar | ¾ tsp |
| Tomato paste | 1/8 cup |
| Olive oil | 2 tsp |
| Liquid smoke | 2 tsp |

Example 4—Protein Concentrate Production from *Cupriavidus necator* Grown on $H_2$ and $CO_2$

*C. necator* DSM 541 biomass was grown on $H_2$ and $CO_2$ substrate and aqueous minimum salts medium in a 2-liter continuous stirred tank reactor (CSTR). Culture broth was harvested continuously from the CSTR and temporarily stored at 4° C. The biomass was then separated from the liquid broth by centrifugation, the supernatant was poured off, and the dewatered but wet biomass (approximately 20% solids content/80% moisture content) was collected and stored at −80° C. The frozen wet biomass was later thawed and resuspended in water to an 8% solids content using a Turrax stick and hand blender to make a smooth homogeneous slurry. This slurry was then placed in an autoclave. The autoclave was heated to 110° C. and held at that temperature for 30 minutes. Following heat treatment the autoclaved slurry was cooled down in a water bath and then centrifuged at 13,000 g for 40 minutes. The supernatant was poured off, separated for analysis, and the wet solid resulting from centrifugation was collected. The wet solids produced by centrifugation were then freeze dried and ground, resulting in a fine beige powder protein concentrate.

The protein concentrate was then analyzed. The total amino acid content was determined to be 80.8% on a dry weight basis using the AOAC method AOAC 994.12. The moisture content was determined using the NFTA 2.2.2.5 test method to be 2.88%. The ash content was determined by the AOAC 942.05 test method to be 6.4% on a dry weight basis. The total lipid content was determined by Bligh-Dyer extraction (Bligh, E. G. and Dyer W. J. (1959) *Can J Biochem Physiol* 37 (8):911-917) and gravimetric analysis to be 9.15% on a dry weight basis. Vitamins B1 and B2 were measured and found to be 1.39 mg vitamin B1, and 20.6 mg vitamin B2, per 100 grams of dry weight, using the test methods AOAC OMA 942.23 and AOAC OMA 970.65, respectively.

Although the foregoing invention has been described in some detail by way of illustration and examples for purposes of clarity of understanding, it will be apparent to those skilled in the art that certain changes and modifications may be practiced without departing from the spirit and scope of the invention. Therefore, the description should not be construed as limiting the scope of the invention.

All publications, patents, and patent applications cited herein are hereby incorporated by reference in their entireties for all purposes and to the same extent as if each individual publication, patent, or patent application were specifically and individually indicated to be so incorporated by reference.

We claim:

1. A meat analogue, comprising a protein product, wherein said protein product comprises one or more of single cell protein, cell lysate, protein concentrate, protein isolate, protein extract, protein hydrolysate, free amino acids, peptides, and oligopeptides, wherein the protein product is from a chemoautotrophic bacteria, wherein at least 5% of the meat analogue by weight is the protein product, and wherein oil holding capacity of the protein product is from about 0.5 to about 10 by weight.

2. The meat analogue of claim 1, further comprising a plant protein source, an insect protein source, or an algae protein source.

3. The meat analogue of claim 2, further comprising the plant protein, wherein the plant protein source comprises one or more of pea, rice, glutinous rice, wheat, gluten, soy, hemp, canola, buckwheat, mung bean, fava bean, whey, adzuki, chickpea, lupin, lentil seed, cashew nut, almond seed, walnut, peanut, rice bran, oat, or seaweed.

4. The meat analogue of claim 1, further comprising one or more flavorants.

5. The meat analogue of claim 1, further comprising cultured meat.

6. The meat analogue of claim 1, wherein the protein product is protein hydrolysate, wherein the protein hydrolysate comprises a meat flavor precursor.

7. The meat analogue of claim 1, wherein the protein product further comprises a heme-containing polypeptide.

8. The meat analogue of claim 1, further comprising from about 5% to about 30% lipid by weight, from about 0.5% to about 10% carbohydrate by weight, and/or from about 0.5% to about 5% edible fiber by weight.

9. The meat analogue of claim 1, wherein the protein product is present in the meat analogue by at least about 10% by weight.

10. The meat analogue of claim 1, wherein the chemoautotrophic bacteria comprises *Cupriavidus* sp.

11. The meat analogue of claim 1, wherein the chemoautotrophic bacteria comprises *Xanthobacter* sp.

12. The meat analogue of claim 1, wherein the protein product is single cell protein.

13. The meat analogue of claim 10, wherein the *Cupriavidus* sp comprises *Curpriavidus necator*.

14. The meat analogue of claim 11, wherein the *Xanthobacter* sp comprises *Xanthobacter autotrophicus*.

* * * * *